US007369202B2

(12) United States Patent
Ahn et al.

(10) Patent No.: US 7,369,202 B2
(45) Date of Patent: May 6, 2008

(54) LIQUID CRYSTAL DISPLAY PANEL OF HORIZONTAL ELECTRONIC FIELD APPLYING TYPE AND FABRICATING METHOD THEREOF

(75) Inventors: Byung Chul Ahn, Ahnyang-si (KR); Soon Sung Yoo, Gunpo-si (KR); Oh Nam Kwon, Yongin-si (KR); Youn Gyoung Chang, Uiwang-si (KR); Nack Bong Choi, Suwon-si (KR); Seung Hee Nam, Suwon-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 128 days.

(21) Appl. No.: 10/963,945

(22) Filed: Oct. 14, 2004

(65) Prior Publication Data

US 2005/0078259 A1 Apr. 14, 2005

(30) Foreign Application Priority Data

Oct. 14, 2003 (KR) ...................... 10-2003-0071362
Oct. 14, 2003 (KR) ...................... 10-2003-0071378
Oct. 14, 2003 (KR) ...................... 10-2003-0071402
Dec. 30, 2003 (KR) ...................... 10-2003-0100325

(51) Int. Cl.
*G02F 1/1343* (2006.01)
*G02F 1/136* (2006.01)

(52) U.S. Cl. ........................................ 349/141; 349/46

(58) Field of Classification Search ................ 349/141, 349/150, 151, 38, 46
See application file for complete search history.

(56) References Cited

U.S. PATENT DOCUMENTS 6,259,502 B1 * 7/2001 Komatsu .................... 349/141
6,611,309 B2 * 8/2003 Park et al. .................. 349/141
6,630,977 B1 * 10/2003 Yamazaki et al. .......... 349/141
7,248,323 B2 * 7/2007 Ahn et al. .................. 349/141
2001/0013915 A1 * 8/2001 Song .......................... 349/141
2002/0051110 A1 * 5/2002 Kim ........................... 349/149
2005/0012150 A1 * 1/2005 Byun et al. ................. 257/347

FOREIGN PATENT DOCUMENTS

JP 8-334755 12/1996

(Continued)

*Primary Examiner*—James A. Dudek
(74) *Attorney, Agent, or Firm*—McKenna Long & Dridge LLP

(57) ABSTRACT

An in plane switching (IPS) mode liquid crystal display (LCD) panel is fabricated with a reduced number of mask processes and includes a thin film transistor (TFT) array substrate with a TFT provided at a crossing of gate and data lines, a protective film protecting the TFT, a pixel electrode connected to the TFT, a common line substantially parallel to the pixel electrode, a common electrode connected to the common line to generate a horizontal electric field with the pixel electrode, and a pad including a transparent conductive material and connected to the gate line, the data line and/or the common line. A color filter array substrate is joined to, and overlaps a portion of, the TFT array substrate. Portions of the protective film where the color filter array substrate which do not overlap the TFT array substrate are removed to expose the transparent conductive material included in the pad.

14 Claims, 100 Drawing Sheets

FOREIGN PATENT DOCUMENTS

| | | |
|---|---|---|
| JP | 2000-002886 | 1/2000 |
| JP | 2001-154221 | 6/2001 |
| JP | 2002-359375 | 12/2002 |
| KR | 0141766 | 3/1998 |
| KR | 1998-72232 | 5/1998 |

* cited by examiner

LIQUID CRYSTAL DISPLAY PANEL OF HORIZONTAL ELECTRONIC FIELD APPLYING TYPE AND FABRICATING METHOD THEREOF

This application claims the benefit of Korean Patent Application Nos. P2003-71362, P2003-71378, P2003-71402 filed on Oct. 14, 2003, and P2003-100325, filed on Dec. 30, 2003, which are hereby incorporated by reference for all purposes as if fully set forth herein.

BACKGROUND OF THE INVENTION

1. Field of the Invention

The present invention relates to liquid crystal display (LCD) devices. More particularly, the present invention relates to an in plane switching (IPS) mode LCD panel and a method of fabricating the same using a reduced number of mask processes.

2. Discussion of the Related Art

Liquid crystal display (LCD) devices express pictures by selectively altering light transmittance characteristics of liquid crystal material sandwiched between upper and lower substrates. The light transmittance characteristics can be selectively altered by applying an electric field through the liquid crystal material (i.e., driving the liquid crystal material). Depending upon the orientation of the electric field applied through the liquid crystal material, LCD devices may be broadly classified as either a vertical-electric-field-type or a horizontal-electric-field-type LCD device.

LCD devices that drive liquid crystal material using vertically oriented electric fields (e.g., twisted nematic (TN) mode LCD devices) generate electric fields between a pixel electrode formed on the lower substrate and a common electrode formed on the upper substrate. Such LCD devices beneficially have large aperture ratios but display pictures over an undesirably narrow viewing angle of about 90°.

LCD devices that drive liquid crystal material using horizontally oriented electric fields (i.e., in-plane switching (IPS) mode LCD devices) generate electric fields between a pixel electrode and a common electrode formed parallel to each other on the lower substrate. Such IPS mode LCD devices beneficially display pictures over a wide viewing angle of about 160°. Accordingly, a typical IPS mode LCD device includes a lower substrate (i.e., a thin film transistor (TFT) array substrate); an upper substrate (i.e., a color filter array substrate) coupled to, and separated from, the TFT array substrate to form a cell gap; spacers distributed within the cell gap for uniformly maintaining the distance between the TFT and color filter array substrates; and liquid crystal material arranged within the cell gap.

The TFT array substrate includes a plurality of signal wirings for generating a horizontally oriented electric field for each pixel, a plurality of TFTs, and an alignment film coated thereon to impart an alignment to molecules of the liquid crystal material. The color filter array substrate includes a color filter for selectively transmitting light having predetermined ranges of wavelengths, a black matrix for preventing a light from being transmitted in regions outside the pixels, and an alignment film coated thereon to impart an alignment to molecules of the liquid crystal material.

The process used to fabricate the TFT array substrate described above is complicated and relatively expensive because it involves a number of semiconductor processing techniques that require a plurality of mask processes. It is generally known that a single mask process requires many sub-processes such as thin film deposition, cleaning, photolithography, etching, photo-resist stripping, inspection, etc. To reduce the complexity and cost associated with fabricating TFT array substrates, procedures have been developed to minimize the number of masking processes required. Accordingly, a four-mask process has been developed that removes the necessity of a mask process from then standard five-mask process.

FIG. 1 illustrates a plan view of a TFT array substrate of an IPS mode LCD device fabricated using a related art four-mask process. FIG. 2 illustrates a sectional view of the TFT array substrate taken along the I-I' line shown in FIG. 1.

Referring to FIGS. 1 and 2, the TFT array substrate includes gate lines 2 and data lines 4 formed so as to cross each other on a lower substrate 1 to define a plurality of pixel areas, a TFT 30 provided at each crossing of the gate and data lines 2 and 4, a pixel electrode 22 and a common electrode 84 provided at each pixel area to generate a horizontally oriented electric field, and a common line 86 connected to the common electrode 84. The TFT array substrate further includes a storage capacitor 40 provided at a region where the pixel electrode 22 and the common line 86 overlap, a gate pad 50 connected to each gate line 2, a data pad 60 connected to each data line 4, and a common pad 80 connected to each common line 86.

Each gate line 2 applies a gate signal to a gate electrode 6 of a corresponding TFT 30. Each data line 4 applies a pixel signal to a corresponding pixel electrode 22 via a drain electrode 10 of a corresponding TFT 30. The common lines 86 are oriented parallel to the gate lines 2 and supply a reference voltage to the common electrode 84, enabling the liquid crystal material to be driven.

In response to a gate signal applied from a gate line 2, a TFT 30 charges and maintains a pixel signal, applied to a corresponding data line 4, in the pixel electrode 22. Accordingly, each TFT 30 includes a gate electrode 6 connected to a corresponding gate line 2, a source electrode 8 connected to a corresponding data line 4, and a drain electrode 10 connected to a corresponding pixel electrode 22.

Further, each TFT 30 includes an active layer 14 overlapping the gate electrode 6 and is insulated therefrom by a gate insulating pattern 12. Accordingly, a channel is formed in a portion of the active layer 14 between the source and drain electrodes 8 and 10. An ohmic contact layer 16 is formed on the active layer 14 and ohmically contacts the overlapping data line 4, the source electrode 8, and the drain electrode 10 in addition to an overlaying lower data pad electrode 62 and storage electrode 28.

Each pixel electrode 22 is connected to the drain electrode 10 of a corresponding TFT 30 via a first contact hole 32 formed through a protective film 18. Specifically, the pixel electrode 22 includes a first horizontal part 22*a* oriented parallel to gate lines 2 and connected to the drain electrode 10, a second horizontal part 22*b* overlapping the common line 86, and a plurality of finger parts 22*c* oriented parallel to the common electrode 84 between the first and second horizontal parts 22*a* and 22*b*.

Each common electrode 84 is connected to a corresponding common line 86 and is oriented parallel to the plurality of finger parts 22*c*.

Each storage capacitor 40 consists of the common line 86 and the portion of the storage electrode 28 overlapping the common line 86, wherein the two conductors are separated by the gate insulating film 12, the active layer 14, and the ohmic contact layer 16 therebetween. The pixel electrode 22 is connected to the storage electrode 28 via a second contact hole 26 formed through the protective film 18. Constructed as described above, the storage capacitor 40 allows pixel signals charged at the pixel electrode 22 to be uniformly maintained until a next pixel signal is charged at the pixel electrode 22.

Each gate line 2 is connected to a gate driver (not shown) via a corresponding gate pad 50. Accordingly, the gate pad 50 consists of a lower gate pad electrode 52 and an upper gate pad electrode 58. The lower gate pad electrode 52 is an extension of gate line 2 and is connected to the upper gate pad electrode 58 via a third contact hole 54 formed through the gate insulating film 12 and the protective film 18.

Each data line 4 is connected to a data driver (not shown) via a corresponding data pad 60. Accordingly, the data pad 60 consists of a lower data pad electrode 62 and an upper data pad electrode 68. The lower data pad electrode 62 is an extension of the data line 4 and is connected to the upper data pad electrode 68 via a fourth contact hole 64 formed through the protective film 18.

Each common line 86 is connected to an external reference voltage source (not shown) via the common pad 80 to receive a reference voltage. Accordingly, the common pad 80 consists of a lower common pad electrode 82 and an upper common pad electrode 88. The lower common pad electrode 82 is an extension of the common line 86 and is connected to the upper common pad electrode 88 via a fifth contact hole 74 formed through the gate insulating film 12 and the protective film 18.

Generally, a horizontal electric field is generated between the pixel and common electrodes 22 and 84 when a pixel signal is applied from a TFT 30 to a pixel electrode 22 and when a reference voltage is applied from the common line 86 to the common electrode 84. Specifically, the horizontal electric field is formed between the plurality of finger parts 22*c* of the pixel electrode 22 and the common electrode 84. The liquid crystal molecules have a particular dielectric anisotropy. Therefore, in the presence of the electric field, liquid crystal molecules rotate to align themselves horizontally between the TFT and color filter array substrates and the color filter array substrate. The magnitude of the applied electric field determines the extent of rotation of the liquid crystal molecules. Accordingly, gray scale levels may be displayed by a pixel area by varying the magnitude of the applied electric field.

Having described the TFT array substrate above, a method of fabricating the TFT array substrate according to the related art four-mask process will now be described in greater detail with reference to FIGS. 3A to 3D.

Referring to FIG. 3A, a first conductive pattern group, including the gate line 2, the gate electrode 6, the lower gate pad electrode 52, the common line 86, the common electrode 84, and the lower common pad electrode 82, is formed on the lower substrate 1 in a first mask process.

Specifically, a gate metal layer is formed over the entire surface of the lower substrate 1 in a deposition technique such as sputtering. The gate metal layer typically includes an aluminum-group metal. The gate metal layer is then patterned using photolithography and etching techniques in conjunction with an overlaying first mask pattern to provide the aforementioned first conductive pattern group.

Referring next to FIG. 3B, the gate insulating film 12 is coated over the entire surface of the lower substrate 1 and on the first conductive pattern group. In a second mask process, semiconductor patterns, including the active layer 14 and the ohmic contact layer 16, and a second conductive pattern group, including the data line 4, the source electrode 8, the drain electrode 10, the lower data pad electrode 62, and the storage electrode 28, are provided on the gate insulating film 12.

Specifically, the gate insulating film 12, first and second semiconductor layers, and a data metal layer are sequentially formed over the surface of the lower substrate 1 and on the first conductive pattern group by deposition techniques such as plasma enhanced chemical vapor deposition (PECVD) and sputtering. The gate insulating film 12 typically includes an inorganic insulating material such as silicon nitride ($SiN_x$) or silicon oxide ($SiO_x$). The active layer 14 is formed from the first semiconductor layer and typically includes undoped amorphous silicon. The ohmic contact layer is formed from the second semiconductor layer and typically includes N- or P-doped amorphous silicon. The data metal layer typically includes molybdenum (Mo), titanium (Ti), tantalum (Ta).

A photo-resist film is then formed over the data metal layer and is photolithographically patterned using a second mask pattern. Specifically, the second mask pattern is provided as a diffractive exposure mask having a diffractive exposure region corresponding to a channel portion of a subsequently formed TFT. Upon exposure through the second mask pattern and development, a photo-resist pattern is created wherein a portion of the photo-resist film remaining in a region corresponding to the channel portion has a lower height than portions of the photo-resist film remaining in regions outside the channel portion.

Subsequently, the photo-resist pattern is used as a mask to pattern the data metal layer in a wet etching process and form the aforementioned second conductive pattern group (i.e., the data line 4, the source electrode 8, the drain electrode 10, and the storage electrode 28), wherein the source and drain electrodes 8 and 10 are connected to each other in a region corresponding to the channel portion. Next, the photo-resist pattern is used as a mask to sequentially pattern the first and second semiconductor layers in a dry etching process and form the active layer 14 and the ohmic contact layer 16.

After the active and ohmic contact layers 14 and 16 are formed, the portion of the photo-resist having the relatively lower height is removed from the region corresponding to the channel portion in an ashing process. Upon performing the ashing process, the relatively thicker portions of the photo-resist in regions outside the channel portion are thinned but, nevertheless, remain. Using the photo-resist pattern as a mask, the portion of the second conductive pattern group and the ohmic contact layer 16 arranged in the region corresponding to the channel portion are then etched in a dry etching process. As a result, the active layer 14 within the channel portion is exposed, the source electrode 8 is disconnected from the drain electrode 10, and the remaining photo-resist pattern is removed in a stripping process.

Referring next to FIG. 3C, the protective film 18 is coated over the entire surface of the lower substrate, on the gate insulting film 12, the second conductive pattern group, and the active layer 14. In a third mask process, the first to fifth contact holes 32, 26, 54, 64, and 74, respectively, are formed through the protective film 18.

Specifically, the protective film 18 is formed over the surface of the lower substrate, and on the gate insulting film 12, the second conductive pattern group, and the active layer 14 by a deposition technique such as plasma enhanced chemical vapor deposition (PECVD). The protective film 18 typically includes an inorganic insulating material such as silicon nitride ($SiN_x$) or silicon oxide ($SiO_x$), or an organic material having a small dielectric constant such as an acrylic organic compound, BCB (benzocyclobutene) or PFCB (perfluorocyclobutane). A third mask pattern is then arranged over the protective film 18 and the protective film 18 is then patterned by using photolithography and etching processes to thereby define the first to fifth contact holes 32, 26, 54, 64, and 74. The first contact hole 32 is formed through the protective film 18 to expose the drain electrode 10, the second contact hole 26 is formed through the protective film 18 to expose the storage electrode 28, the third contact hole 54 is formed through the protective film 18 and the gate insulating film 12 to expose the lower gate pad electrode 52, the fourth contact hole 64 is formed through the protective film 18 to expose the lower data pad electrode 62, and the fifth contact hole 74 is formed through the protective film 18 and the gate insulating film 12 to expose the lower common pad electrode 82.

Referring next to FIG. 3D, a third conductive pattern group including the pixel electrode 22, the upper gate pad electrode 58, the upper data pad electrode 68, and the upper common pad electrode 88 are formed on the protective film 18 in a fourth mask process.

Specifically, a transparent conductive material is coated over the entire surface of the protective film 18 and in the first to fifth contact holes 32, 26, 54, 64, and 74 by a deposition technique such as sputtering. The transparent conductive material typically includes indium-tin-oxide (ITO), tin-oxide (TO), indium-zinc-oxide (IZO) or indium-tin-zinc-oxide (ITZO). In a fourth mask process, the transparent conductive material is patterned using photolithographic and etching techniques to thereby form the aforementioned third conductive pattern group (i.e., the pixel electrode 22, the upper gate pad electrode 58, the upper data pad electrode 68, and the upper common pad electrode 88).

Accordingly, the pixel electrode 22 is electrically connected to the drain electrode 10 via the first contact hole 32 while also being electrically connected to the storage electrode 28, via the second contact hole 26. The upper gate pad electrode 58 is electrically connected to the lower gate pad electrode 52 via the third contact hole 54, the upper data pad electrode 68 is electrically connected to the lower data pad electrode 62 via the fourth contact hole 64, and the upper common pad electrode 88 is electrically connected to the lower common pad electrode 82 via the fifth contact hole 74.

While the TFT array substrate described above may be formed using a four-mask process that is advantageous over previously known five-mask processes, the four-mask process can still be undesirably complicated and, therefore, costly. Accordingly, it would be beneficial to fabricate a TFT array substrate according to a less complex, and therefore less costly, process.

SUMMARY OF THE INVENTION

Accordingly, the present invention is directed to an in plane switching (IPS) mode liquid crystal display (LCD) device that substantially obviates one or more of the problems due to limitations and disadvantages of the related art.

An advantage of the present invention provides an IPS mode LCD device and a method of fabricating the same in a reduced number of mask processes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an IPS mode LCD device may, for example, include a thin film transistor (TFT) array substrate having a TFT provided at crossings of a gate line and a data line, a protective film for protecting the TFT, a pixel electrode connected to the TFT, a common line oriented parallel to the pixel electrode, a common electrode connected to the common line for enabling a horizontally oriented electric field to be generated with respect to the pixel electrode, and a pad formed from a transparent conductive material and connected to at least one of the gate line, the data line, and the common line; and a color filter array substrate attached to, and separated from, the TFT array substrate, wherein a portion of the protective film that does not overlap with the color filter array substrate is removed to expose portions of the transparent conductive material included within the pad.

In one aspect of the present invention, at least one of the pixel electrode and the common electrode may be formed from at least one of a material included within the gate line, the data line, and a material included within the transparent conductive material.

In another aspect of the present invention, the pad may, for example, include a gate pad connected to the gate line and formed from a transparent conductive material included in the gate line; a data pad connected to the data line; and a common pad connected to the common line and formed from a transparent conductive material included in the common line.

In still another aspect of the present invention, the data pad may, for example, include the transparent conductive material and a gate metal material formed on the transparent conductive material, wherein the data pad may be overlapped by the data line.

In yet another aspect of the present invention, the thin film transistor may, for example, include a gate electrode connected to the gate line; a source electrode connected to the data line; a drain electrode connected to the pixel electrode; and a semiconductor layer overlapping the gate electrode, wherein a gate insulating pattern is provided between the gate electrode and the semiconductor layer to form a channel between the source and drain electrodes.

In still another aspect of the present invention, at least one of the common line, the gate line, the gate electrode and the pixel electrode may include the transparent conductive material and a gate metal material formed on the transparent conductive material.

In yet another aspect of the present invention, the pixel electrode may, for example, include the transparent conductive material and the gate metal material formed on the transparent conductive material in the same pattern as the transparent conductive material.

In an alternative aspect of the present invention, the pixel electrode may, for example, include the transparent conductive material and the gate metal material formed on the transparent conductive material, wherein the gate metal material is overlapped by the drain electrode.

In one aspect of the present invention, the transparent conductive material may, for example, include at least one of indium-tin-oxide (ITO), indium-zinc-oxide (IZO), indium-tin-zinc-oxide (ITZO), tin-oxide(TO), or the like, or any combination thereof; and the gate metal material may, for example, include at least one of an aluminum (Al) group metal, molybdenum (Mo), copper (Cu), chrome(Cr), tantalum (Ta), tungsten (W), silver (Ag), titanium (Ti), or the like, or any combination thereof.

In another aspect of the present invention, the liquid crystal display panel may further include an alignment film formed on the protective film in the same pattern as the protective film.

In still another aspect of the present invention, the liquid crystal display panel may further include a storage capacitor comprised by the gate line and a storage electrode overlapping with, and insulated from, the gate line, wherein the storage electrode is an integral extension of the drain electrode and is connected to the pixel electrode.

In yet another aspect of the present invention, the liquid crystal display panel may further include a storage capacitor comprised by the gate line and a storage electrode overlapping with, and insulated from, the gate line; wherein the storage electrode is an integral extension of the pixel electrode.

According to principles of the present invention, a method of fabricating an IPS mode LCD device may, for example, include (A) providing a TFT array substrate having a TFT provided at crossings of a gate line and a data line, providing a protective film for protecting the TFT, providing a pixel electrode connected to the TFT, providing a common line oriented parallel to the pixel electrode, providing a common electrode connected to the common line for enabling a horizontally oriented electric field to be generated with respect to the pixel electrode, and providing a pad formed from a transparent conductive material and connected to at least one of the gate line, the data line, and the common line; (B) providing a color filter array substrate attached to, and separated from the TFT array substrate; (C) joining the TFT array substrate with the color filter array substrate while exposing the pad; and (D) removing portions of the protective film using the color filter array substrate as a mask, thereby exposing the pad formed of the transparent conductive material.

In one aspect of the present invention, (A) may, for example, include forming, on a substrate, a first conductive pattern group from the transparent conductive material and a gate metal material, wherein the first conductive pattern group includes the gate line, the gate electrode, the gate pad, the common line, the common pad, the data pad, the pixel electrode, and the common electrode; forming semiconductor patterns and a gate insulating pattern on the substrate and on the first conductive pattern group, wherein portions of the semiconductor patterns and gate insulating pattern are removed to expose the gate pad, the data pad, and the common pad; forming a second conductive pattern group on the substrate and on the semiconductor patterns and the gate insulating pattern, wherein portions of the second conductive pattern group are removed to expose the data line, the source electrode, and the drain electrode and being composed of the data line, the source electrode, and the drain electrode, wherein the data pad, the gate pad, and the common pad include transparent conductive material; and forming a protective film on the substrate on which the second conductive pattern group is formed.

In a first alternate aspect of the present invention, (A) may, for example, include forming, on a substrate, a first conductive pattern group from the transparent conductive material and a gate metal material, wherein the first conductive pattern group includes the gate line, the gate electrode, the gate pad, the common pad, the data pad, the pixel electrode, and the common electrode; forming semiconductor patterns and a gate insulating pattern on the substrate and on the first conductive pattern group, wherein portions of the semiconductor patterns and gate insulating pattern are removed to expose the pixel electrode, the common electrode, the gate pad, the data pad, and the common pad; forming a second conductive pattern group on the substrate and on the semiconductor patterns and the gate insulating pattern, wherein portions of the second conductive pattern group are removed to expose the pixel electrode, the common electrode, the data pad, the gate pad, and the common pad and being composed of the data line, the source electrode, and the drain electrode; and forming a protective film on the substrate and on the second conductive pattern group.

In a second alternate aspect of the present invention, (A) may, for example, include forming, on a substrate, a first conductive pattern group from the transparent conductive material and a gate metal material, the first conductive pattern group including the gate line, the gate electrode, the gate pad, the common line, the pixel electrode, the common pad, and the data pad; forming semiconductor patterns and a gate insulating pattern on the substrate and on the first conductive pattern group, wherein portions of the semiconductor patterns and gate insulating pattern are removed to expose the gate pad, the data pad, and the common pad; forming a second conductive pattern group on the substrate and on the semiconductor patterns and gate insulating patterns, wherein portions of the second conductive pattern group are removed to expose the data pad, the gate pad, and the common pad and being comprised of the common electrode, the data line, the source electrode, and the drain electrode; and forming a protective film on the substrate and on the second conductive pattern group.

In a third alternate aspect of the present invention, (A) may, for example, include forming, on a substrate, a first conductive pattern group from the transparent conductive material and a gate metal material, the first conductive pattern group including the gate line, the gate electrode, the gate pad, the common line, the pixel electrode, the common pad, and the data pad; forming semiconductor patterns and a gate insulating pattern on the substrate and on the first conductive pattern group, wherein portions of the semiconductor patterns and gate insulating pattern are removed to expose the pixel electrode, the gate pad, the data pad, and the common pad; forming a second conductive pattern group on the substrate and on the semiconductor patterns and gate insulating pattern, wherein portions of the second conductive pattern group are removed to expose the pixel electrode, the data pad, the gate pad, and the common pad and being comprised of the common electrode, the data line, the source electrode, and the drain electrode; and forming a protective film on the substrate and on the second conductive pattern group.

In a fourth alternate aspect of the present invention, (A) may, for example, include forming, on a substrate, a first conductive pattern group from the transparent conductive material and a gate metal material, the first conductive pattern group including the common electrode, the gate line, the gate electrode, the gate pad, the common line, the common pad, and the data pad; forming semiconductor patterns and a gate insulating pattern on the substrate and on the first conductive pattern group, wherein portions of the semiconductor patterns and gate insulating pattern are removed to expose the common electrode, the gate pad, the data pad, and the common pad; forming a second conductive pattern group on the substrate and on the semiconductor patterns and gate insulating pattern, wherein portions of the second conductive pattern group are removed to expose the common electrode, the data pad, the gate pad, and the common pad and being comprised of the pixel electrode, the data line, the source electrode, and the drain electrode; and forming a protective film on the substrate and on the second conductive pattern group.

In a fifth alternate aspect of the present invention, (A) may, for example, include forming, on a substrate, a first conductive pattern group from the transparent conductive material and a gate metal material, the first conductive pattern group including the common electrode, the gate line, the gate electrode, the gate pad, the common line, the common pad, and the data pad; forming semiconductor patterns and a gate insulating pattern on the substrate and on the first conductive pattern group, wherein portions of the semiconductor patterns and gate insulating pattern are removed to expose the gate pad, the data pad, and the common pad; forming a second conductive pattern group on the substrate and on the semiconductor patterns and gate insulating pattern, wherein portions of the second conductive pattern group are removed to expose the data pad, the gate pad and the common pad and being comprised of the pixel electrode, the data line, the source electrode, and the drain electrode; and forming a protective film on the substrate provided with the second conductive pattern group.

Further to the aspects of the present invention described above, the second conductive pattern group may be formed to expose the structures formed from the transparent conductive material by sequentially depositing a data metal film and a photosensitive material onto the substrate and on the semiconductor patterns and the gate insulating pattern; arranging a partial-exposure mask over the photosensitive material and exposing and developing the photosensitive material to form a photo-resist pattern having step differences between shielding and partial-exposure areas; etching the data metal film using the photo-resist pattern with step coverage as a mask to form the second conductive pattern group; etching at least one exposed one of the gate pad, the data pad, the common pad, the pixel electrode, and the common pad using the second conductive pattern group as a mask; ashing the photo-resist pattern with step coverage; and etching the data metal film and the semiconductor patterns using the ashed photo-resist pattern a mask, thereby disconnecting the source electrode from the drain electrode and forming a channel portion of within the semiconductor pattern.

In a sixth alternate aspect of the present invention, (A) may, for example, include forming, on a substrate, a first conductive pattern group from the transparent conductive material and a gate metal material, the first conductive pattern group including the common electrode, the gate line, the gate electrode, the gate pad, the common line, the common pad, and the data pad; forming semiconductor patterns and a gate insulating pattern on the substrate and on the first conductive pattern group, wherein portions of the semiconductor patterns and gate insulating pattern are removed to expose at least one of the common pad, the common electrode, the gate pad, and the data pad; forming a second conductive pattern group on the substrate and on the semiconductor patterns and gate insulating pattern, the second conductive pattern group including the pixel electrode, the data line, the source electrode, and the drain electrode; and forming a protective film on the substrate and on the second conductive pattern group.

Further to the aspects of the present invention described above, the semiconductor patterns and the gate insulating pattern may be formed to expose the structures formed from the transparent conductive material by sequentially depositing said gate insulating film, a first semiconductor layer, a second semiconductor layer, and photosensitive material over the entire surface of the substrate and on the first conductive pattern group; arranging a partial-exposure mask over the photosensitive material and exposing and developing the photosensitive material to form a photo-resist pattern having a step difference between shielding and partial-exposure areas; etching the data metal film and the first and second semiconductor layers using the photo-resist pattern as a mask to expose the common pad, the common electrode, the gate pad, and the data pad; ashing the photo-resist pattern with step coverage; and etching the common pad, the common electrode, the gate pad, and the data pad using the ashed photo-resist pattern a mask.

In one aspect of the present invention, the transparent conductive material may, for example, include at least one of indium-tin-oxide (ITO), indium-zinc-oxide (IZO), indium-tin-zinc-oxide (ITZO), tin-oxide(TO), or the like, and any combination thereof; and the gate metal material may, for example, include at least one of an aluminum (Al) group metal, molybdenum (Mo), copper (Cu), chrome(Cr), tantalum (Ta), tungsten (W), silver (Ag), titanium (Ti), or the like, and any combination thereof.

In one aspect of the present invention, (D) may, for example, include etching the protective film by any one of a dry etching and a wet etching technique by utilizing the color filter array substrate as a mask. In another aspect of the present invention, (D) may, for example, include etching the protective film using any one of an atmosphere plasma and a normal-pressure plasma by utilizing the color filter array substrate as a mask.

In a first alternate aspect of the present invention, (D) may, for example, include providing an alignment film on the substrate on which the protective film is formed; and etching the portion of the protective film covering the pad using the alignment film as a mask.

In one aspect of the present invention, the method may further include providing a storage capacitor comprised of the gate line, and a storage electrode overlapping with, and insulated from, the gate line, wherein the storage electrode is an integral extension of the drain electrode and is connected to the pixel electrode.

In another aspect of the present invention, the method may further include providing a storage capacitor comprised of the gate line, and a storage electrode overlapping with, and insulated from, the gate line, wherein the storage electrode is an integral extension of the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
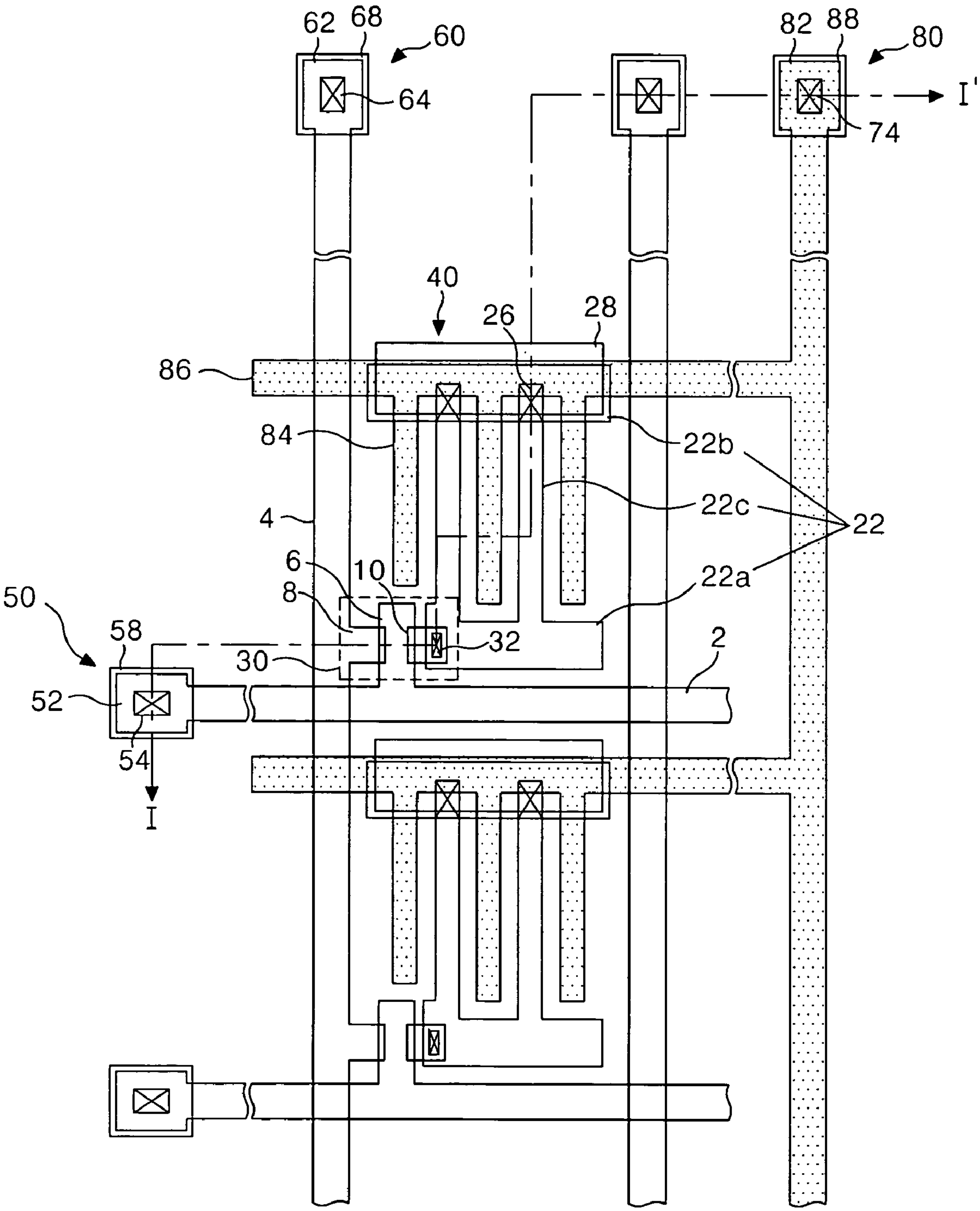
FIG. 1 illustrates a plan view of a thin film transistor (TFT) array substrate, fabricated using a related art four-mask process, used in an in plane switching (IPS) mode liquid crystal display (LCD) devices.
Figure 2:
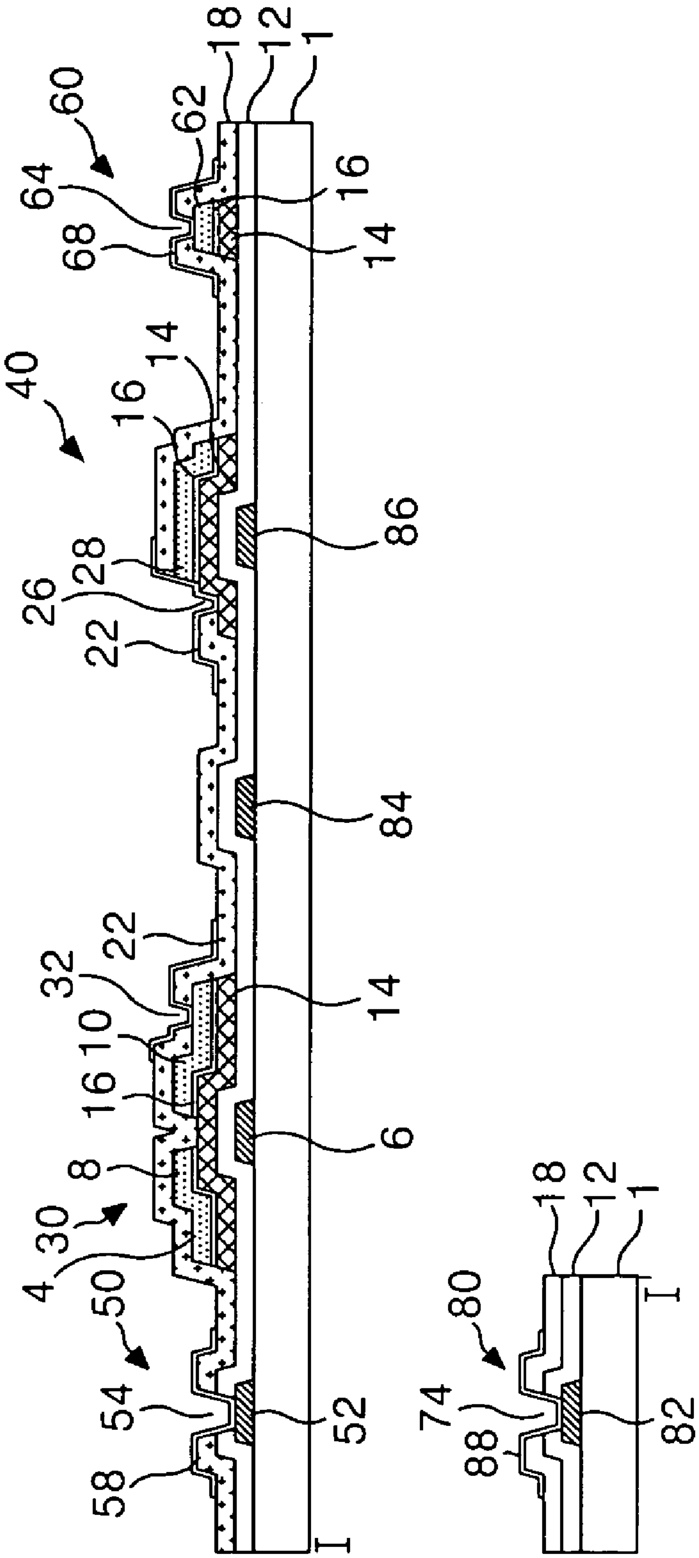
FIG. 2 illustrates a sectional view of the TFT array substrate taken along line I-I' shown in FIG. 1.
Figure 3A:
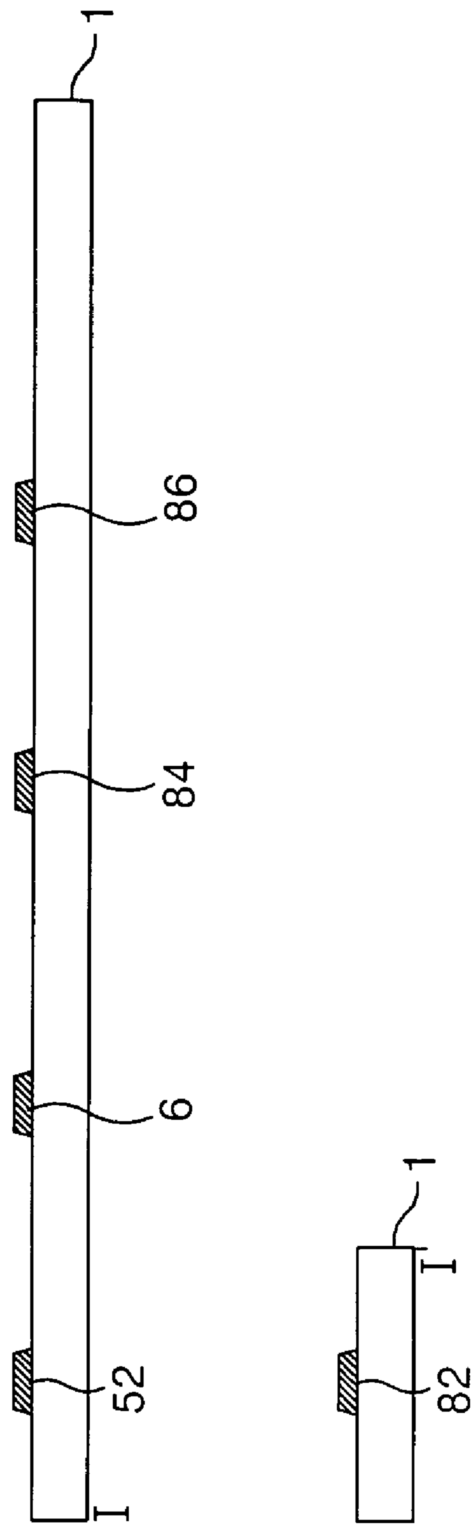
FIGS. 3A to 3D illustrate a method of fabricating the TFT array substrate shown in FIG. 2.
Figure 3B:
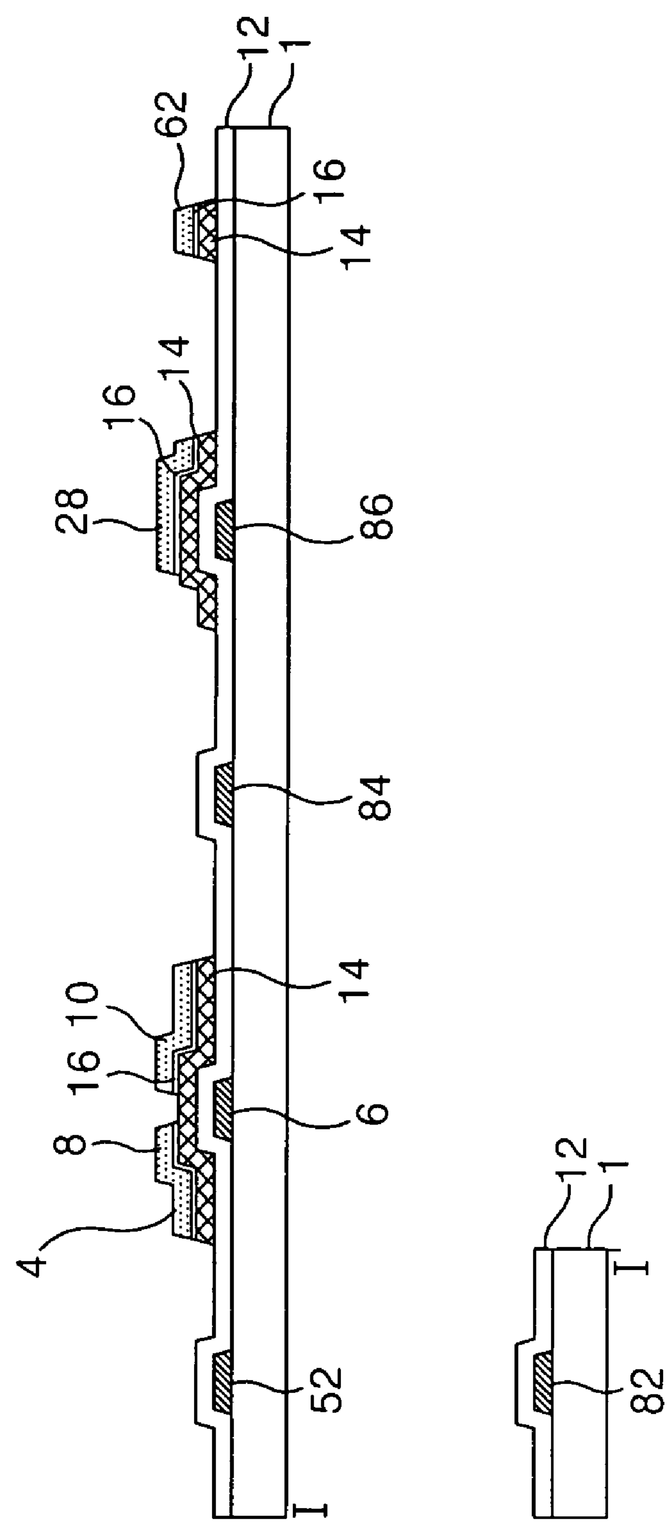
Figure 3C:
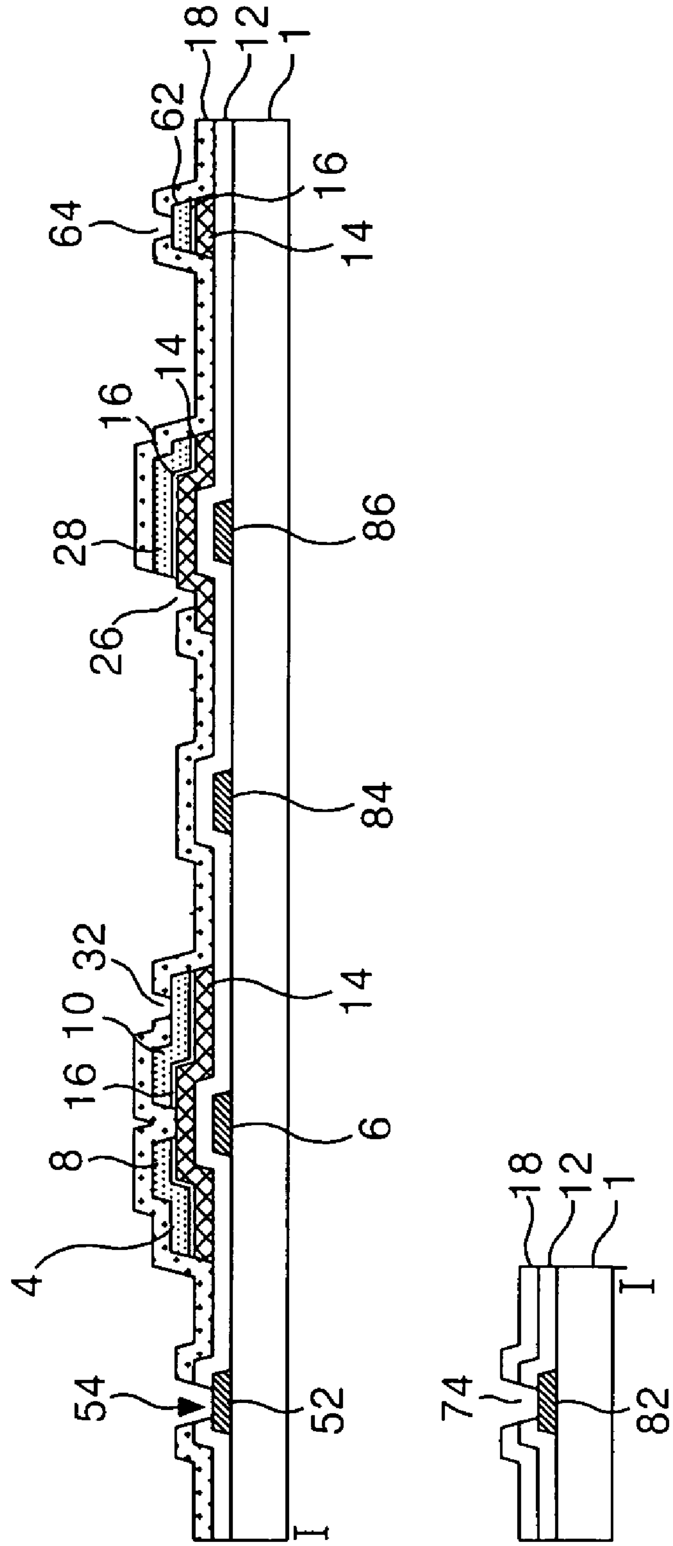
Figure 3D:
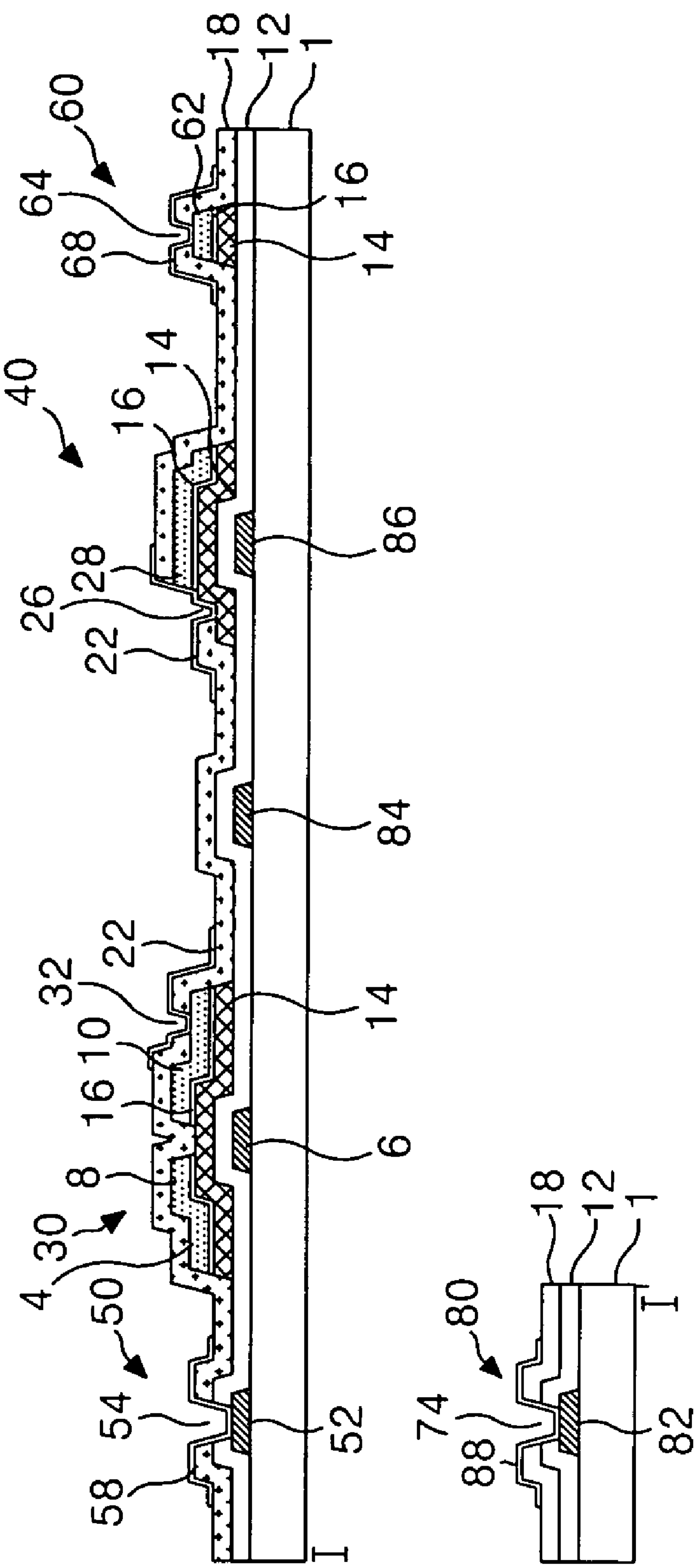
Figure 4:
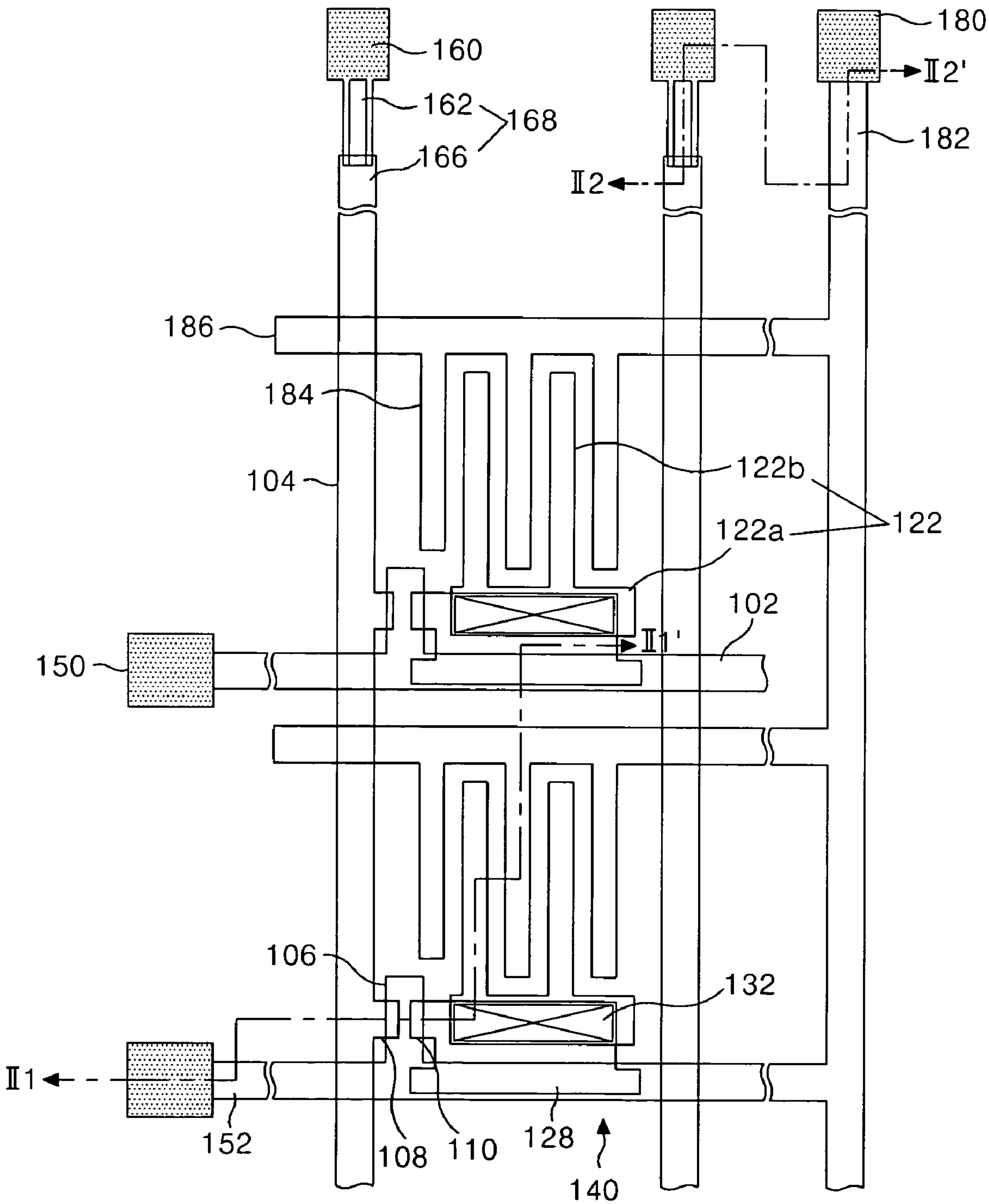
FIG. 4 illustrates a plan view of a TFT array substrate in an IPS mode LCD device according to a first embodiment of the present invention.
Figure 5:
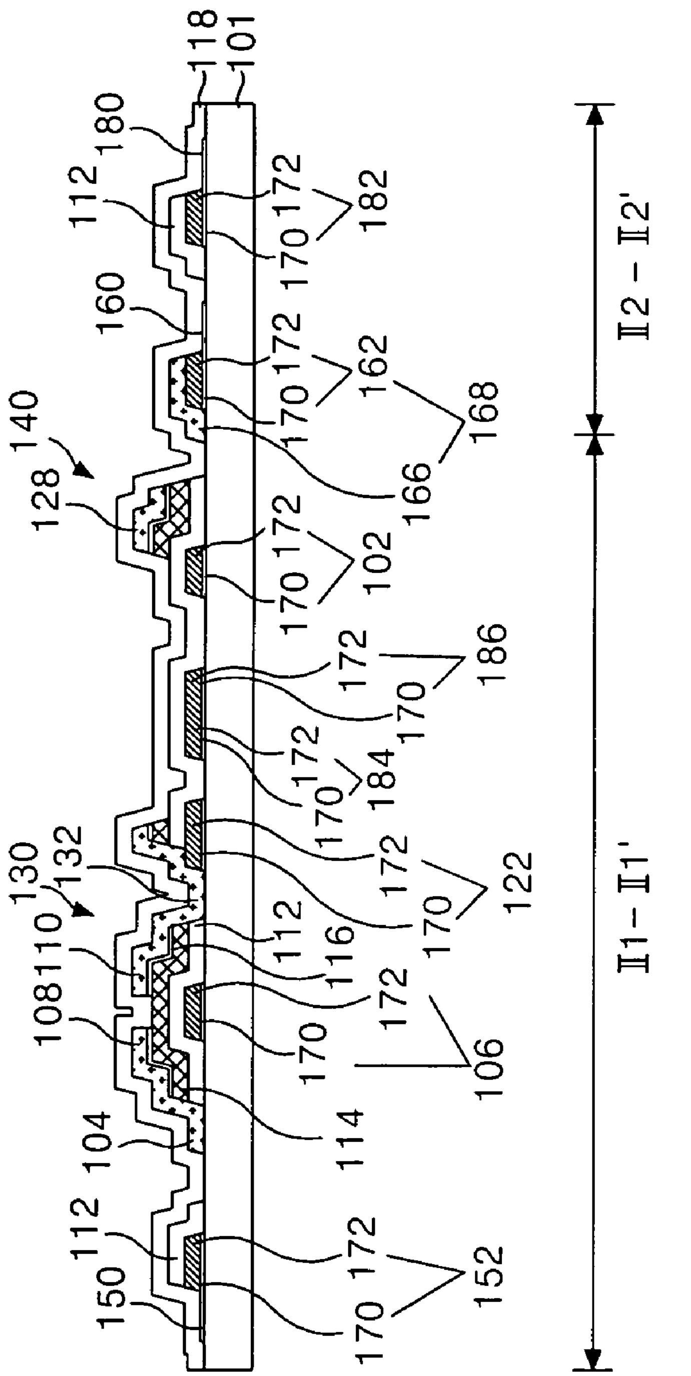
FIG. 5 illustrates a sectional view of the TFT array substrate taken along lines II1-II1' and II2-II2' shown in FIG. 4.

FIG. 4 illustrates a plan view of a TFT array substrate in an IPS mode LCD device according to a first embodiment of the present invention. FIG. 5 illustrates a sectional view of the TFT array substrate taken along lines II1-II1' and II2-II2' shown in FIG. 4.

Referring to FIGS. 4 and 5, the TFT array substrate of the first embodiment, incorporated within an LCD panel, may, for example, include gate lines 102 and data lines 104 formed so as to cross each other on a lower substrate 101 to define a plurality of pixel areas; a gate insulating pattern 112 formed between the gate and data lines 102 and 104; a thin film transistor 130 at each crossing of the gate and data lines 102 and 104; a pixel electrode 122 and a common electrode 184 arranged at each pixel area, for generating a horizontally oriented electric field; and a common line 186 connected to each common electrode 184. The TFT array substrate may further include a storage capacitor 140 provided at a region where a storage electrode 128 and gate lines 102 overlap, a gate pad 150 connected to each gate line 102, and a data pad 160 connected to each data line 104, and a common pad 180 connected to each common line 186.

Each gate line 102 may be supplied with a gate signal, each data line 104 may be supplied with a data signal, and each common line 186 may be oriented parallel to the gate lines 102 and be supplied with a reference voltage for driving liquid crystal material. In response to a gate signal supplied to the a gate line 102, a TFT 130 charges and maintains a pixel signal, supplied to a corresponding data line 104, in the pixel electrode 122. Accordingly, each TFT 130 may, for example, include a gate electrode 106 connected to a corresponding gate line 102, a source electrode 108 connected to a corresponding data line 104, and a drain electrode 110 connected to a corresponding pixel electrode 122.

Further, each thin film transistor 130 may include an active layer 114 overlapping the gate electrode 106 and insulated therefrom by the gate insulating pattern 112. Accordingly, a channel is formed in a portion of the active layer 114 between the source electrode 108 and the drain electrode 110. An ohmic contact layer 116 is formed on the active layer 114 and ohmically contacts the overlapping data line 104, the source electrode 108, and the drain electrode 110 in addition to an overlaying storage electrode 128.

Each pixel electrode 122 is connected to a drain electrode 110 and the storage electrode 128 of a corresponding TFT 130 via a first contact hole 132. In one aspect of the present invention, the pixel electrode 122 may, for example, include a pixel horizontal part 122*a* extending from the drain electrode 110 and oriented parallel to an adjacent gate line 102 in addition to a plurality of pixel finger parts 122*b* oriented substantially perpendicularly with respect to the pixel horizontal part 122*a*. In another aspect of the present invention, the pixel electrode 122 may comprise a transparent conductive material 170 and a gate metal material 172 formed on the transparent conductive material 170. In still another aspect of the present invention, the first contact hole 132 may be formed through the gate insulating pattern 112, the active layer 114, and the ohmic contact layer 116 and expose the pixel electrode 122.

Each common electrode 184 may be connected to a common line 186. Similar to the pixel electrode 122, both the common electrode 184 and the common line 186 may comprise the transparent conductive material 170 and the overlaying gate metal material 172.

Each storage capacitor 140 may, for example, include the gate line 102 and the storage electrode 128 overlapping with the gate line 102, wherein the two conductors are separated by the gate insulating pattern 112, the active layer 114, and the ohmic contact layer 116. Constructed as described above, the storage capacitor 140 may allow pixel signals charged at the pixel electrode 122 to be uniformly maintained until a next pixel signal is charge at the pixel electrode 122.

Gate signals may be supplied to each gate line 102 via a corresponding gate pad 150. Accordingly, each gate pad 105 may be connected to a gate driver (not shown) via a gate link 152. In one aspect of the present invention, each gate pad 150 may comprise a transparent conductive material 170. In another aspect of the present invention, the gate link 152, the gate line 102, and the gate electrode 106 may comprise the transparent conductive material 170 and the overlaying gate metal material 172. In yet another aspect of the present invention, at least a portion of the transparent conductive material 170 of the gate pad 150 extending from the gate link 152 and connected to the gate line 102 may be exposed by the gate metal material 172.

Data signals may be supplied to each data line 104 via a corresponding data pad 160. Accordingly, each data pad 160 may be connected to a data driver (not shown) via a data link 168. In one aspect of the present invention, each data pad 160 may comprise a transparent conductive material 170. In another aspect of the present invention, the data link 168 may, for example, include a lower data link electrode 162 and an upper data link electrode 166 connected to the lower data link electrode 162 and the data line 104. In still another aspect of the present invention, the lower data link electrode 162 may, for example, include the transparent conductive material 170 and the overlaying gate metal material 172. In still another aspect of the present invention, at least a portion of the transparent conductive material 170 of the data pad 160 extending from the data link 168 and connected to the data line 104 may be exposed by the gate metal material 172.

A reference voltage may be supplied to each common line 186 via a corresponding common pad 180. Accordingly, each common pad 180 may be connected to an external reference voltage source (not shown) via a common link 182. In one aspect of the present invention, the common pad 180 may comprise the transparent conductive material 170 while the common electrode 184, common line 186, and common link 182 may comprise a transparent conductive material 170 and the overlaying gate metal material 172. In another aspect of the present invention, at least a portion of the transparent conductive material 170 extending from the common link 182 and connected to the common line 186 may be exposed by the gate metal material 172.

According to principles of the present invention, the transparent conductive material 170 has a strong corrosion resistance. As described above, portions of the transparent conductive material 170 comprised within the gate pad 150, the data pad 160, and the common pad 180 are exposed by the gate metal material 172 to ensure high reliability against corrosion.

During operation, a horizontal electric field may be generated between the pixel and common electrodes 122 and 184 when a pixel signal is supplied from a TFT 130 to a pixel electrode 122 and when a reference voltage is supplied from the common line 186 to the common electrode 184. For example, the horizontal electric field may be formed between the plurality of pixel finger parts 122*b* of the pixel electrode 122 and the common electrode 184. The liquid crystal molecules have a particular dielectric anisotropy. Therefore, in the presence of the electric field, liquid crystal molecules rotate to align themselves horizontally between the TFT and color filter array substrates. The magnitude of the applied electric field determines the extent of rotation of the liquid crystal molecules. Accordingly, gray scale levels may be displayed by a pixel area by varying the magnitude of the applied electric field.

Figure 6A:
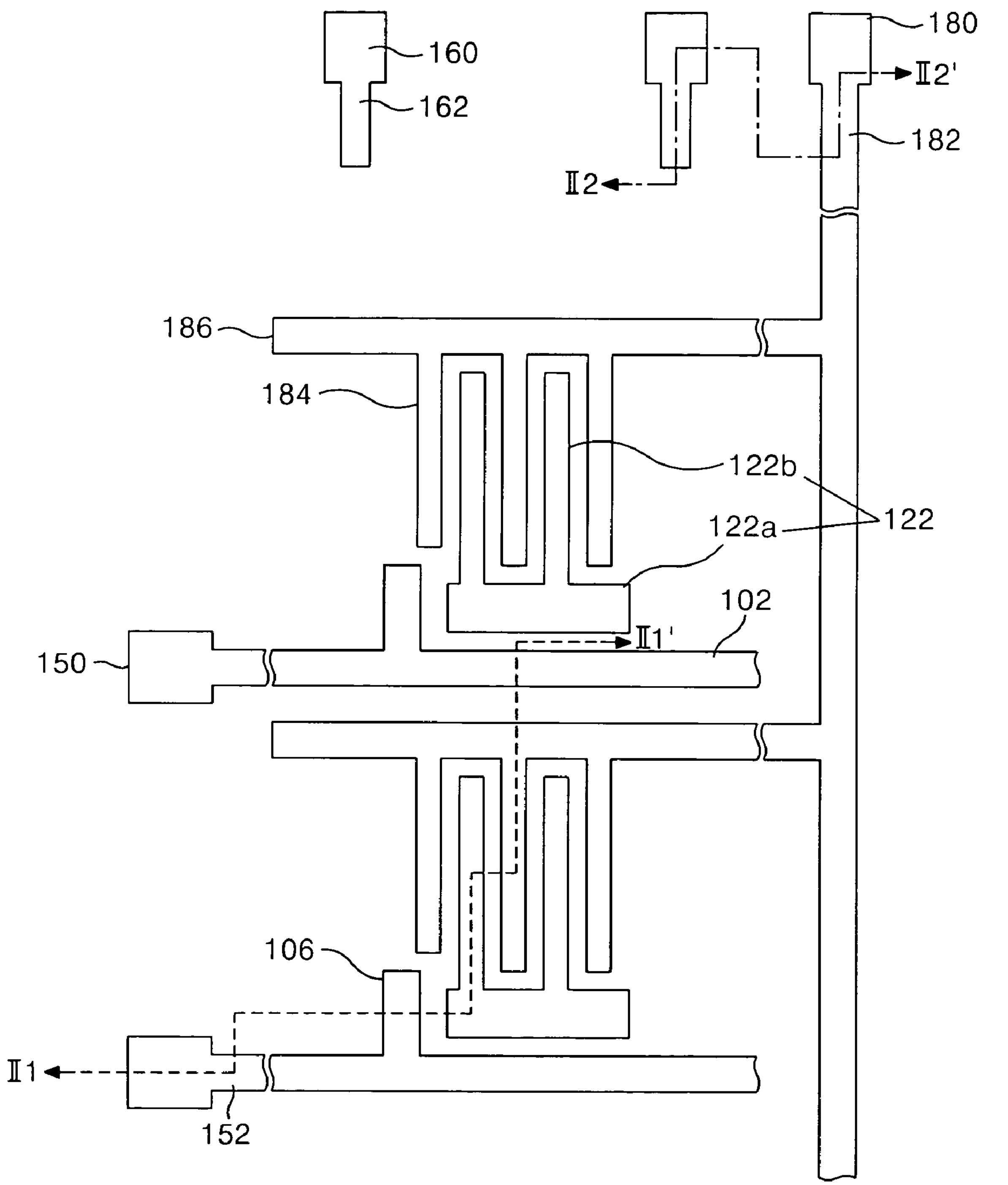
FIGS. 6A and 6B illustrate plan and sectional views, respectively, describing a first mask process in the method of fabricating the TFT array substrate according to the first embodiment of the present invention.
Figure 6B:
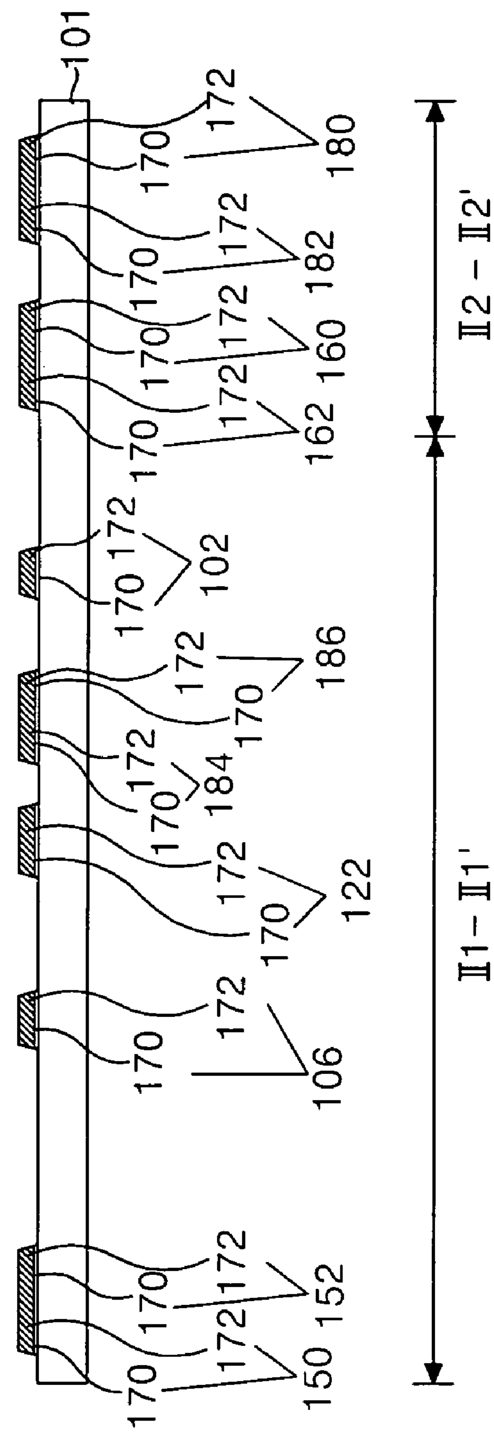

FIGS. 6A and 6B illustrate plan and sectional views, respectively, describing a first mask process in the method of fabricating the TFT array substrate according to the first embodiment of the present invention.

Referring to FIGS. 6A and 6B, a first conductive pattern group may be formed on the lower substrate 101 in a first mask process. In one aspect of the present invention, the first conductive pattern group may, for example, include the pixel electrode 122, the gate line 102, the gate electrode 106, the gate link 152, the gate pad 150, the data pad 160, the lower data link electrode 162, the common electrode 184, the common line 186, the common link 182, and the common pad 180.

According to principles of the present invention, the first conductive pattern group may comprise a transparent conductive material 170 and a gate metal material 172 sequentially deposited on the lower substrate 101 by a technique such as sputtering, or the like. In one aspect of the present invention, the transparent conductive material 170 may include a material such as indium-tin-oxide (ITO), tin-oxide (TO), indium-zinc-oxide (IZO) or indium-tin-zinc-oxide (ITZO), or the like, or combinations thereof. In another aspect of the present invention, the gate metal material 172 may include a material such as an aluminum group metal (e.g., aluminum/neodymium (AlNd), etc.) molybdenum (Mo), copper (Cu), chrome (Cr), tantalum (Ta), titanium (Ti), or the like, or combinations thereof. The transparent conductive material 170 and gate metal material 172 are patterned using photolithographic and etching techniques using a first mask pattern to provide the aforementioned first conductive pattern group. Accordingly, the gate line 102, the gate electrode 106, the gate pad 150, the data pad 160, the lower data link electrode 162, the common electrode 184, the common line 186, the common link 182, the common pad 180, and the pixel electrode 122 have a double-layer structure including the transparent conductive material 170 and gate metal material 172.

Figure 7A:
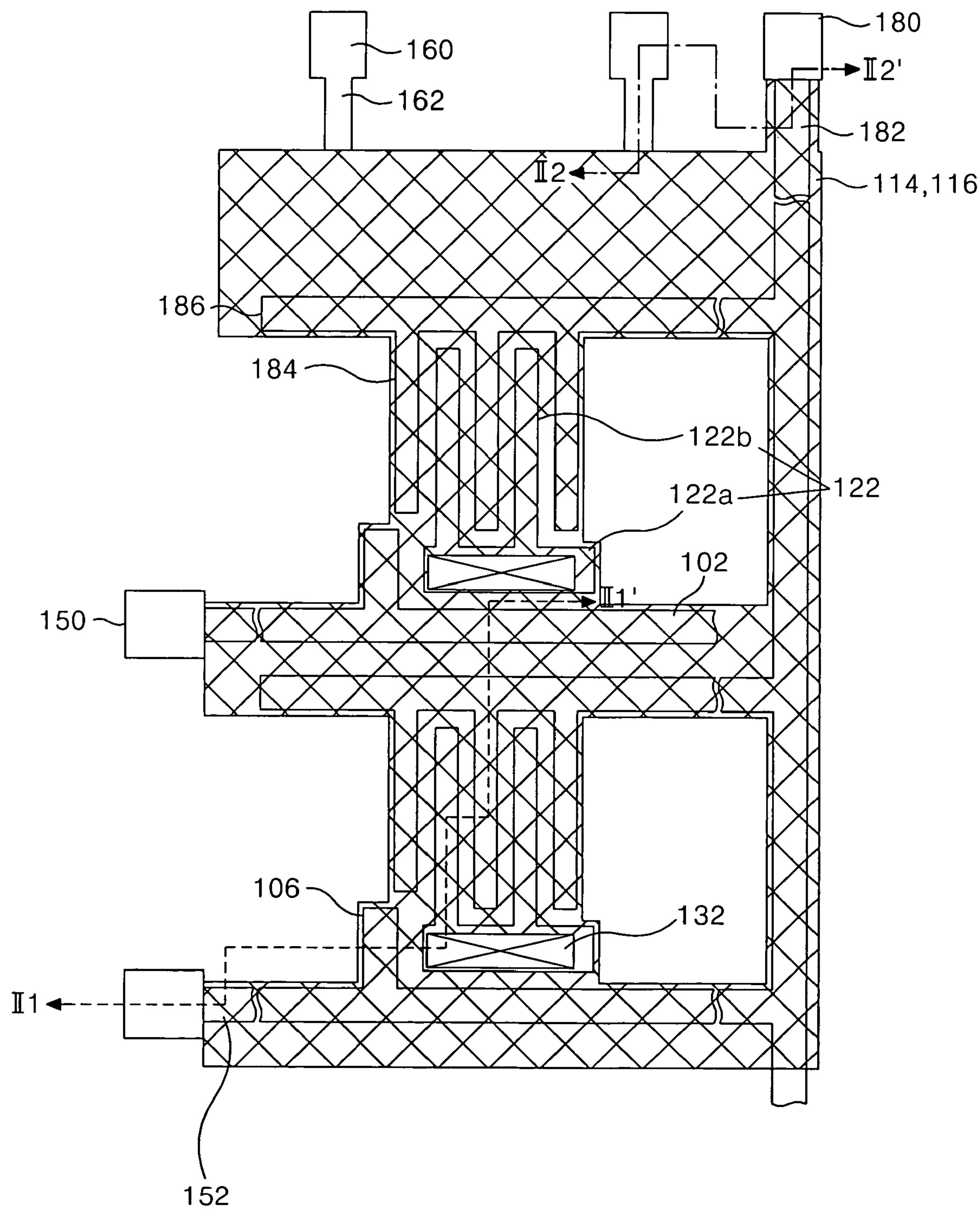
FIGS. 7A and 7B illustrate plan and sectional views, respectively, generally describing a second mask process in the method of fabricating the TFT array substrate according to the first embodiment of the present invention.
Figure 7B:
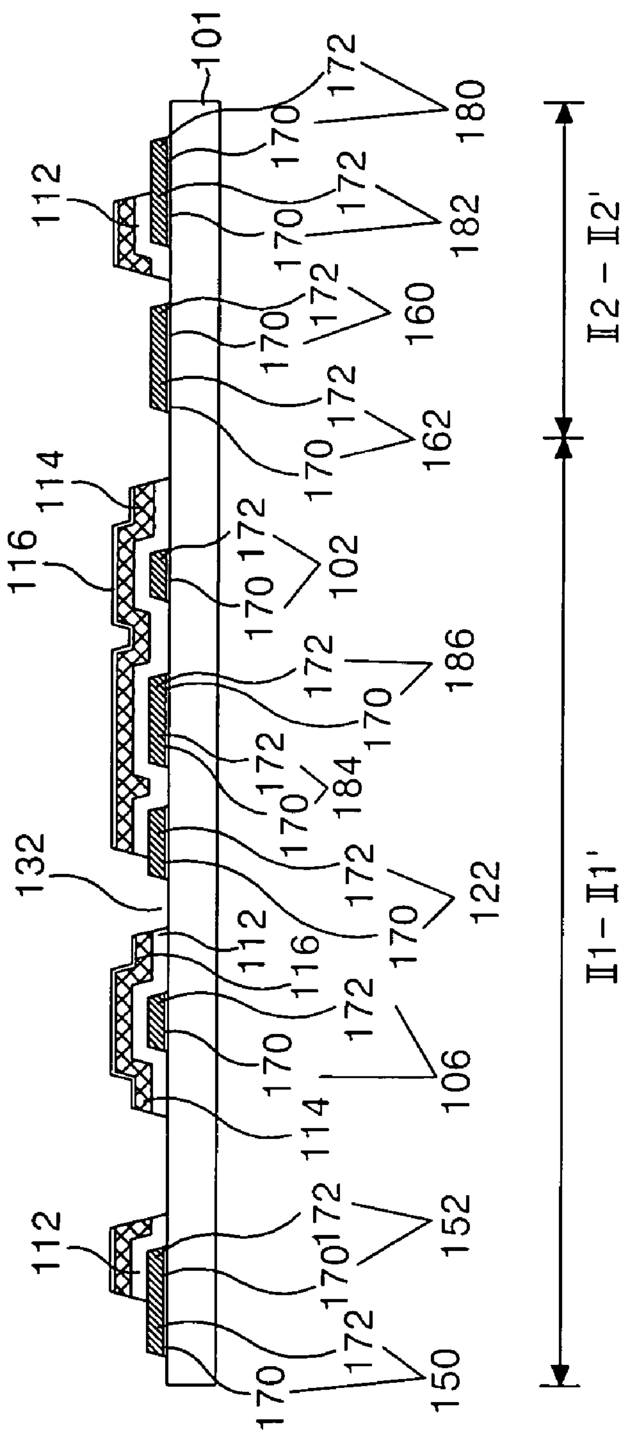

FIGS. 7A and 7B illustrate plan and sectional views, respectively, generally describing a second mask process in the method of fabricating the TFT array substrate according to the first embodiment of the present invention.

Referring to FIGS. 7A and 7B, the gate insulating pattern 112 and semiconductor patterns, comprised of an active layer 114 and an ohmic contact layer 116, are formed on the lower substrate 101 and on the first conductive pattern group in a second mask process. According to principles of the present invention, the gate insulating pattern 112 and the active and ohmic contact layers 114 and 116 are formed to expose the gate pad 150, the data pad 160, the lower data link electrode 162, the common pad 180, and the pixel electrode 122.

The second mask process of the first embodiment described above with respect to FIGS. 7A and 7B will now be described in greater detail with respect to FIGS. 8A to 8C.

Figure 8A:
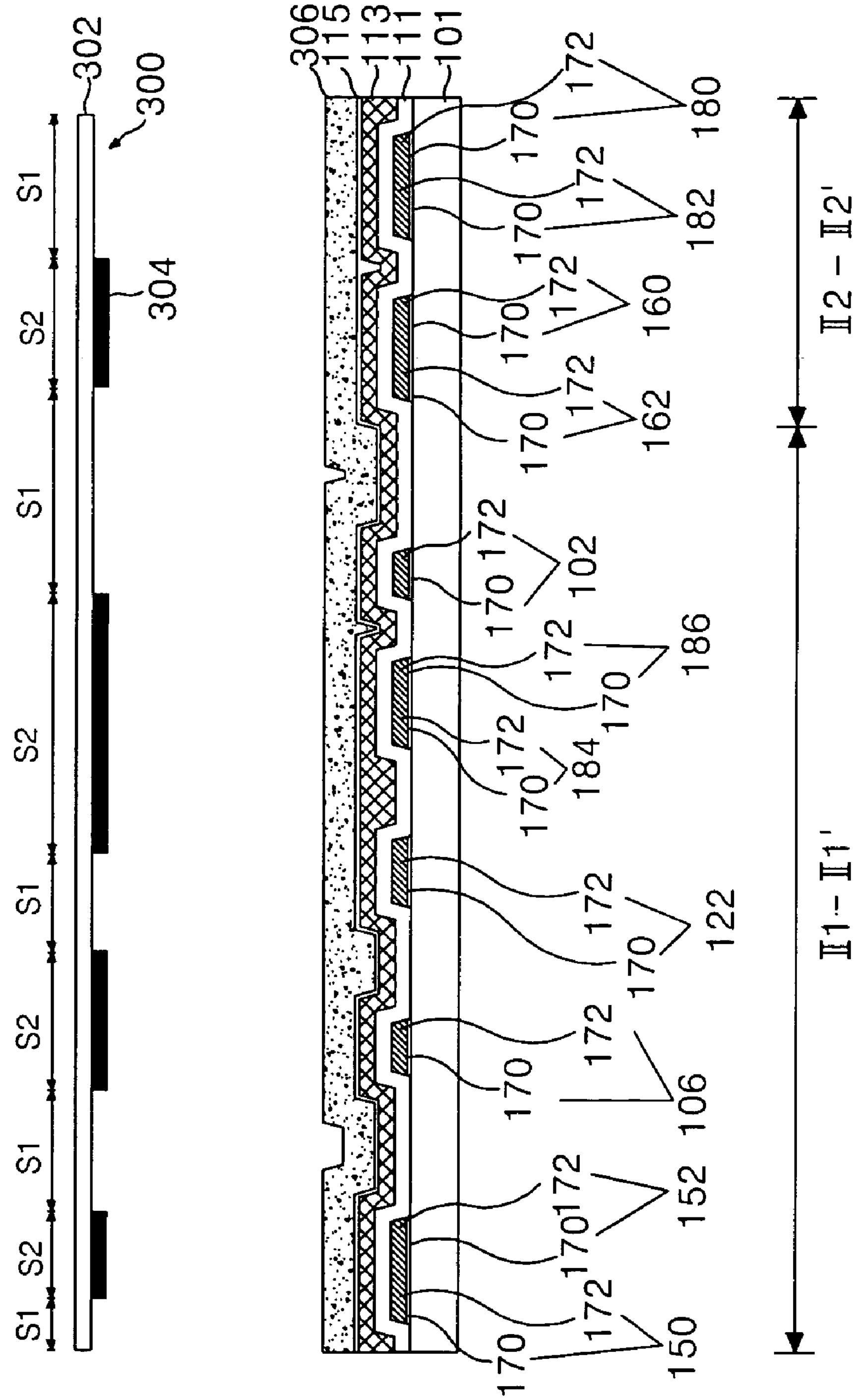
FIGS. 8A to 8C illustrate sectional views specifically describing the second mask process in the method of fabricating the TFT array substrate according to the first embodiment of the present invention.

Referring to FIG. 8A, the gate insulating film 111, a first semiconductor layer 113, and a second semiconductor layer 115 are sequentially formed on the lower substrate 101 and on the first conductive pattern group. In one aspect of the present invention, the gate insulating film 111, and first and second semiconductor layers 113 and 115 are formed according to a deposition technique such as PEVCD, sputtering, or the like. In another aspect of the present invention, the gate insulating film 111 may, for example, include an inorganic insulating material such as silicon nitride ($SiN_x$) or silicon oxide ($SiO_x$). In another aspect of the present invention, the first semiconductor layer 113 may, for example, include undoped amorphous silicon. In still another aspect of the present invention, the second semiconductor layer 115 may, for example, include N- or P-doped amorphous silicon.

A first photo-resist film 306 is then formed over the entire surface of the second semiconductor layer 115 and is photolithographically patterned using a second mask pattern 300. According to principles of the present invention, the second mask pattern 300 may, for example, include a mask substrate 302 formed of a suitably transparent material and a plurality of shielding parts 304 within shielding areas S2 on the mask substrate 302, wherein the shielding areas S2 are separated by exposure areas S1.

Figure 8B:
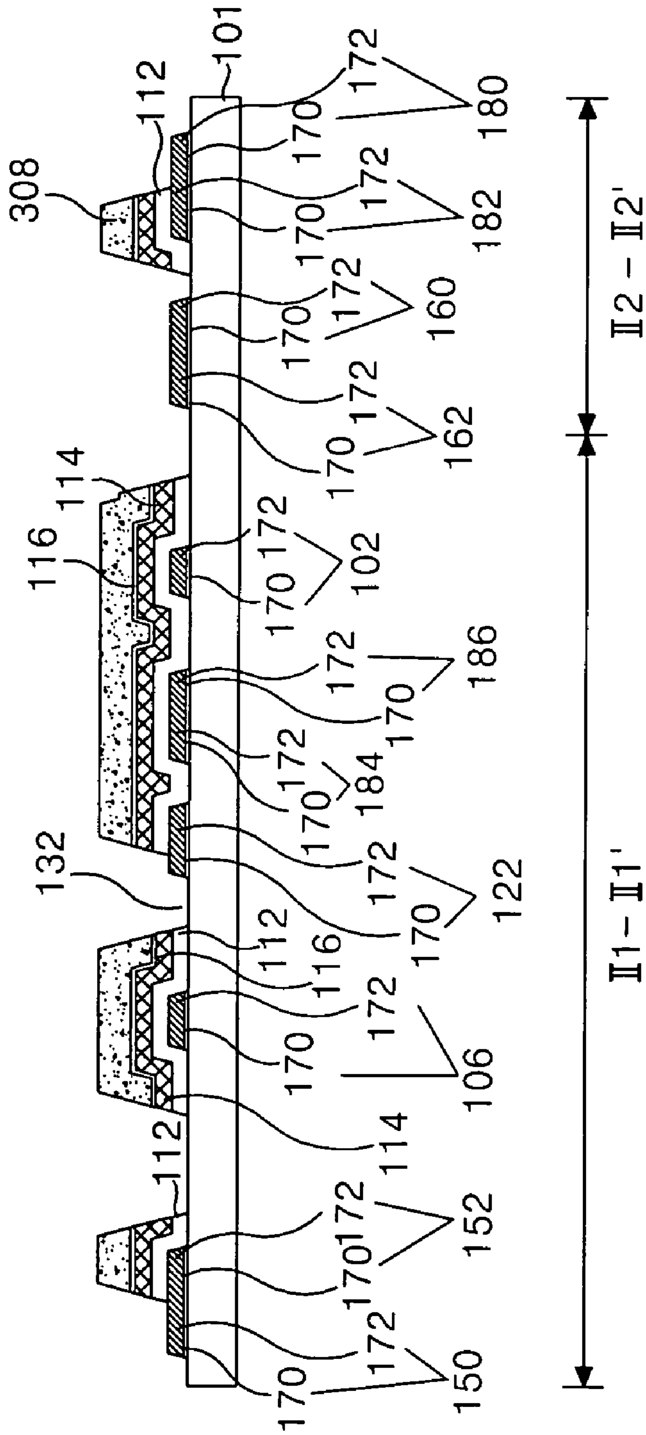
Figure 8C:
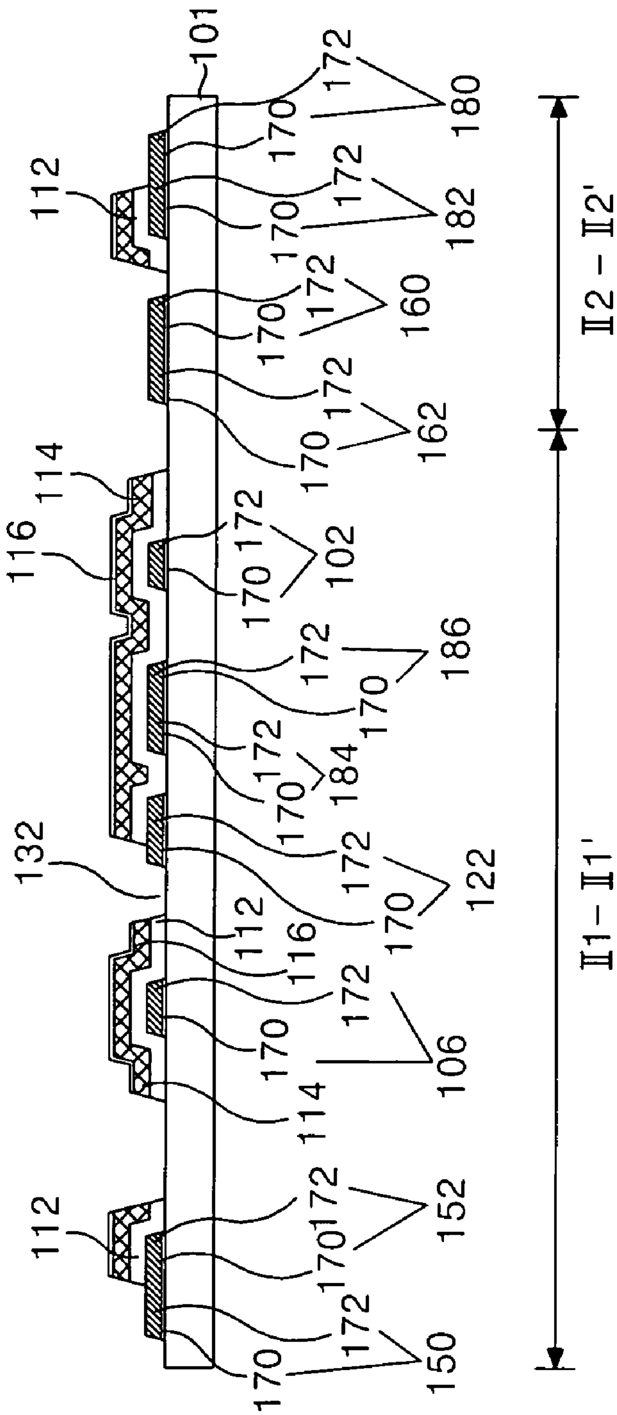

Referring to FIG. 8B, the first photo-resist film 306 may, via the second mask pattern 300, be selectively exposed to light through the exposure areas S1 and developed, thereby creating a first photo-resist pattern 308. The gate insulating film 111 and the first and second semiconductor layers 113 and 115 may then be patterned, via the first photo-resist pattern 308, using photolithographic and etching techniques to form the gate insulating pattern 112, through which the first contact hole 132 is formed, in addition to the semiconductor patterns including the active and ohmic contact layers 114 and 116. After forming the gate insulating pattern 112 and active and ohmic contact layers 114 and 116, the first photo-resist pattern 308 is stripped. As a result of the second mask process, and with reference to FIG. 8C, the gate pad 150, the data pad 160, the common pad 180, the lower data link electrode 162, and a portion of the pixel electrode 122 are exposed by the gate insulating pattern 112 and the active and ohmic contact layers 114 and 116. The portion of the pixel electrode 122 may be exposed through the first contact hole 132 formed through the gate insulating pattern 112 and the active and ohmic contact layers 114 and 116.

Figure 9A:
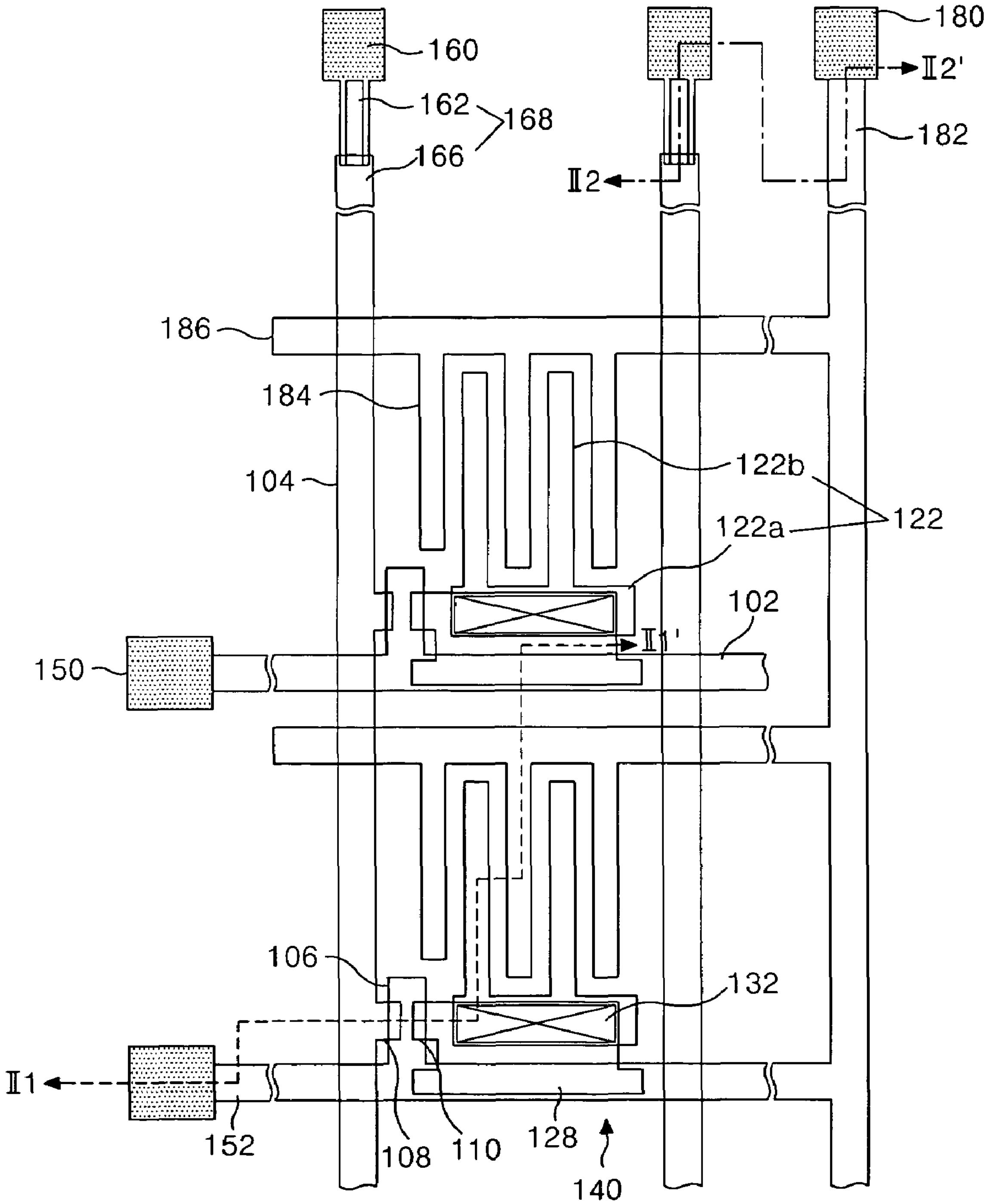
FIGS. 9A and 9B illustrate plan and sectional views, respectively, generally describing a third mask process in the method of fabricating the TFT array substrate according to the first embodiment of the present invention.
Figure 9B:
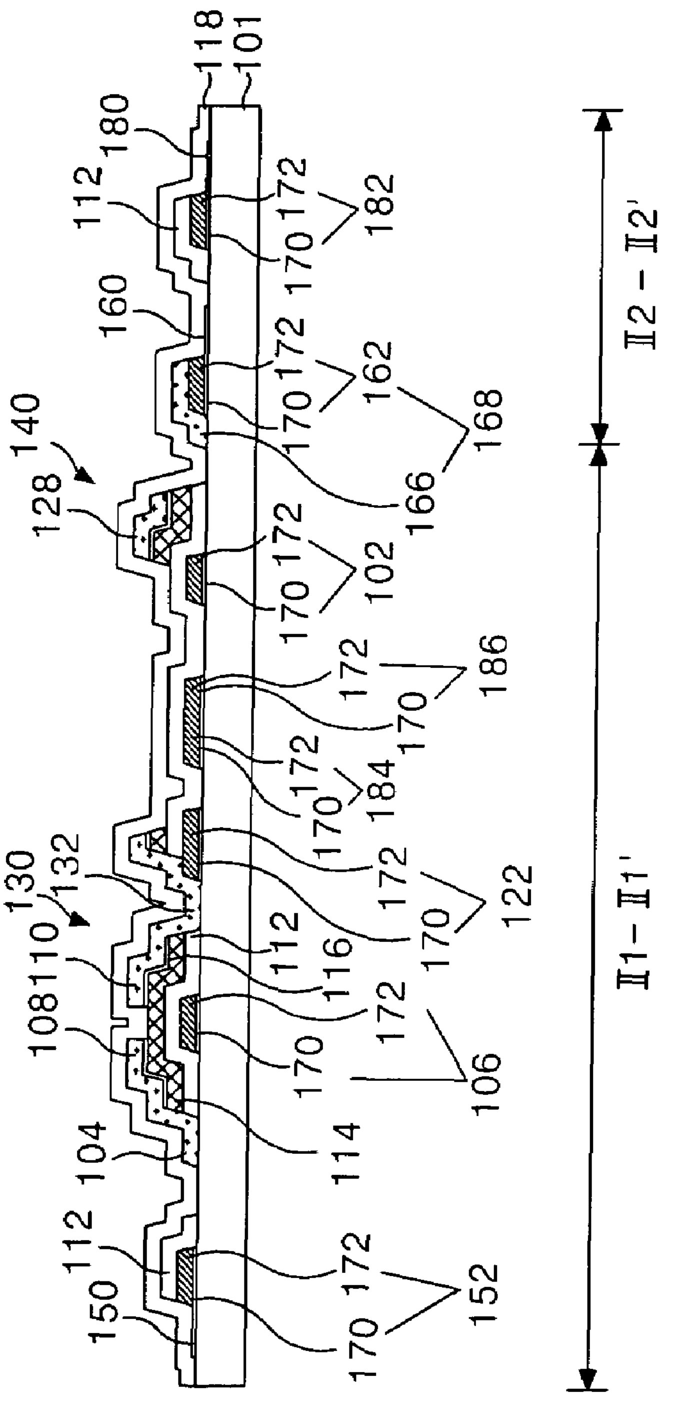

FIGS. 9A and 9B illustrate plan and sectional views, respectively, generally describing a third mask process in the method of fabricating the TFT array substrate according to the first embodiment of the present invention.

Referring to FIGS. 9A and 9B, a second conductive pattern group may be formed on the lower substrate 101 and on the gate insulating pattern 112, in addition to the active and ohmic contact layers 114 and 116, in a third mask process. In one aspect of the present invention, the second conductive pattern group may, for example, include the data line 104, the source electrode 108, the drain electrode 110, the storage electrode 128, and the upper data link electrode 166. In another aspect of the present invention, portions of the gate metal material 172 included within the data pad 160, the gate pad 150, and the common pad 180 may, during the third mask process, be removed to expose the transparent conductive material 170 included therein.

The third mask process of the first embodiment described above with respect to FIGS. 9A and 9B will now be described in greater detail with reference to FIGS. 10A to 10E.

Figure 10A:
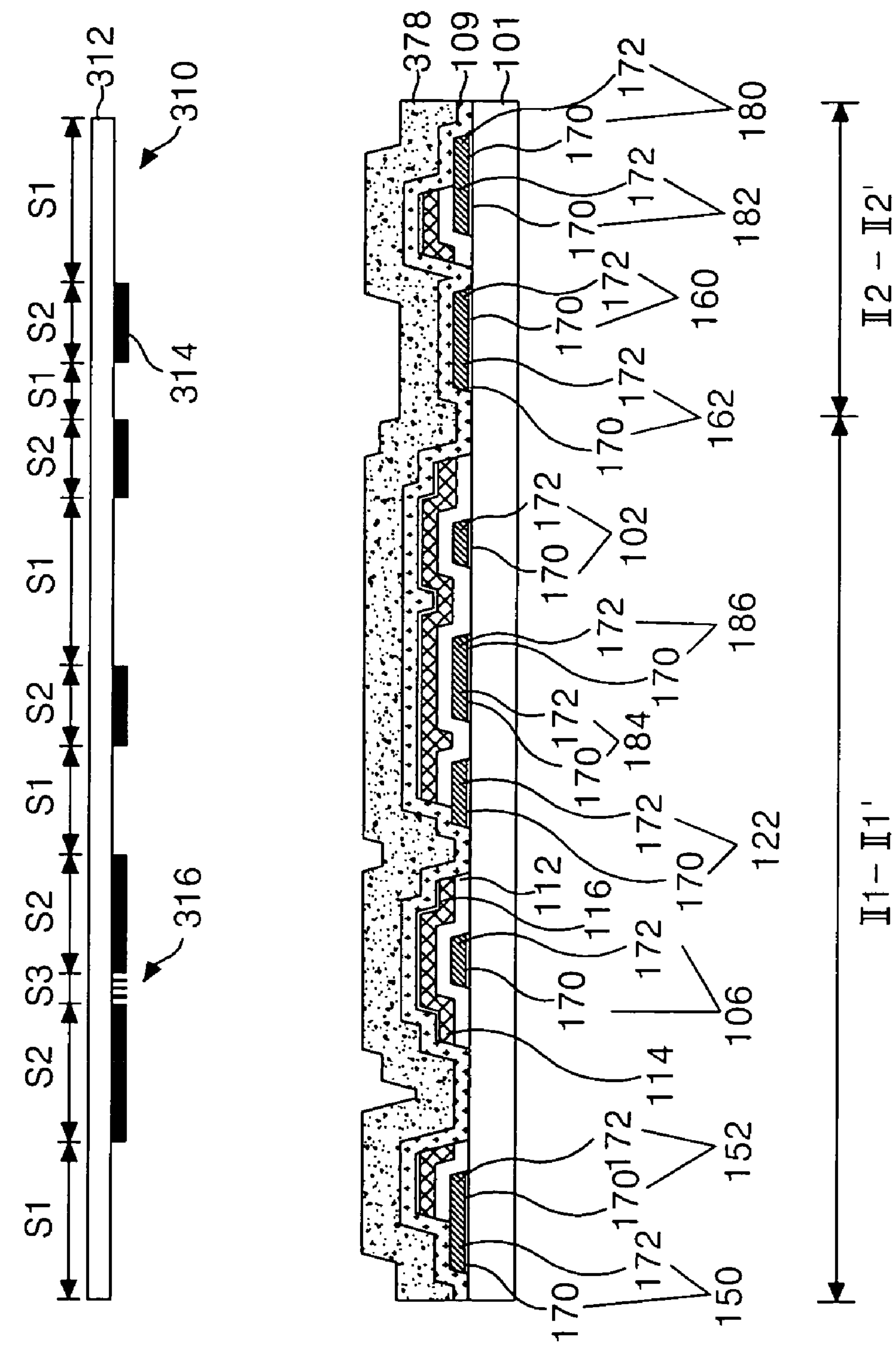
FIGS. 10A to 10E illustrate sectional views specifically describing the third mask process in the method of fabricating the TFT array substrate according to the first embodiment of the present invention.

Referring to FIG. 10A, a data metal layer 109 may be formed on the lower substrate 101, the gate insulating pattern 112, and on the active and ohmic contact layers 114 and 116. In one aspect of the present invention, the data metal layer 109 may be formed using a deposition technique such as sputtering, or the like. In another aspect of the present invention, the data metal layer 109 may, for example, include a metal such as molybdenum (Mo), copper (Cu), or the like, or combinations thereof.

A second photo-resist film 378 is then formed over the entire surface of the data metal layer 109 and is photolithographically patterned using a third mask pattern 310. According to principles of the present invention, the third mask pattern 310 is provided as a partial-exposure mask. For example, the third mask pattern 310 may include a mask substrate 302 formed of a suitably transparent material, a plurality of shielding parts 314 within shielding areas S2 on the mask substrate 312, and a partial-exposure part (e.g., a diffractive part or transflective part) 316 within a partial-exposure area S3 on the mask substrate 312. It should be noted that areas of the mask 312 that do not support a shielding or partial-exposure parts are referred to as exposure areas S1.

Figure 10B:
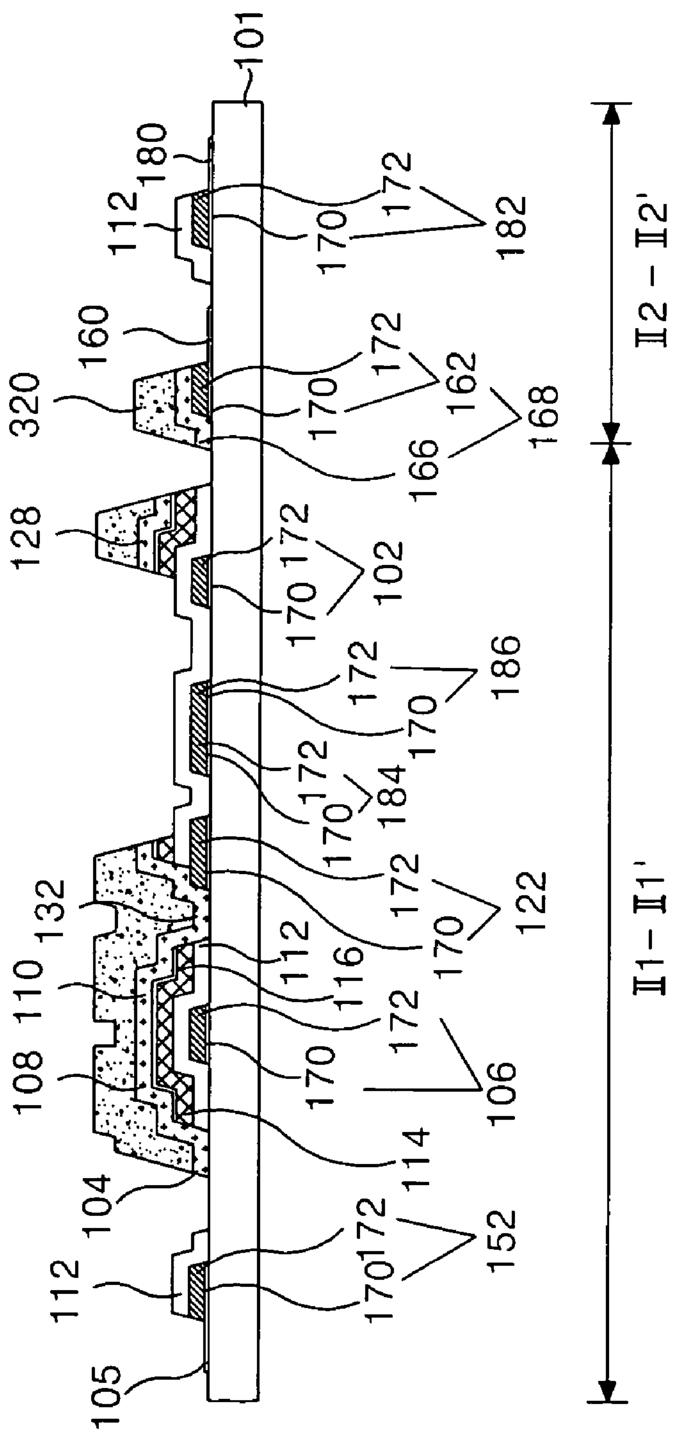

Referring to FIG. 10B, the second photo-resist film 378 may, via the third mask pattern 310, be selectively exposed to light through the exposure areas S1 and developed, thereby creating a second photo-resist pattern 320 having a step difference between the shielding and partial-exposure areas S2 and S3. Accordingly, the height of the second photo-resist pattern 320 within the partial-exposure area S3 may be lower than the height of the second photo-resist pattern 320 within the shielding areas S2.

Subsequently, the second photo-resist pattern 320 is used as a mask to pattern the data metal layer 109 in a wet etching technique and form the aforementioned second conductive pattern group (i.e., the storage electrode 128, the data line 104, the source electrode 108, the drain electrode 110, and the upper data link electrode 166) wherein the source and drain electrodes 108 and 110 are connected to each other in a region corresponding to partial-exposure area S3 (i.e., the channel region of a subsequently formed TFT 130), wherein the source electrode 108 is connected to one side of the data line 104, and wherein the upper data link electrode 166 is connected to another side of the data line 104. Using the gate insulating pattern 112 as a mask, portions of the gate metal material 172 included within the data pad 160, the gate pad 150, and the common pad 180 and beneath the second conductive pattern group are removed. Next, the second photo-resist pattern 320 is used as a mask to pattern the active and ohmic contact layers 114 and 116 in a dry etching process. In one aspect of the present invention, the patterning may, for example, include removing portions of the active and ohmic contact layers 114 and 116 that are not overlapped by the second conductive pattern group. In another aspect of the present invention, the patterning may, for example, include dry etching portions of the active and ohmic contact layers 114 and 116 positioned between the gate line 102 and the common line 186 to prevent electrical shorting between adjacent cells.

Figure 10C:
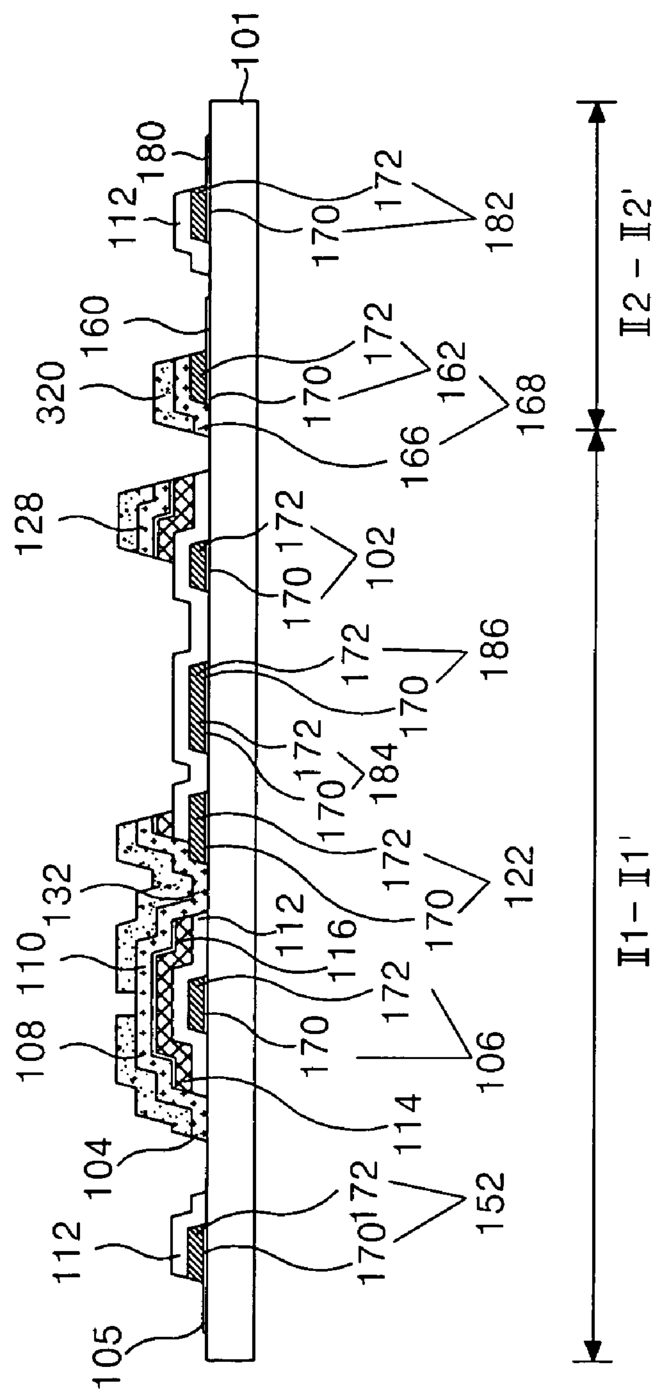
Figure 10D:
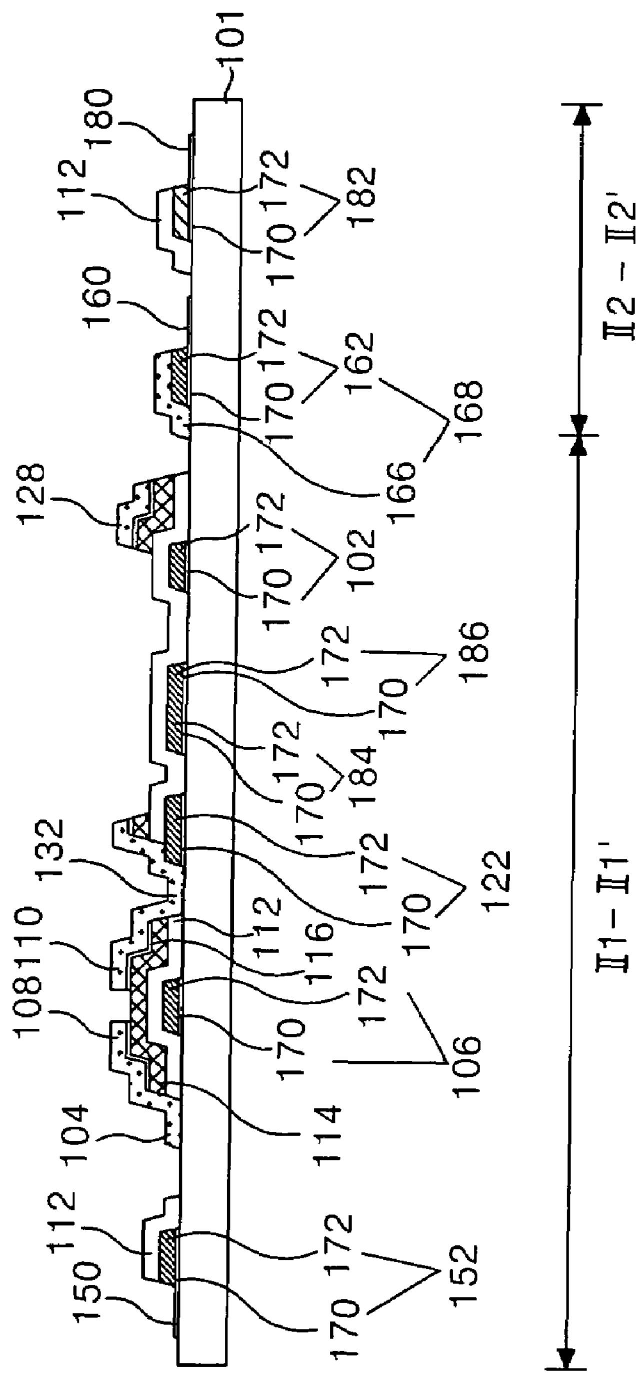

Referring to FIG. 10C, after the active and ohmic contact layers 114 and 116 are formed and patterned, the portion of the second photo-resist pattern 320 having the relatively lower height (i.e., the portion of the second photo-resist pattern 320 arranged within the channel region of the subsequently formed TFT 130, formed via the partial-exposure area S3 of the third mask pattern 310) is removed in an ashing process using oxygen ($O_2$) plasma. Upon performing the ashing process, the relatively thicker portions of the second photo-resist pattern 320 (i.e., portions of the second photo-resist pattern 320 arranged outside the channel region of the subsequently formed TFT 130, formed via the shielding areas S2) are thinned but, nevertheless, remain. Using the thinned second photo-resist pattern 320 as a mask, portions of the data metal layer 109 and the ohmic contact layer 116 in the channel portion of the subsequently formed TFT 130 are removed in an etching process. As a result, the active layer 114 within the channel portion is exposed and the source electrode 108 is disconnected from the drain electrode 110. With reference to FIG. 10D, the remaining second photo-resist pattern 320 is then removed in a stripping process.

Figure 10E:
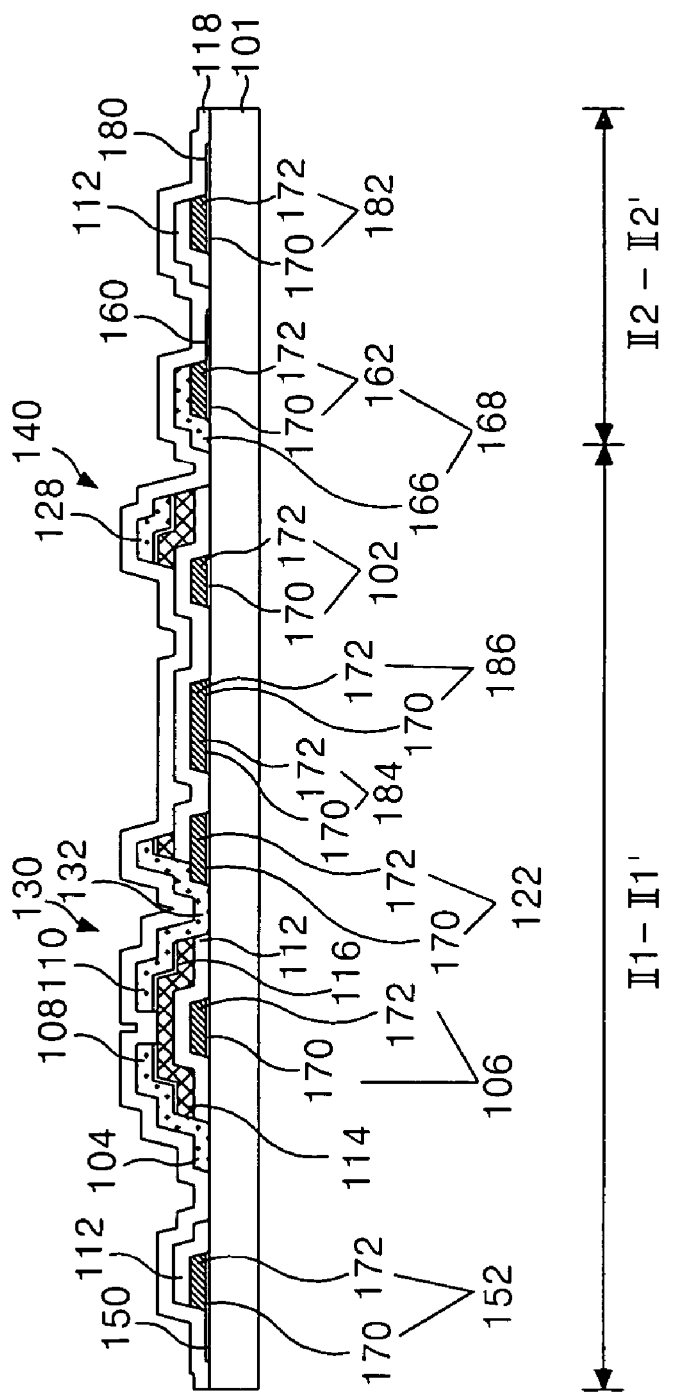

Referring next to FIG. 10E, the protective film 118 is formed over the entire surface of the substrate 101 and on the second conductive pattern group. In one aspect of the present invention, the protective film 118 may, for example, include an inorganic insulating material such as silicon nitride ($SiN_x$), silicon oxide ($SiO_x$), or the like, or combinations thereof, an organic insulating material such as acrylic organic compound having a small dielectric constant, BCB (benzocyclobutene), or PFCB (perfluorocyclobutane), or the like, or combinations thereof.

Figure 11:
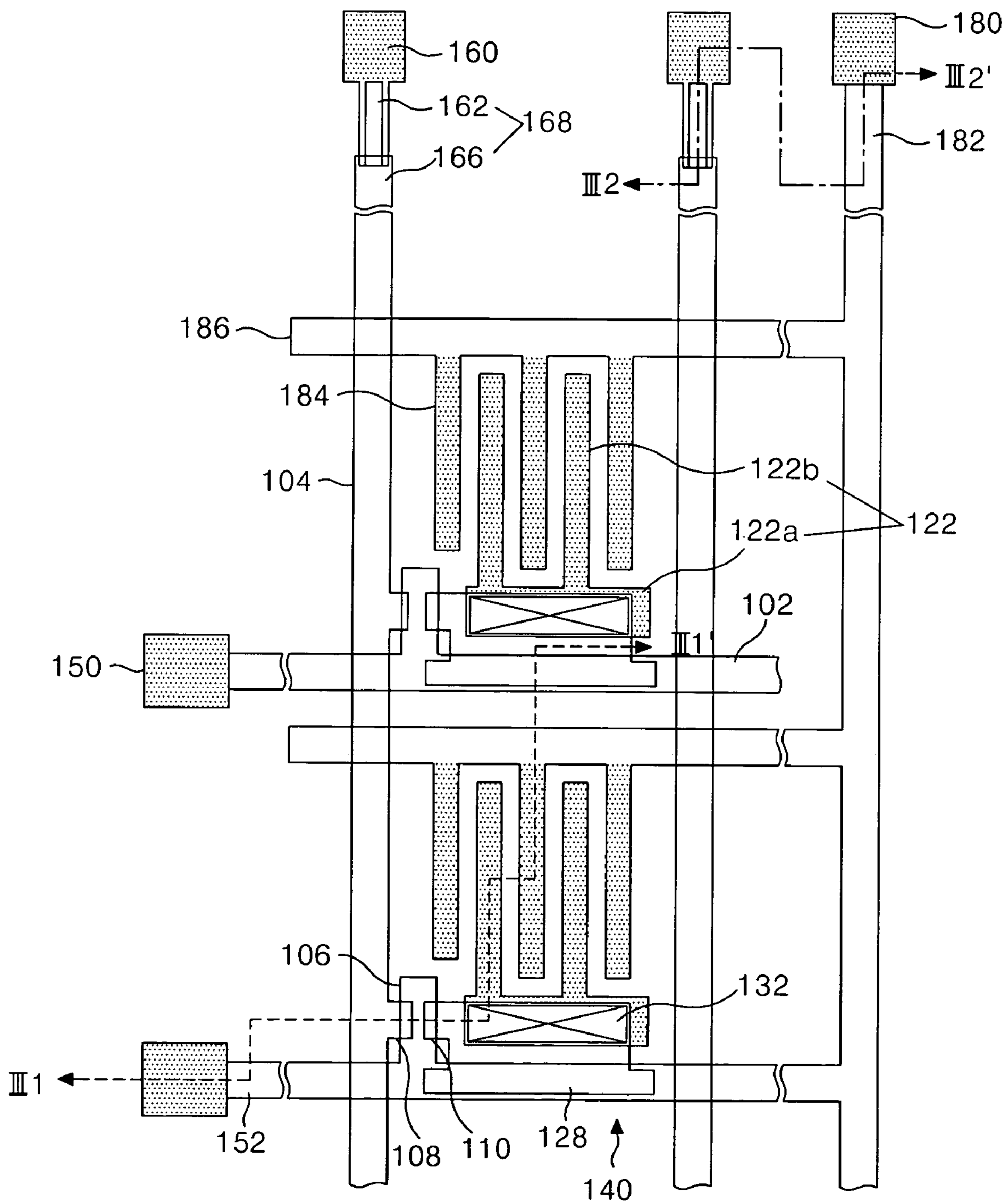
FIG. 11 illustrates a plan view of a TFT array substrate in an IPS mode LCD device according to a second embodiment of the present invention.
Figure 12:
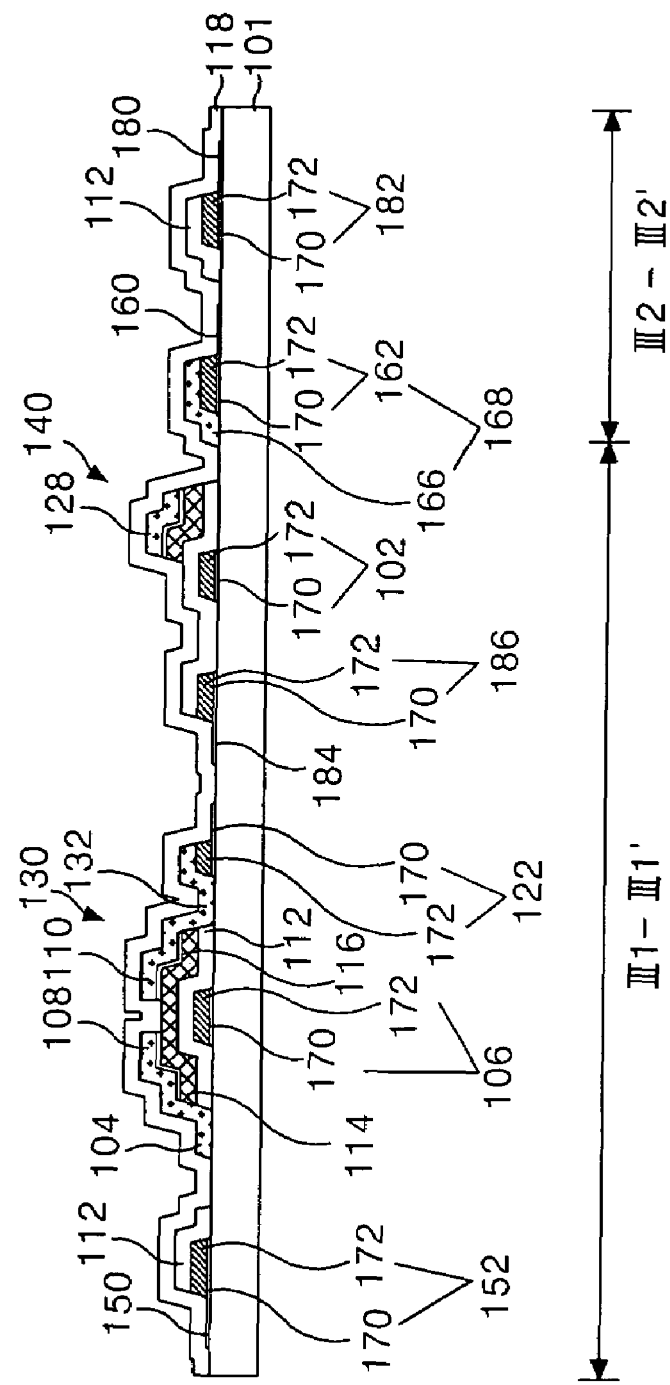
FIG. 12 illustrates a sectional view of the TFT array substrate taken along lines III1-III1' and III2-III2' shown in FIG. 11.

FIG. 11 illustrates a plan view of a TFT array substrate in an IPS mode LCD device according to a second embodiment of the present invention. FIG. 12 illustrates a sectional view of the TFT array substrate taken along lines III1-III1' and III2-III2' shown in FIG. 11.

The TFT array substrate shown in FIGS. 11 and 12, and method of fabricating the same, is, in many respects, similar to the TFT array substrate shown in FIGS. 4 and 5 but is different with respect to the pixel and common electrodes. Thus, for the sake of brevity, a detailed explanation of elements similar to both the second and first embodiments will be omitted.

Referring to FIGS. 11 and 12, the storage electrode 128 is an integral extension of the drain electrode 110. Accordingly, the pixel electrode 122 is electrically connected to both the drain and storage electrodes 110 and 128 via a first contact hole 132. In one aspect of the present invention, the pixel electrode 122 may, for example, include a pixel horizontal part 122*a* extending from, and overlapping with, the drain electrode 110, parallel to an adjacent gate line 102, and a plurality of pixel finger parts 122*b* oriented substantially perpendicularly with respect to the pixel horizontal part 122*a*. In another aspect of the present invention, a portion of the pixel electrode 122 that overlaps with the drain electrode 110 may comprise a transparent conductive material 170 and a gate metal material 172 formed on the transparent conductive material 170 while a portion of the pixel electrode 122 not overlapping the drain electrode 110 may comprise only the transparent conductive material 170.

In still another aspect of the present invention, the first contact hole 132 may be formed through the gate insulating pattern 112, the active layer 114, and the ohmic contact layer 116 to expose the pixel electrode 122.

The common electrode 184 may be connected to a common line 186. Similar to the pixel electrode 122, the common electrode 184 may comprise a portion of the transparent conductive material 170 extending from the common line 186.

Similar to the first embodiment, portions of the coplanar transparent conductive material 170 comprised within the gate pad 150, the data pad 160, the common pad 180, and the pixel electrode 122 are exposed to ensure high reliability against corrosion.

Figure 13A:
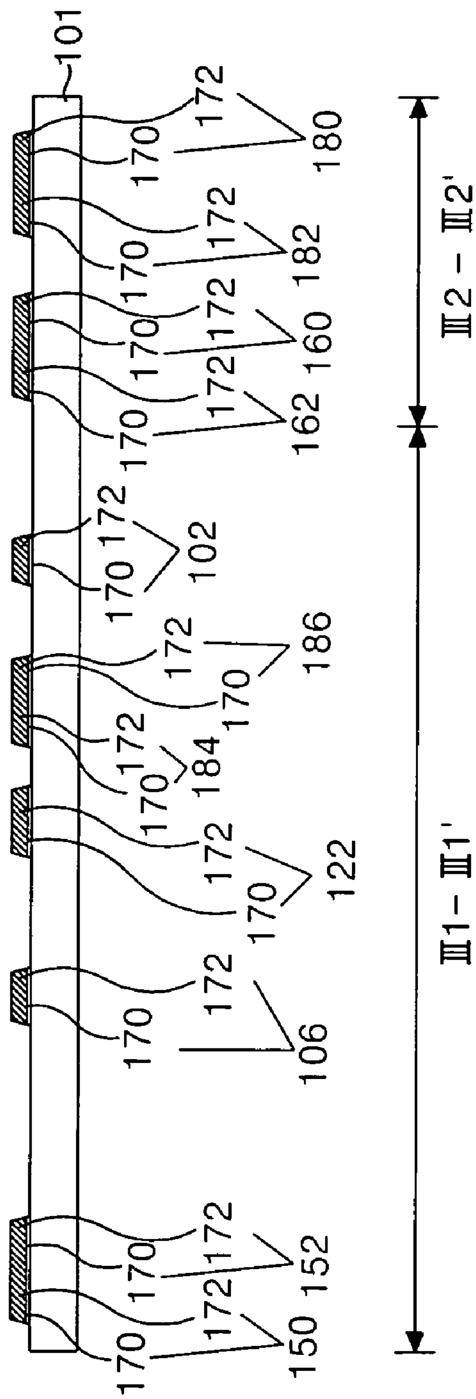
FIGS. 13A to 13B illustrate sectional views generally describing a method of fabricating the TFT array substrate according to the second embodiment of the present invention.
Figure 13B:
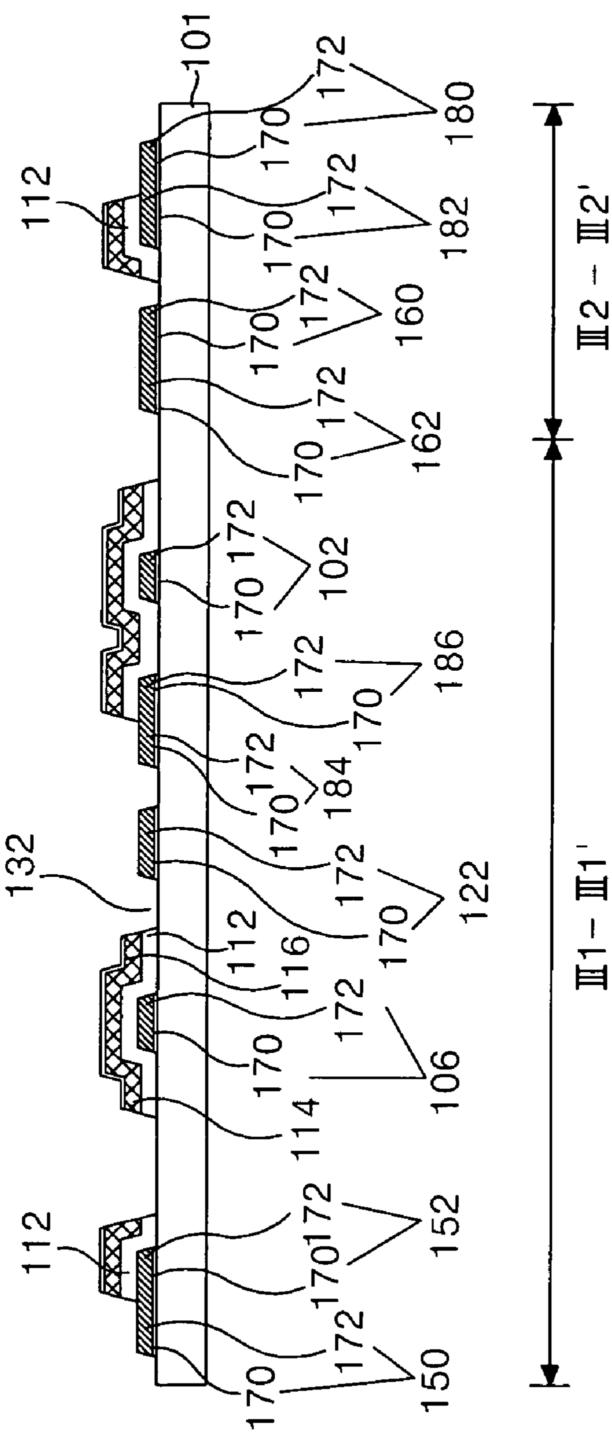

FIGS. 13A to 13B illustrate sectional views generally describing a method of fabricating the TFT array substrate according to the second embodiment of the present invention.

Referring to FIG. 13A, a first conductive pattern group may be formed on the lower substrate 101 in a first mask process. In one aspect of the present invention, the first conductive pattern group may, for example, include the pixel electrode 122, the gate line 102, the gate electrode 106, the gate link 152, the gate pad 150, the data pad 160, the lower data link electrode 162, the common electrode 184, the common line 186, the common link 182, and the common pad 180. In another aspect of the present invention, the first conductive pattern group may comprise a transparent conductive material 170 and an overlaying gate metal material 172.

Referring to FIG. 13B, a gate insulating pattern 112 and semiconductor patterns, comprised of the active and ohmic contact layers 114 and 116, are formed on the lower substrate 101 and on the first conductive pattern group in a second mask process. Accordingly, the gate insulating pattern 112 and the active and ohmic contact layers 114 and 116 formed to expose the gate pad 150, the data pad 160, the common pad 180, the common electrode 184, and the pixel electrode 122.

The second mask process of the second embodiment described above with respect to FIGS. 13A and 13B will now be described in greater detail with respect to FIGS. 14A to 14C.

Figure 14A:
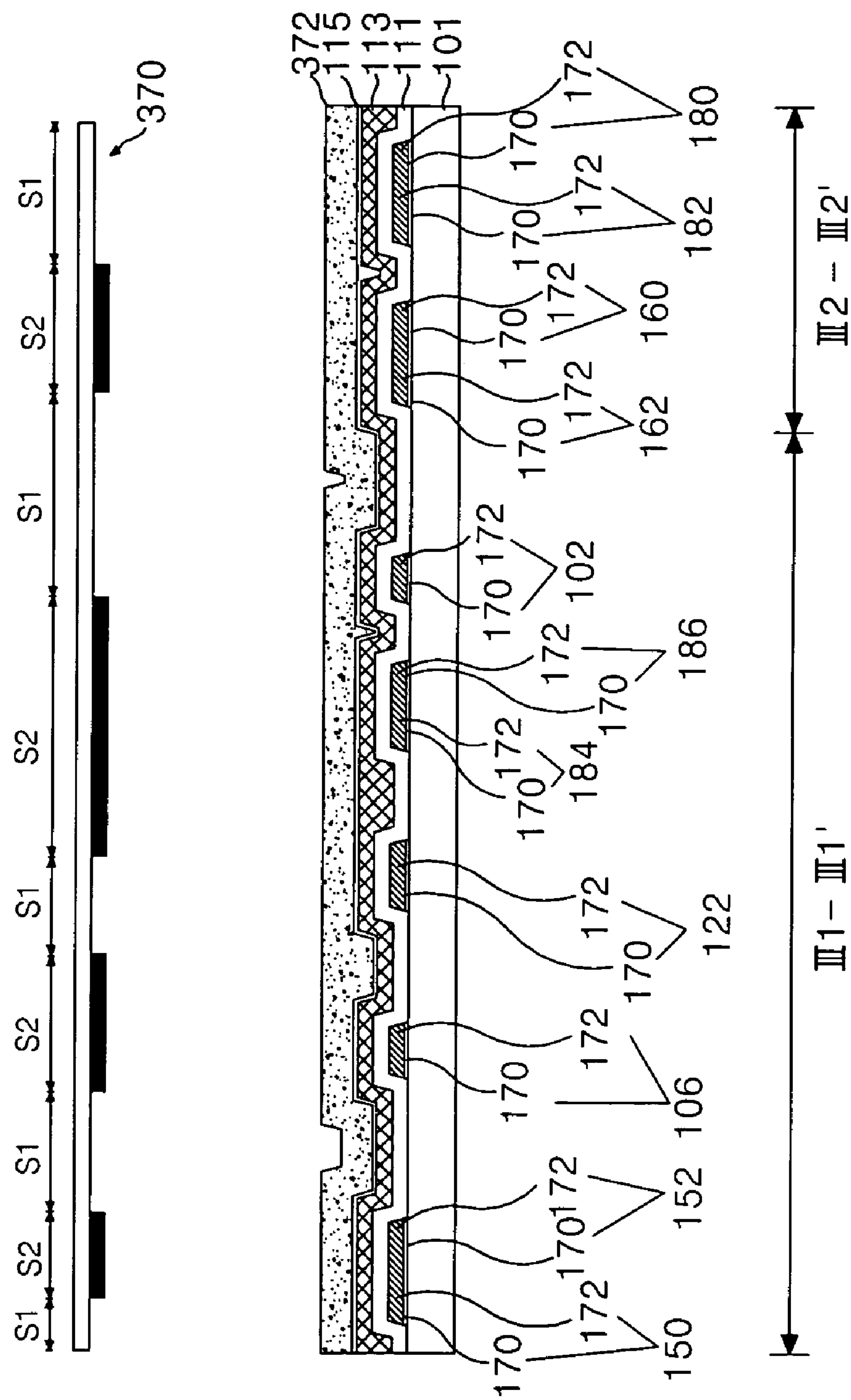
FIGS. 14A to 14C illustrate sectional views specifically describing a second mask process in the method of fabricating the TFT array substrate according to the second embodiment of the present invention.

Referring to FIG. 14A, the gate insulating film 111, the first semiconductor layer 113, and second semiconductor layer 115 may be sequentially formed on the lower substrate 101 and on the first conductive pattern group. A first photo-resist film 372 is then formed over the entire surface of the second semiconductor layer 115 and is photolithographically patterned using a second mask pattern 370. According to principles of the present invention, the second mask pattern 370 may, for example, include a mask substrate defining a plurality of exposure areas S1 and a plurality of shielding areas S2.

Figure 14B:
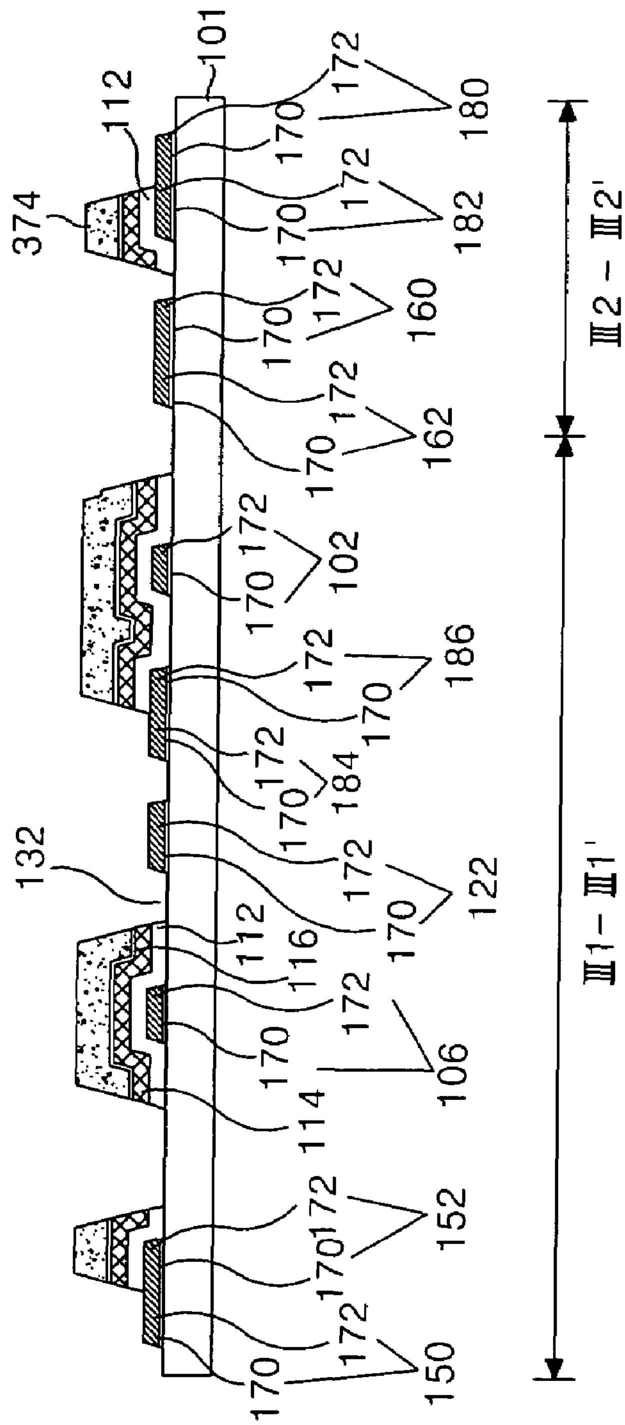
Figure 14C:
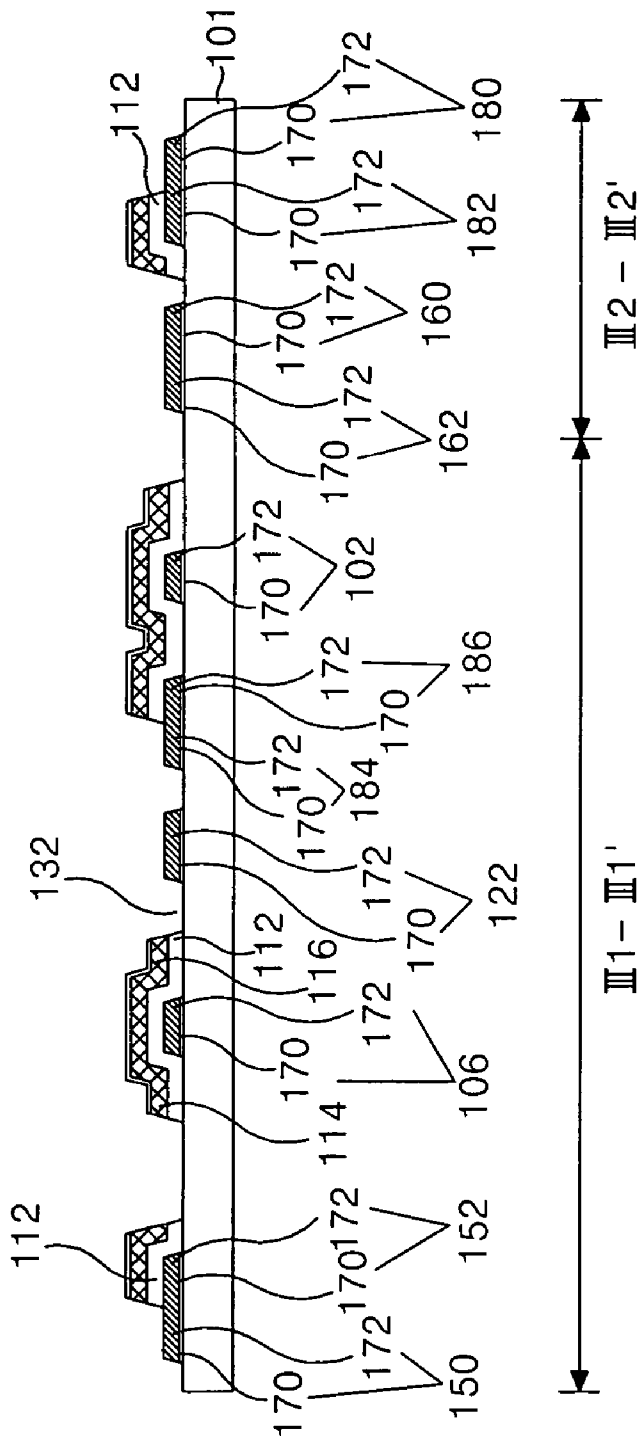

Referring to FIG. 14B, the first photo-resist film 372 may, via the second mask pattern 370, be selectively exposed to light and developed, thereby creating a first photo-resist pattern 374. The gate insulating film 111 and the first and second semiconductor layers 113 and 115 may then be patterned, via the first photo-resist pattern 374, using photolithographic and etching techniques to form the gate insulating pattern 112, through which the first contact hole 132 is formed, in addition to the semiconductor patterns including the active and ohmic contact layers 114 and 116. After forming the gate insulating pattern 112 and the active and ohmic contact layers 114 and 116, the first photo-resist pattern 374 is stripped. As a result of the second mask process, and with reference to FIG. 14C, the gate pad 150, the data pad 160, the common pad 180, the pixel electrode 122, the common electrode 184, and the lower data link electrode 162, are exposed by the gate insulating pattern 112 and the active and ohmic contact layers 114 and 116.

FIGS. 15A to 15E illustrate sectional views specifically describing a third mask process in the method of fabricating the TFT array substrate according to the second embodiment of the present invention.

Referring generally to FIGS. 15A-15E, a second conductive pattern group may be formed on the lower substrate 101 and on the gate insulating pattern 112, in addition to the active and ohmic contact layers 114 and 116, in a third mask process. In one aspect of the present invention, the second conductive pattern group may, for example, include the data line 104, the source electrode 108, the drain electrode 110, the storage electrode 128, and the upper data link electrode 166. In another aspect of the present invention, portions of the gate metal material 172 included within the data pad 160, the gate pad 150, the common pad 180, the pixel electrode 122, and the common electrode 184 may, during the third mask process, be removed to expose the transparent conductive material 170 included therein.

The third mask process of the second embodiment described above will now be described in greater detail with reference to FIGS. 15A to 15E.

Figure 15A:
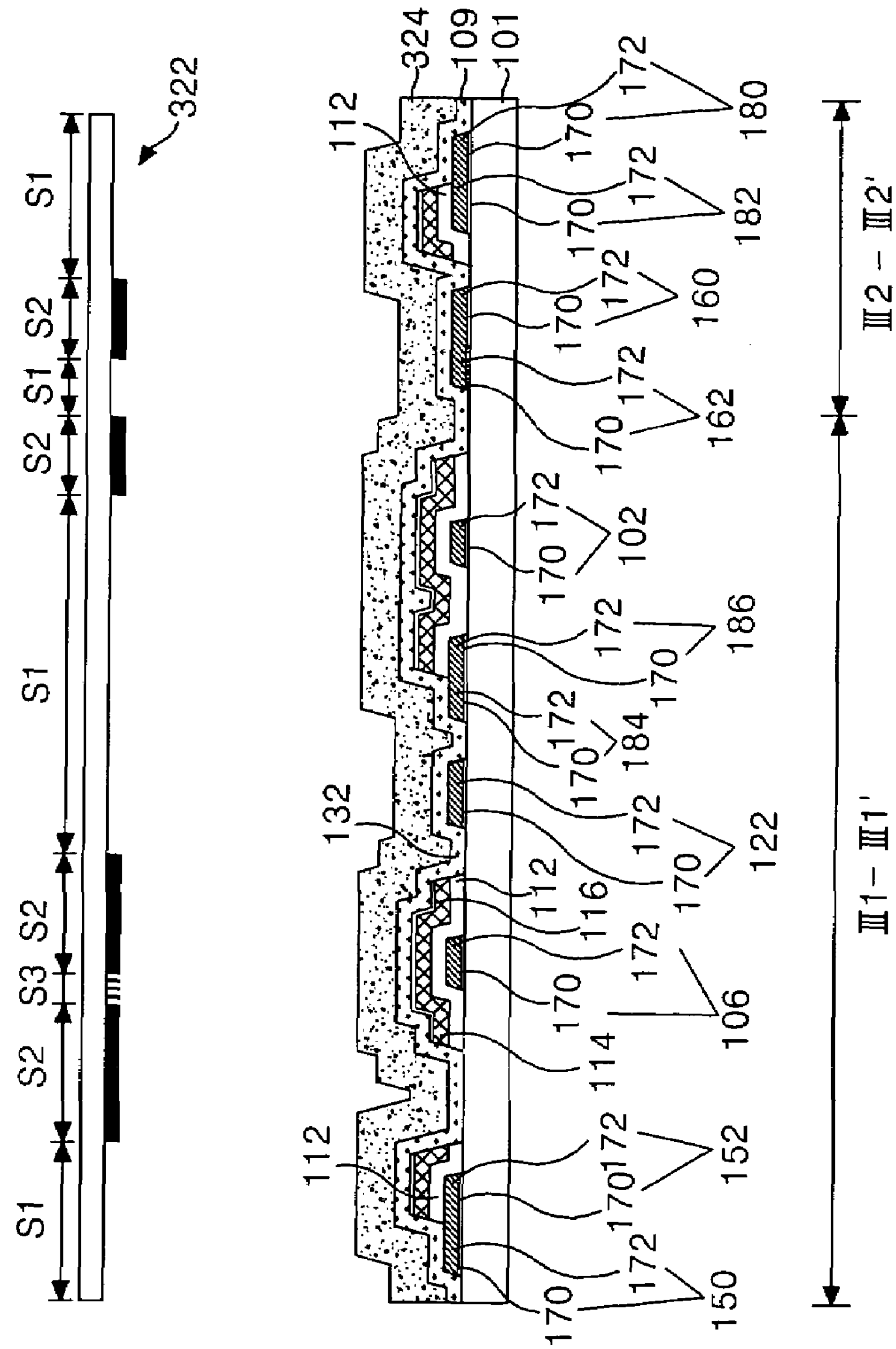
FIGS. 15A to 15E illustrate sectional views specifically describing a third mask process in the method of fabricating the TFT array substrate according to the second embodiment of the present invention.

Referring to FIG. 15A, a data metal layer 109 may be formed on the lower substrate 101, the gate insulating pattern 112, and on the active and ohmic contact layers 114 and 116. In one aspect of the present invention, the data metal layer 109 may be formed using a deposition technique such as sputtering, or the like. In another aspect of the present invention, the data metal layer 109 may, for example, include a metal such as molybdenum (Mo), copper (Cu), or the like, or combinations thereof.

A second photo-resist film 324 is then formed over the entire surface of the data metal layer 109 and is photolithographically patterned using a third mask pattern 322. For example, the third mask pattern 332 may be provided as a partial-exposure mask and include a mask substrate formed of a suitably transparent material, a plurality exposure areas S1, a plurality of shielding areas S2, and a partial-exposure area S3.

Figure 15B:
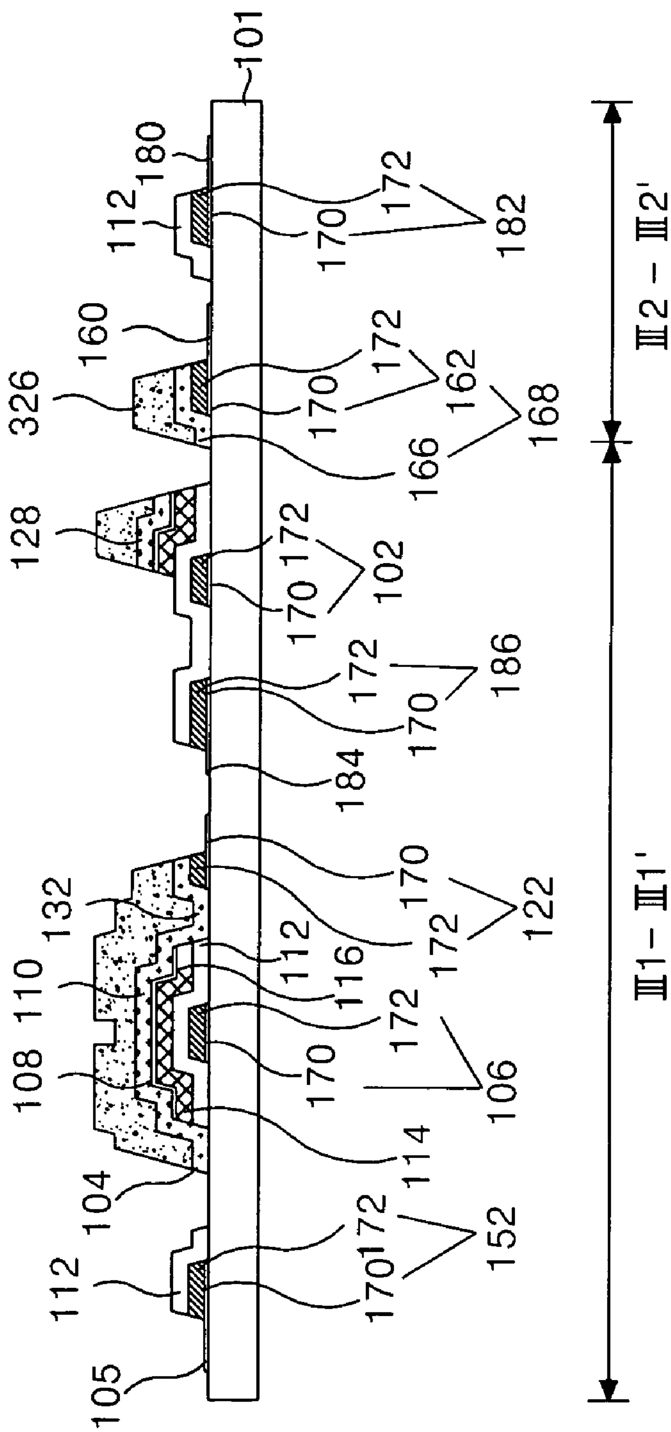

Referring to FIG. 15B, the second photo-resist film 324 may, via the third mask pattern 322, be selectively exposed to light and developed, thereby creating a second photo-resist pattern 326 having a step difference between the shielding and partial-exposure areas S2 and S3. Accordingly, the height of the second photo-resist pattern 326 within the partial-exposure area S3 may be lower than the height of the second photo-resist pattern 326 within the shielding areas S2.

Subsequently, the second photo-resist pattern 326 is used as a mask to pattern the data metal layer 109 in a wet etching technique and form the aforementioned second conductive pattern group (i.e., the storage electrode 128, the data line 104, the source electrode 108, the drain electrode 110, and the upper data link electrode 166) wherein the source and drain electrodes 108 and 110 are connected to each other in a region corresponding to partial-exposure area S3 (i.e., the channel region of a subsequently formed TFT 130), wherein the source electrode 108 is connected to one side of the data line 104, and wherein the upper data link electrode 166 is connected to another side of the data line 104. Using the second conductive pattern group and the gate insulating pattern 112 as a mask, portions of the gate metal material 172 included within the data pad 160, the gate pad 150, the common pad 180, the pixel electrode 122 and the common electrode 184 are removed to expose the transparent conductive material 170 included therein.

Next, the second photo-resist pattern 326 is used as a mask to pattern the active and ohmic contact layers 114 and 116 in a dry etching process. The patterning may, for example, include dry etching portions of the active and ohmic contact layers 114 and 116 that are not overlapped by the second conductive pattern group.

Figure 15C:
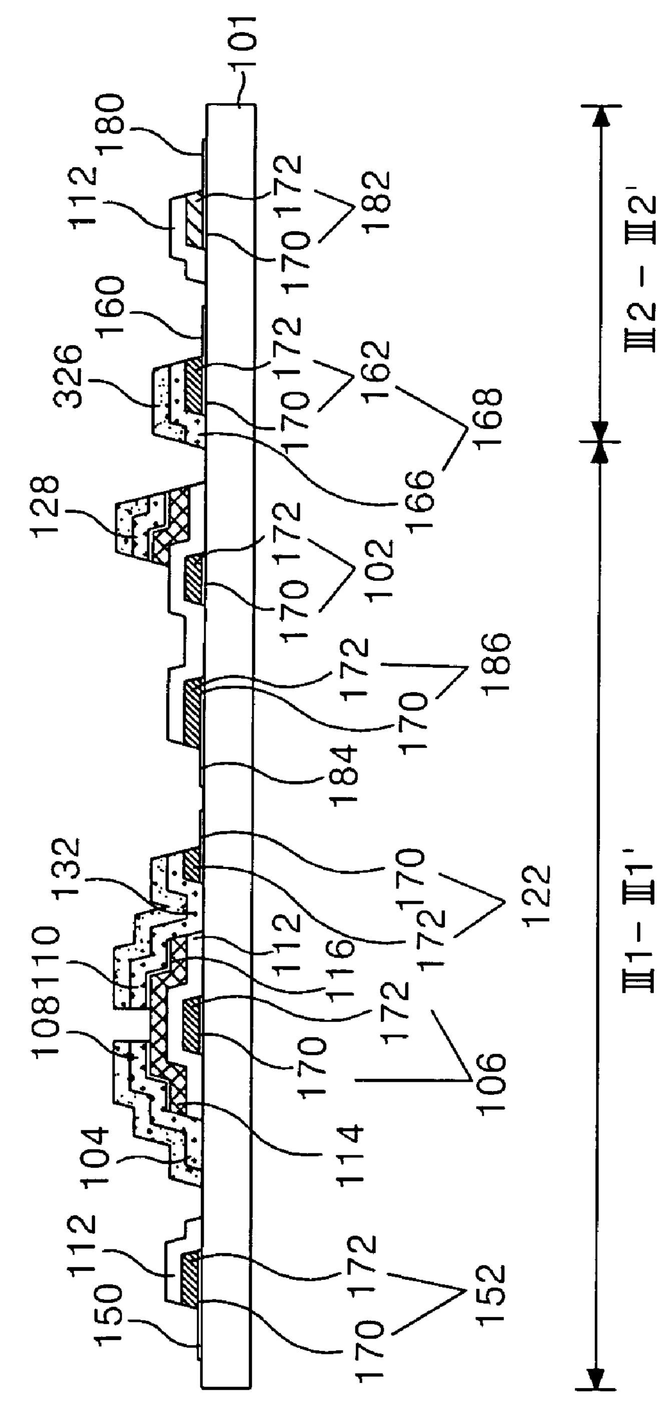
Figure 15D:
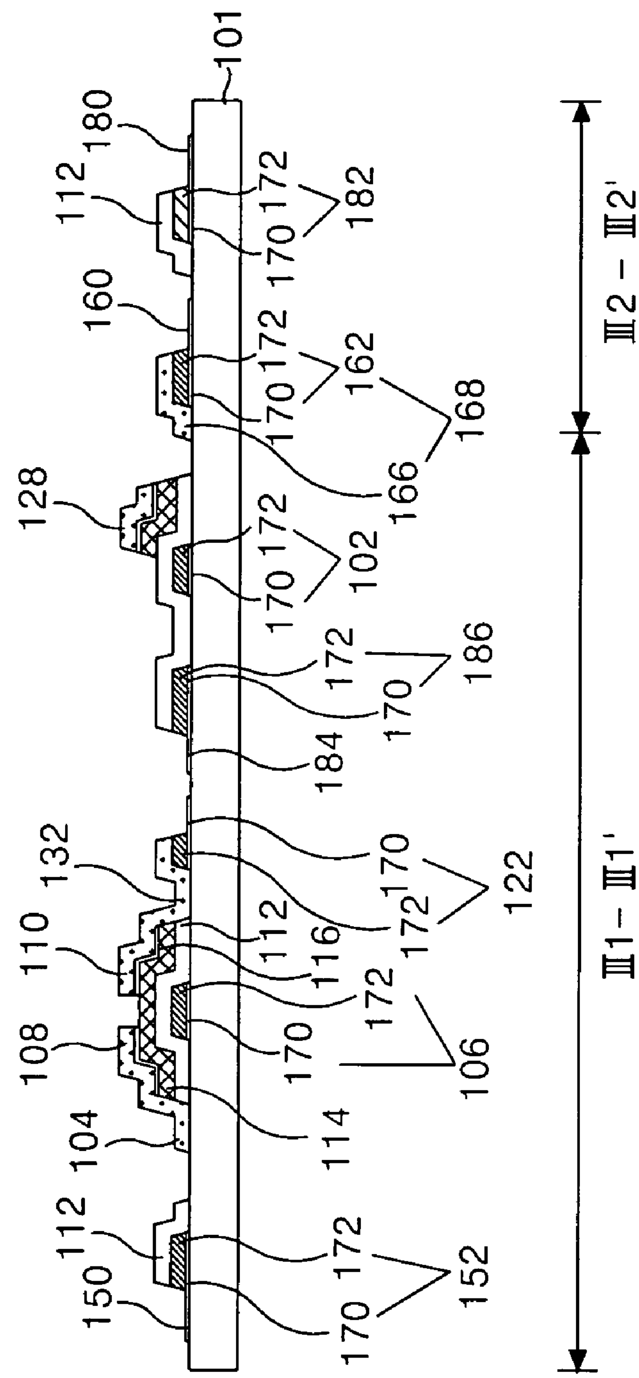

Referring to FIG. 15C, after the active and ohmic contact layers 114 and 116 are formed and patterned, the portion of the second photo-resist pattern 326 having the relatively lower height (i.e., the portion of the second photo-resist pattern 320 arranged within the channel region of the subsequently formed TFT 130, formed via the partial-exposure area S3 of the second mask pattern 310) is removed in an ashing process using oxygen ($O_2$) plasma. Upon performing the ashing process, the relatively thicker portions of the second photo-resist pattern 326 (i.e., portions of the second photo-resist pattern 326 arranged outside the channel region of the subsequently formed TFT 130, formed via the shielding areas S2) are thinned but, nevertheless, remain. Using the thinned second photo-resist pattern 326 as a mask, portions of the data metal layer 109 and the ohmic contact layer 116 in the channel portion of the subsequently formed TFT 130 are removed in an etching process. As a result, the active layer 114 within the channel portion is exposed and the source electrode 108 is disconnected from the drain electrode 110. With reference to FIG. 15D, the remaining second photo-resist pattern 326 is then removed in a stripping process.

Figure 15E:
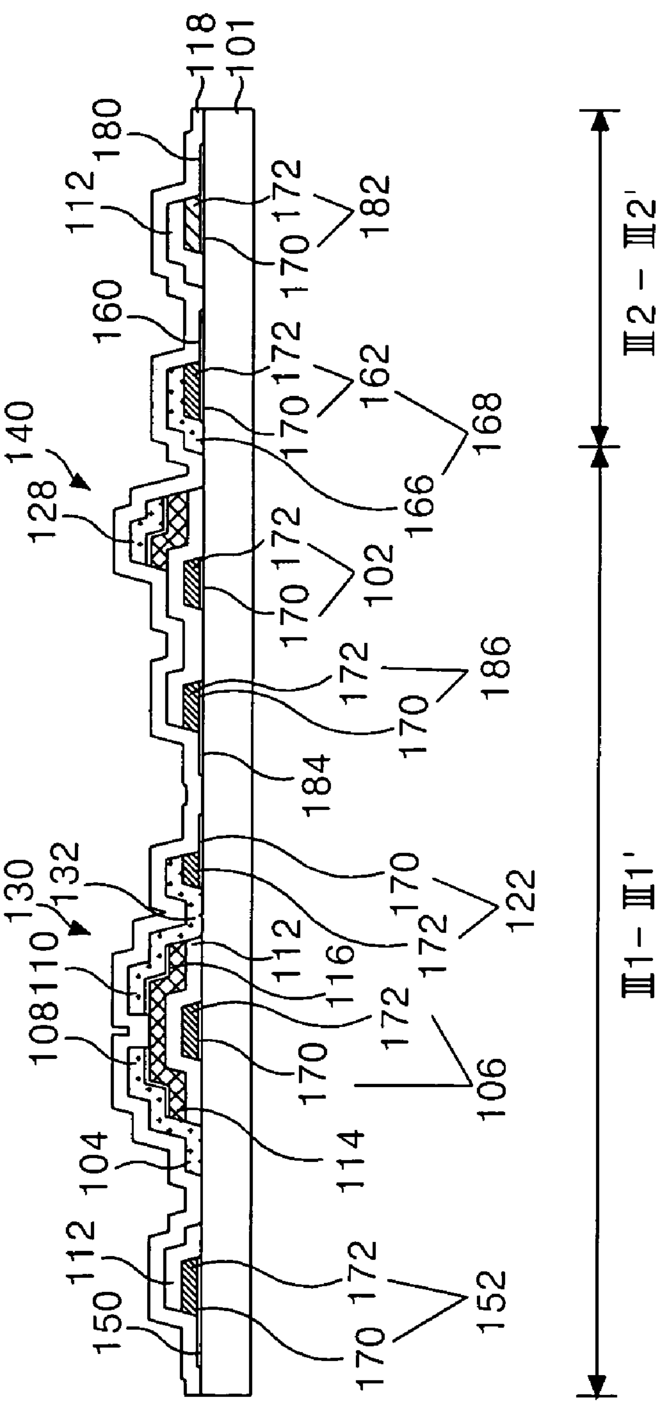

Referring next to FIG. 15E, the protective film 118 is formed over the entire surface of the substrate 101 and on the second conductive pattern group.

Figure 16:
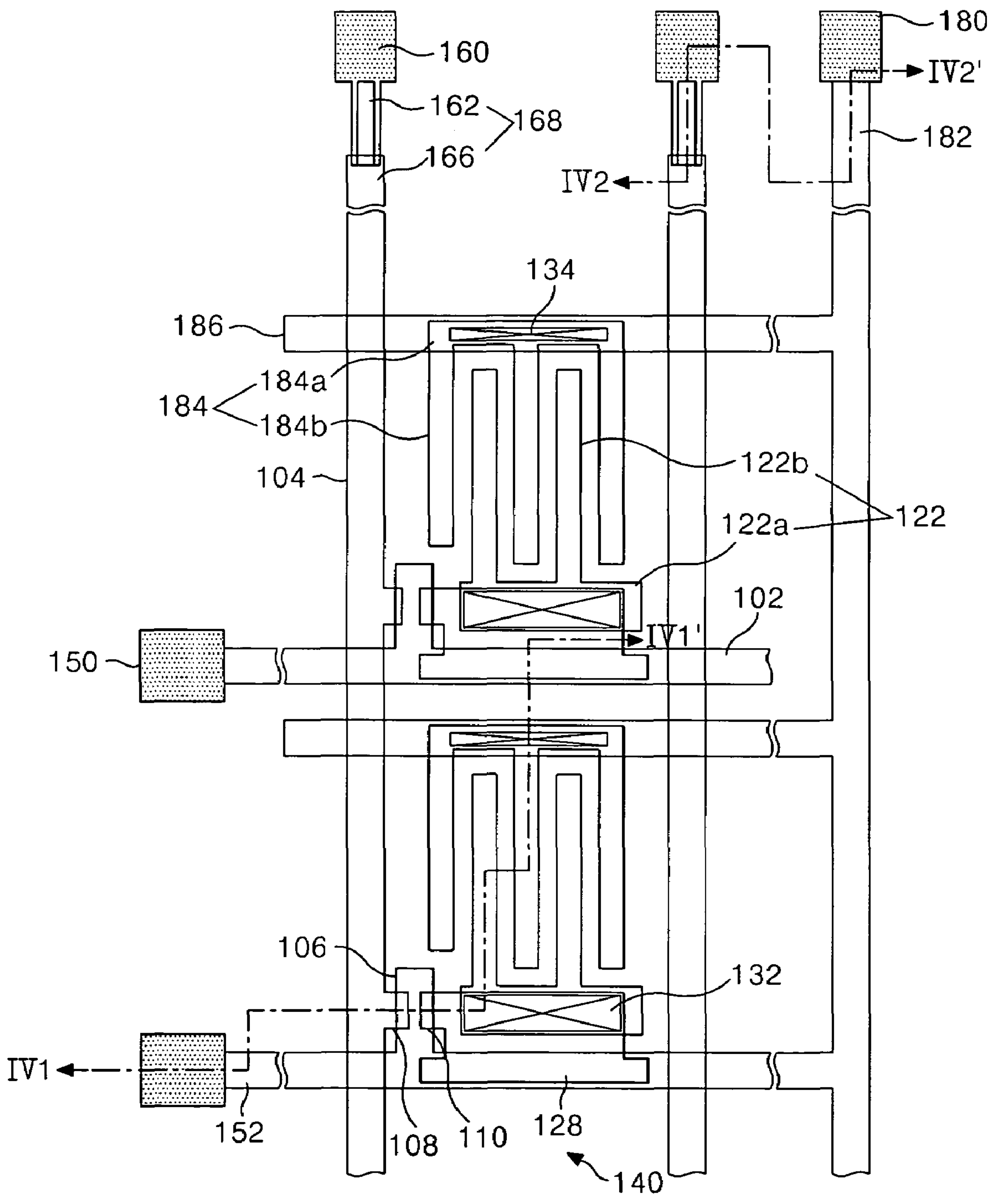
FIG. 16 illustrates a plan view of a TFT array substrate in an IPS mode LCD device according to a third embodiment of the present invention.
Figure 17:
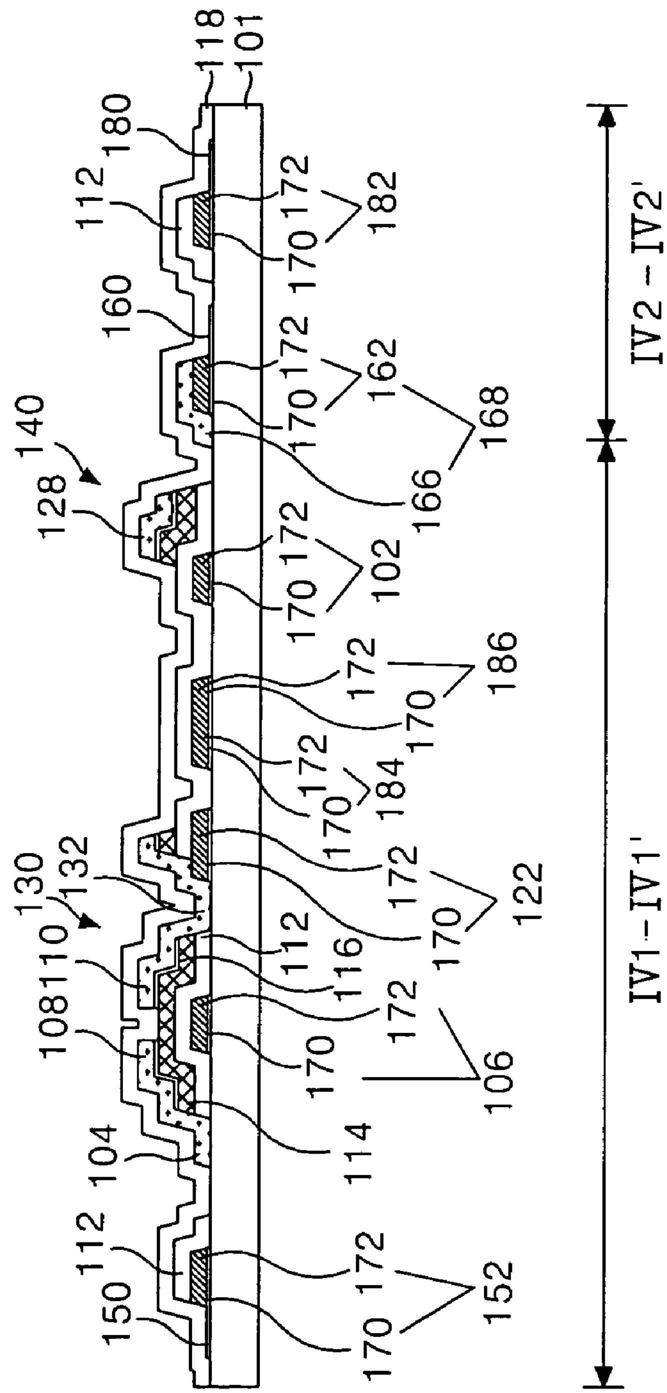
FIG. 17 illustrates a sectional view of the TFT array substrate taken along lines IV1-IV1' and IV2-IV2' shown in FIG. 16.

FIG. 16 illustrates a plan view of a TFT array substrate in an IPS mode LCD device according to a third embodiment of the present invention. FIG. 17 illustrates a sectional view of the TFT array substrate taken along lines IV1-IV1' and IV2-IV2' shown in FIG. 16.

The TFT array substrate shown in FIGS. 16 and 17, and method of fabricating the same, is, in many respects, similar to the TFT array substrate shown in FIGS. 4 and 5 but is different with respect to the common electrode. Thus, for the sake of brevity, a detailed explanation of elements similar to both the third and first embodiments will be omitted.

Referring to FIGS. 16 and 17, the common electrode 184 is connected to the common line 186 via a second contact hole 134. In one aspect of the present invention, the common electrode 184 may, for example, include a common horizontal part 184*a*, oriented parallel to the common line 186, and a plurality of common finger parts 184*b* oriented substantially perpendicularly with respect to the common horizontal part 184*a*. In another aspect of the present invention, the common electrode 184 may comprise a material from which the data metal layer 109 is formed (e.g., molybdenum (Mo), chrome (Cr), copper (Cu), or the like, or combinations thereof). In still another aspect of the present invention, the second contact hole 134 may be formed through the gate insulating pattern 112, the active layer 114, and the ohmic contact layer 116 to expose the common line 186.

During operation, a horizontal electric field may be generated between the pixel and common electrodes 122 and 184 when a pixel signal is supplied from TFT 130 to a pixel electrode 122 and when a reference voltage is supplied to the common electrode 184. For example, the horizontal electric field may be formed between the plurality of pixel finger parts 122*b* of the pixel electrode 122 and the plurality of common finger parts 184*b* of the common electrode 184. The liquid crystal molecules have a particular dielectric anisotropy. Therefore, in the presence of the electric field, liquid crystal molecules rotate to align themselves horizontally between the TFT and color filter array substrates. The magnitude of the applied electric field determines the extent of rotation of the liquid crystal molecules. Accordingly, gray scale levels may be displayed by a pixel area by varying the magnitude of the applied electric field.

According to principles of the present invention, the pixel electrode 122, the gate electrode 106, the gate line 102, the gate link 152, the lower data link electrode 162, the common electrode 184, the common line 186, and the common link 182 may, for example, comprise the transparent conductive material 170 and the overlaying gate metal material 172. As described above, portions of the transparent conductive material 170 comprised within the gate pad 150, the data pad 160, and the common pad 180 are exposed to ensure high reliability against corrosion.

Figure 18A:
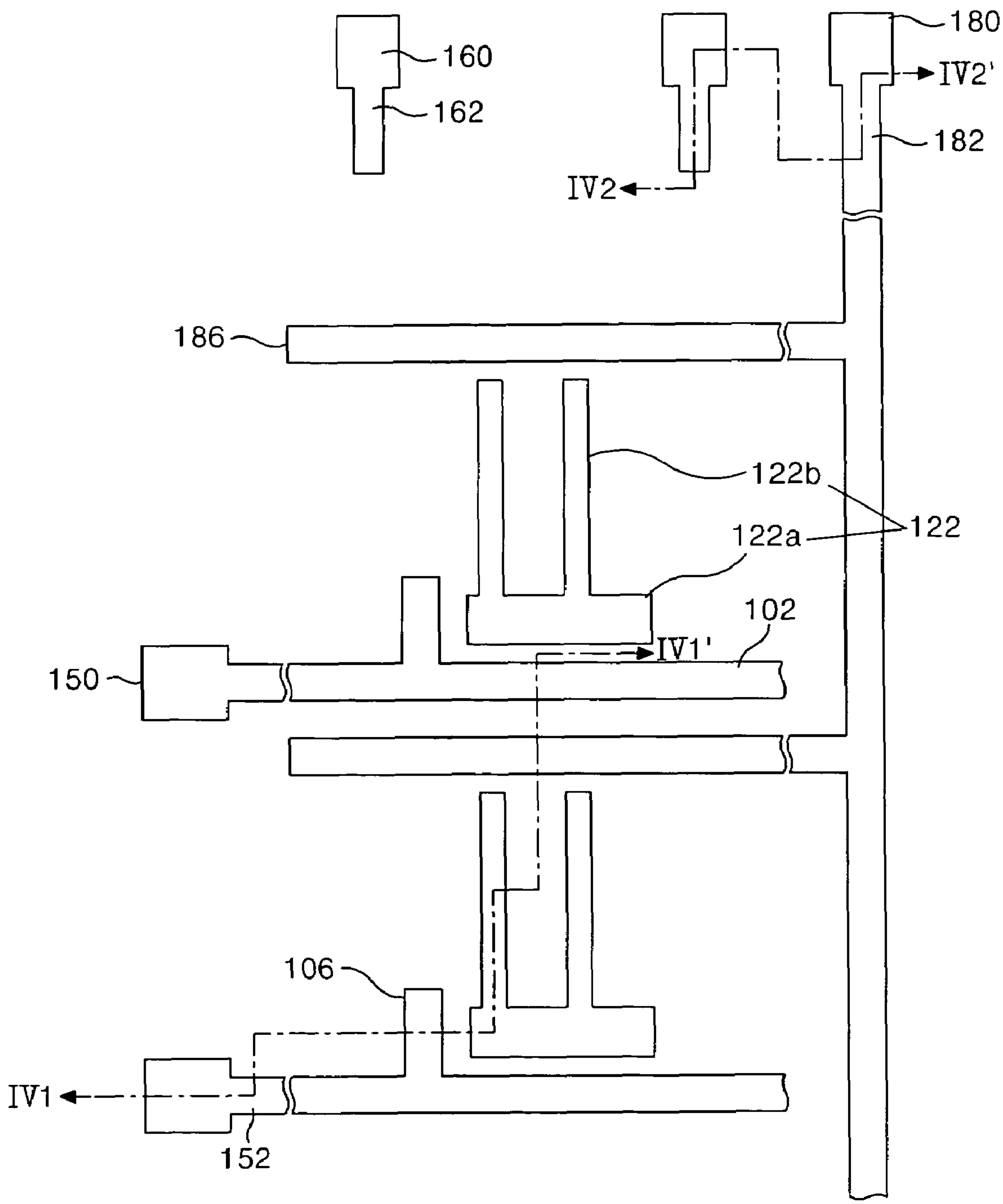
FIGS. 18A and 18B illustrate plan and sectional views, respectively, describing a first mask process in the method of fabricating the TFT array substrate according to the third embodiment of the present invention.
Figure 18B:
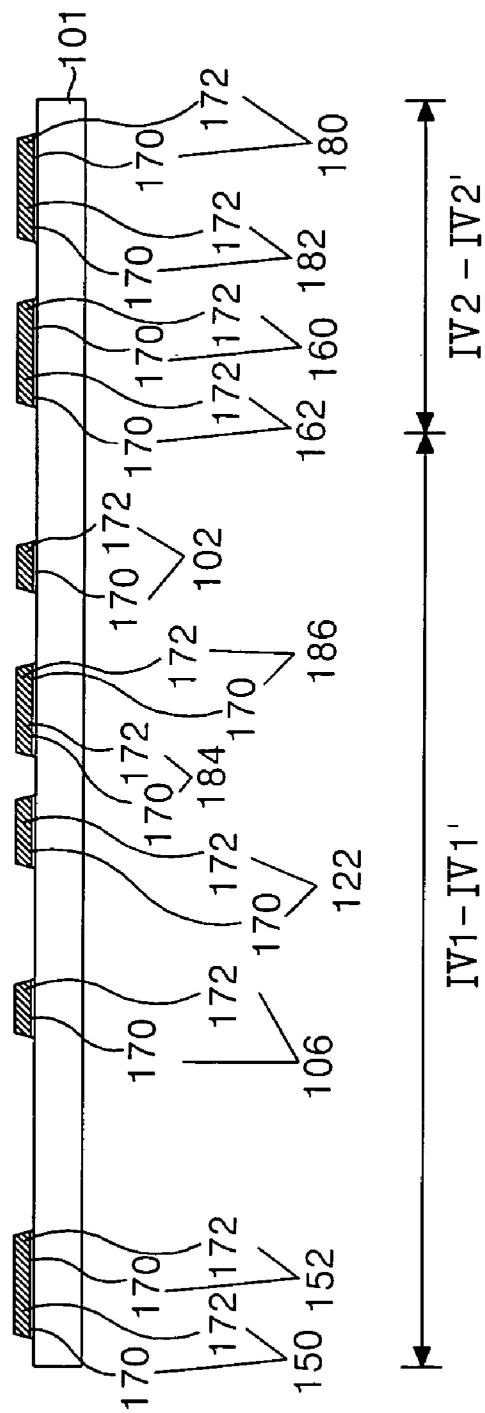

FIGS. 18A and 18B illustrate plan and sectional views, respectively, describing a first mask process in the method of fabricating the TFT array substrate according to the third embodiment of the present invention.

Referring to FIGS. 18A and 18B, a first conductive pattern group may be formed on the lower substrate 101 in a first mask process. In one aspect of the present invention, the first conductive line group may, for example, include the pixel electrode 122, the gate line 102, the gate electrode 106, the gate link 152, the gate pad 150, the data pad 160, the lower data link electrode 162, the common line 186, the common link 182, and the common pad 180. In another aspect of the present invention, the first conductive line pattern group may comprise a transparent conductive material 170 and an overlaying gate metal material 172.

Figure 19A:
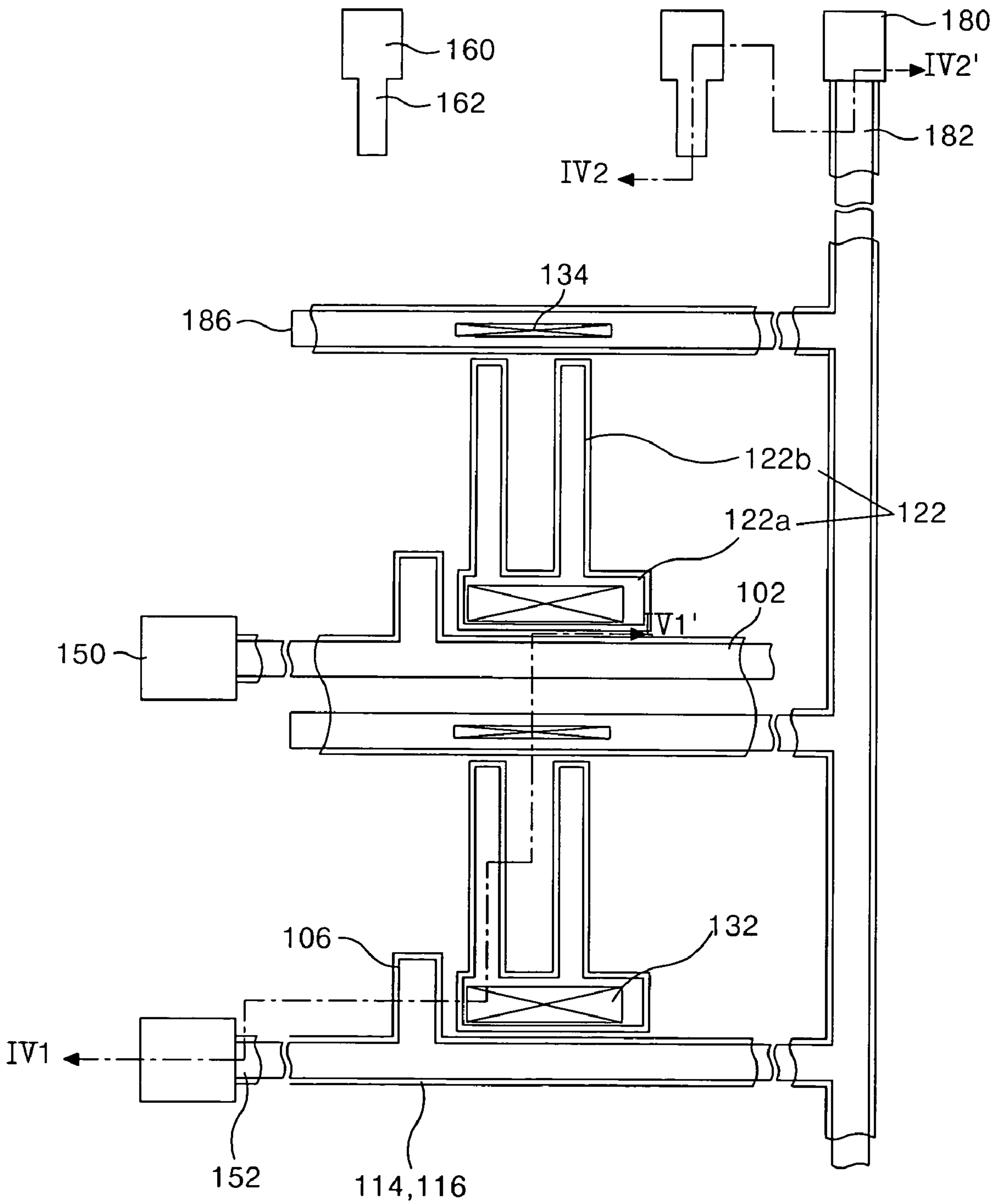
FIGS. 19A and 19B illustrate plan and sectional views, respectively, generally describing a second mask process in the method of fabricating the TFT array substrate according to the third embodiment of the present invention.
Figure 19B:
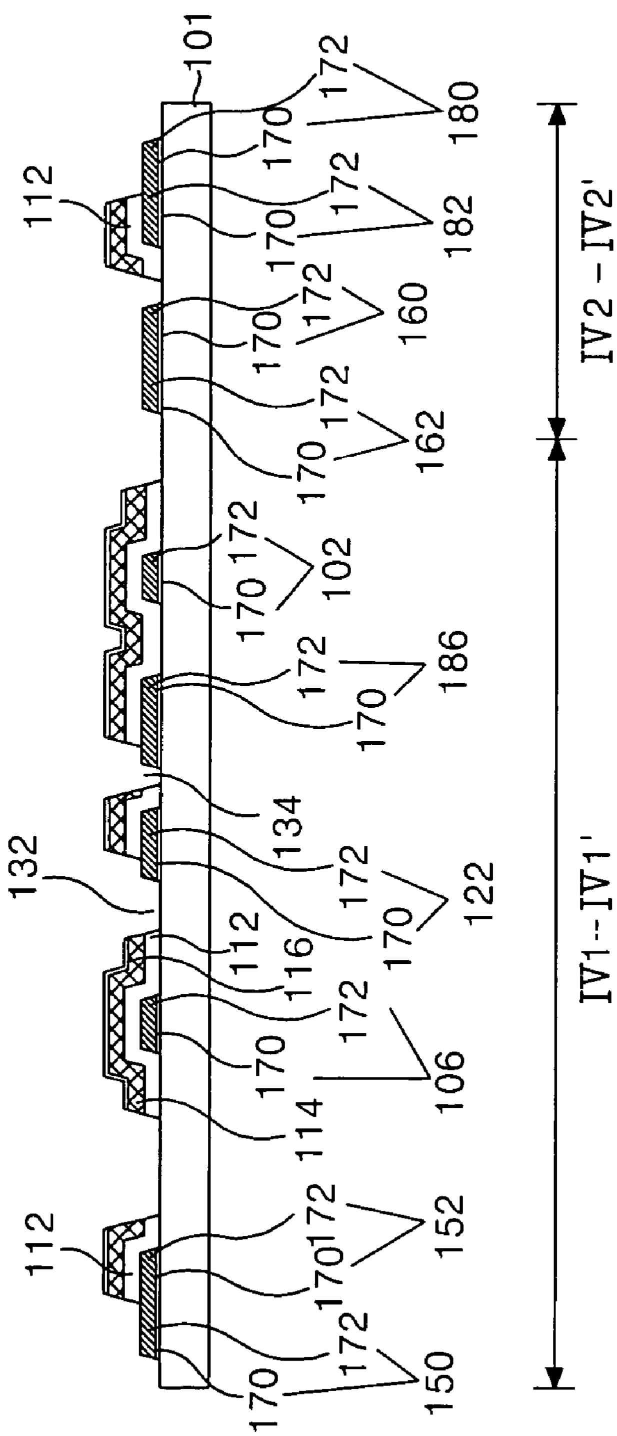

Referring to FIGS. 19A and 19B, a gate insulating pattern 112 and semiconductor patterns, comprised of active 114 and ohmic contact layers 114 and 116, are formed on the lower substrate and on the first conductive pattern group in a second mask process. According to principles of the present invention, first and second contact holes 132 and 134, respectively, may also be formed through the gate insulating pattern 112 and semiconductor patterns in the second mask process.

The second mask process of the third embodiment described above with respect to FIGS. 19A and 19B will now be described in greater detail with respect to FIGS. 20A to 20C.

Figure 20A:
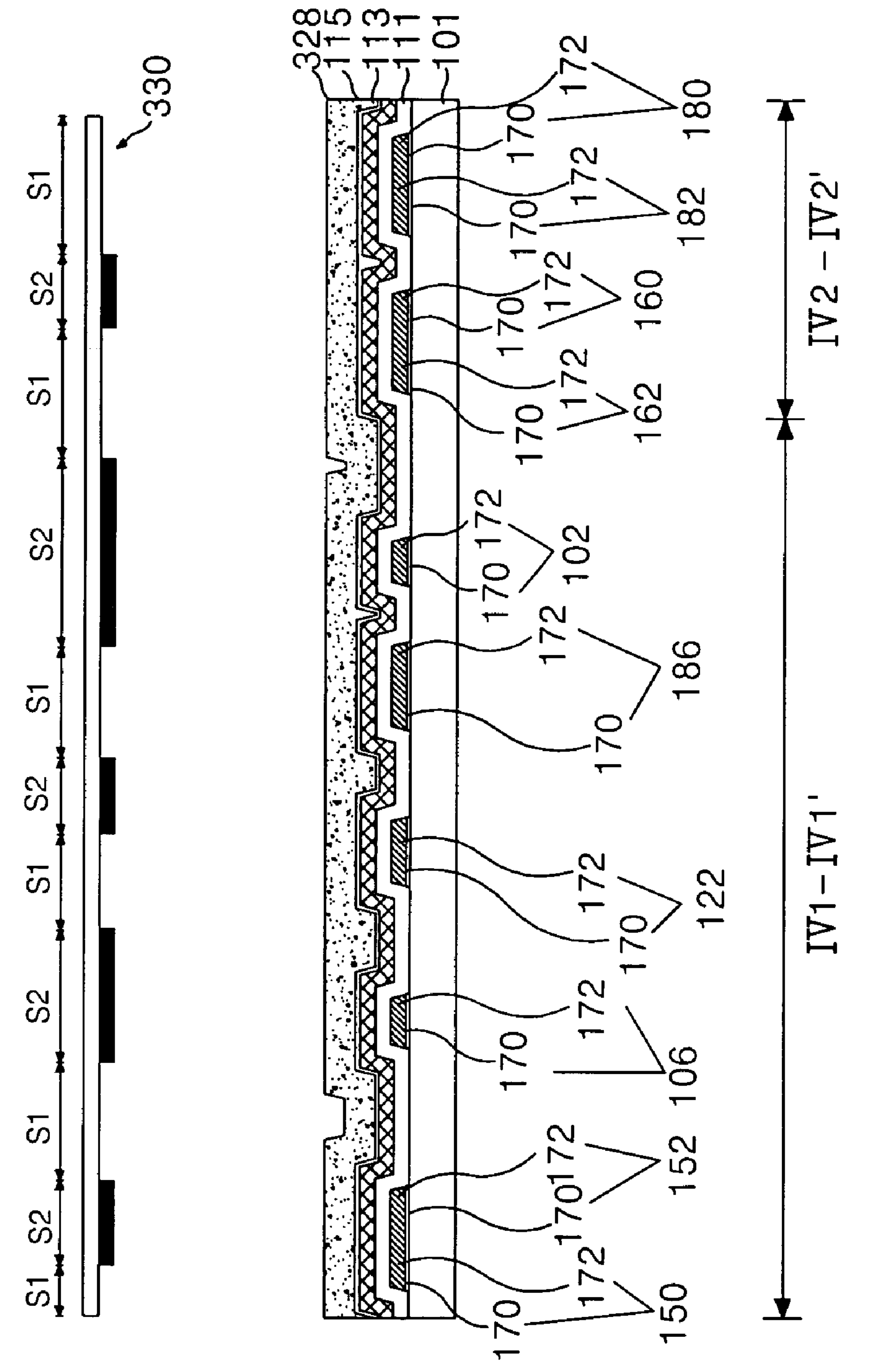
FIGS. 20A to 20C illustrate sectional views specifically describing the second mask process in the method of fabricating the TFT array substrate according to the third embodiment of the present invention.

Referring to FIG. 20A, the gate insulating film 111, the first semiconductor layer 113, and the second semiconductor layer 115 may be sequentially formed on the lower substrate 101 and on the first conductive pattern group. A first photo-resist film 328 is then formed over the entire surface of the second semiconductor layer 115 and is photolithographically patterned using a second mask pattern 330. According to principles of the present invention, the second mask pattern 330 may, for example, include a mask substrate defining a plurality of exposure areas S1 and a plurality of shielding areas S2.

Figure 20B:
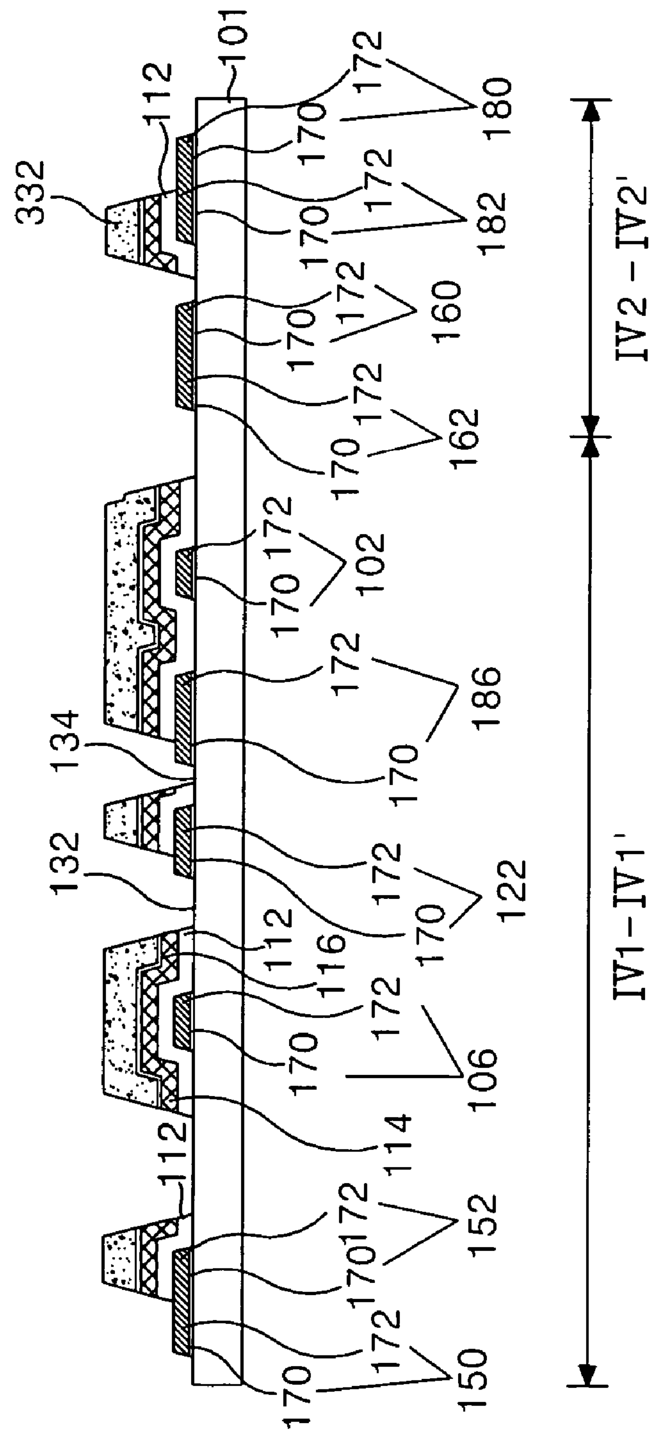
Figure 20C:
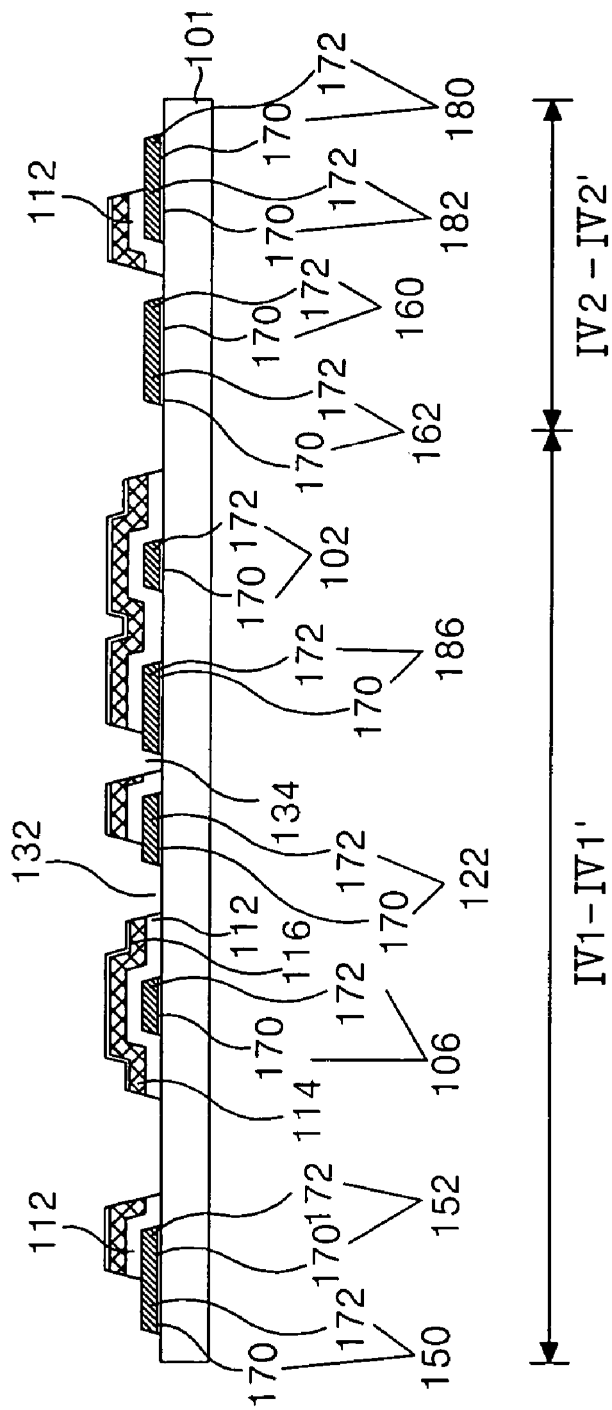

Referring to FIG. 20B, the first photo-resist film 328 may, via the second mask pattern 330, be selectively exposed to light and developed, thereby creating a first photo-resist pattern 332. The gate insulating film 111 and the first and second semiconductor layers 113 and 115 may then be patterned, via the first photo-resist pattern 332, using photolithographic and etching techniques to form the gate insulating pattern 112 in addition to the semiconductor patterns including the active and ohmic contact layers 114 and 116, through which the first and second contact holes 132 and 134 are formed. After forming the gate insulating pattern 112 and the active and ohmic contact layers 114 and 116, the first photo-resist pattern 332 is stripped. As a result of the second mask process, and with reference to FIG. 20C, the gate pad 150, the common pad 180, the data pad 160, and a portion of the pixel electrode 122 and a portion of the common line 186 are exposed by the gate insulating pattern 112 and the active and ohmic contact layers 114 and 116. For example, the first and second contact holes 132 and 134 expose portions of the pixel electrode 122 and a portion of the common line 186, respectively.

Figure 21A:
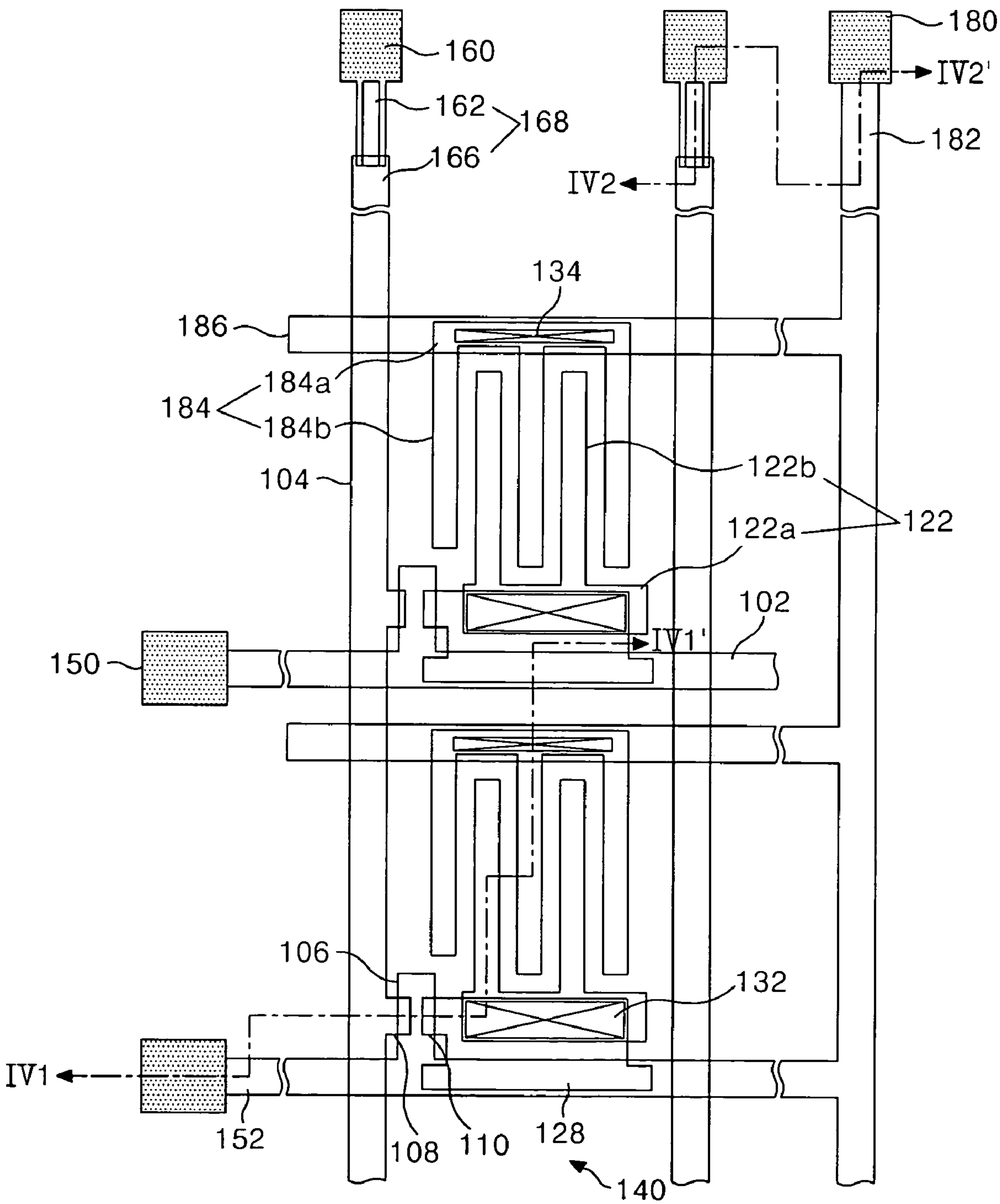
FIGS. 21A and 21B illustrate plan and sectional views, respectively, generally describing a third mask process in the method of fabricating the TFT array substrate according to the third embodiment of the present invention.
Figure 21B:
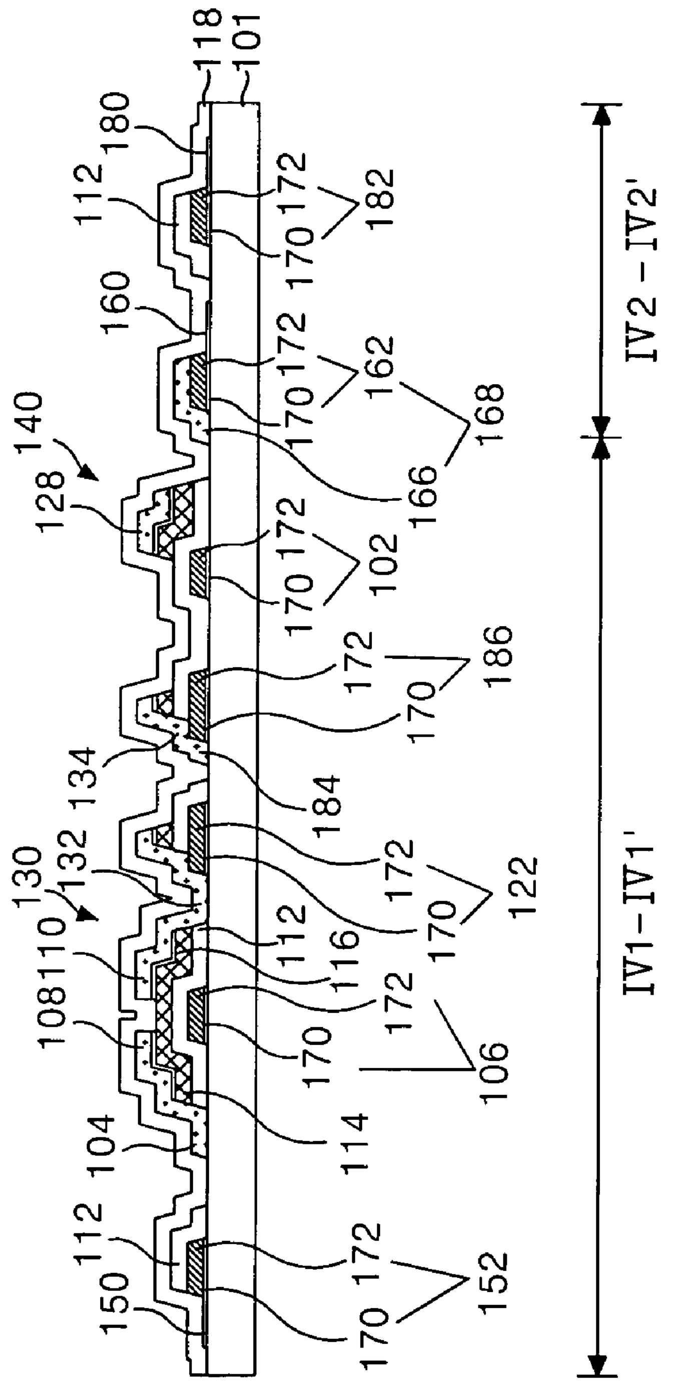

FIGS. 21A and 21B illustrate plan and sectional views, respectively, generally describing a third mask process in the method of fabricating the TFT array substrate according to the third embodiment of the present invention.

Referring to FIGS. 21A and 21B, a second conductive pattern group may be formed on the lower substrate 101 and on the gate insulating pattern 112, in addition to the active and ohmic contact layers 114 and 116, in a third mask process. In one aspect of the present invention, the second conductive pattern group may, for example, include the common electrode 184, the data line 104, the source electrode 108, the drain electrode 110, the storage electrode 128, and the upper data link electrode 166. In another aspect of the present invention, portions of the gate metal material 172 included within the data pad 160, the gate pad 150, and the common pad 180 may, during the third mask process, be removed to expose the transparent conductive material 170 included therein.

The third mask process of the third embodiment described above with respect to FIGS. 21A and 21B will now be described in greater detail below with reference to FIGS. 22A to 22E.

Figure 22A:
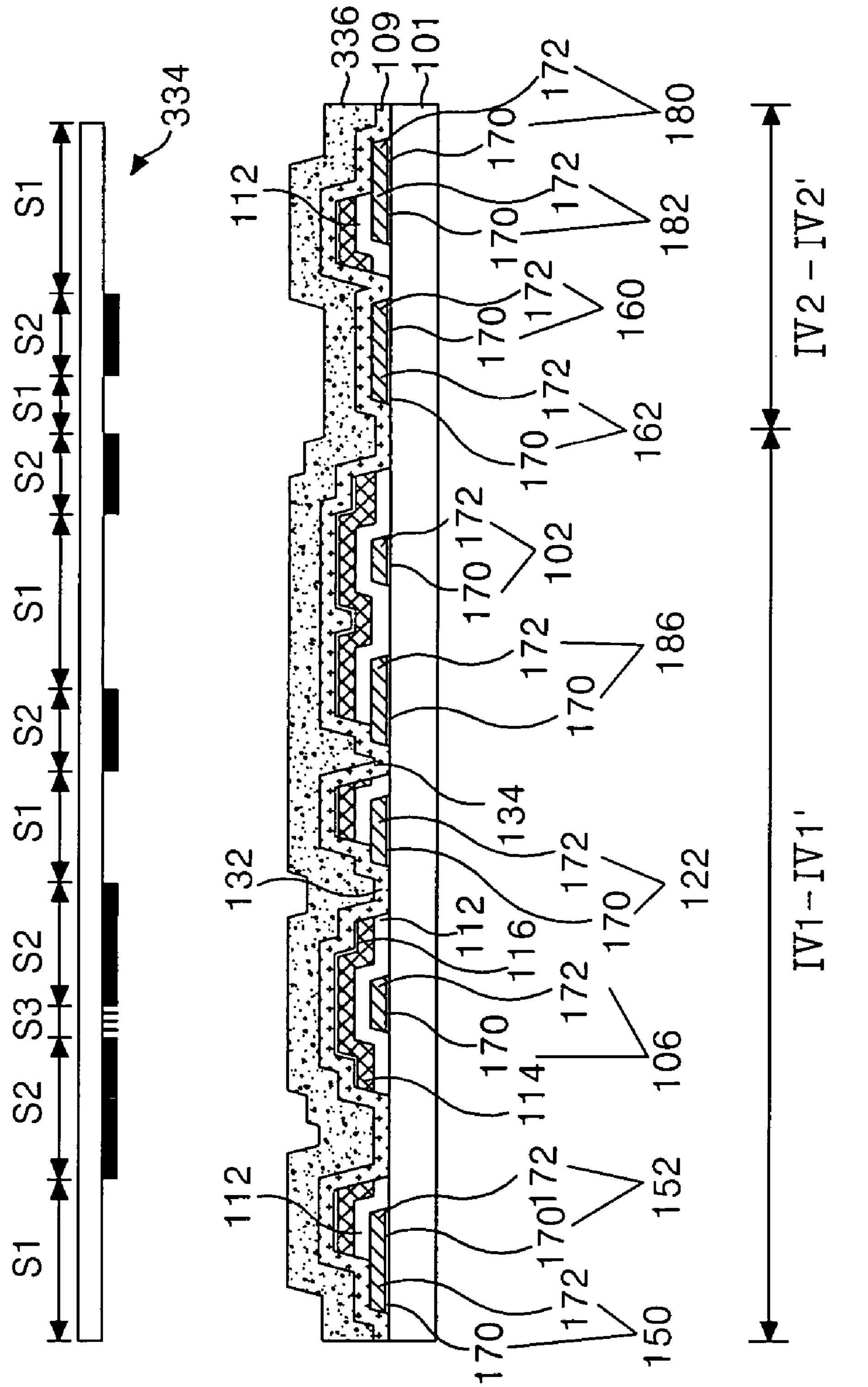
FIGS. 22A to 22E illustrate sectional views specifically describing the third mask process in the method of fabricating the TFT array substrate according to the third embodiment of the present invention.

Referring to FIG. 22A, a data metal layer 109 may be formed on the lower substrate 101, the gate insulating pattern 112, and on the active and ohmic contact layers 114 and 116. In one aspect of the present invention, the data metal layer 109 may be formed using a deposition technique such as sputtering, or the like. In another aspect of the present invention, the data metal layer 109 may, for example, include a metal such as molybdenum (Mo), copper (Cu), or the like, or combinations thereof.

A second photo-resist film 336 may then be formed over the entire surface of the data metal layer 109 and may then be photolithographically patterned using a third mask pattern 334. For example, the third mask pattern 336 may be provided as a partial-exposure mask and include a mask substrate formed of a suitably transparent material, a plurality of exposure areas S1, a plurality of shielding areas S2, and a partial-exposure area S3.

Figure 22B:
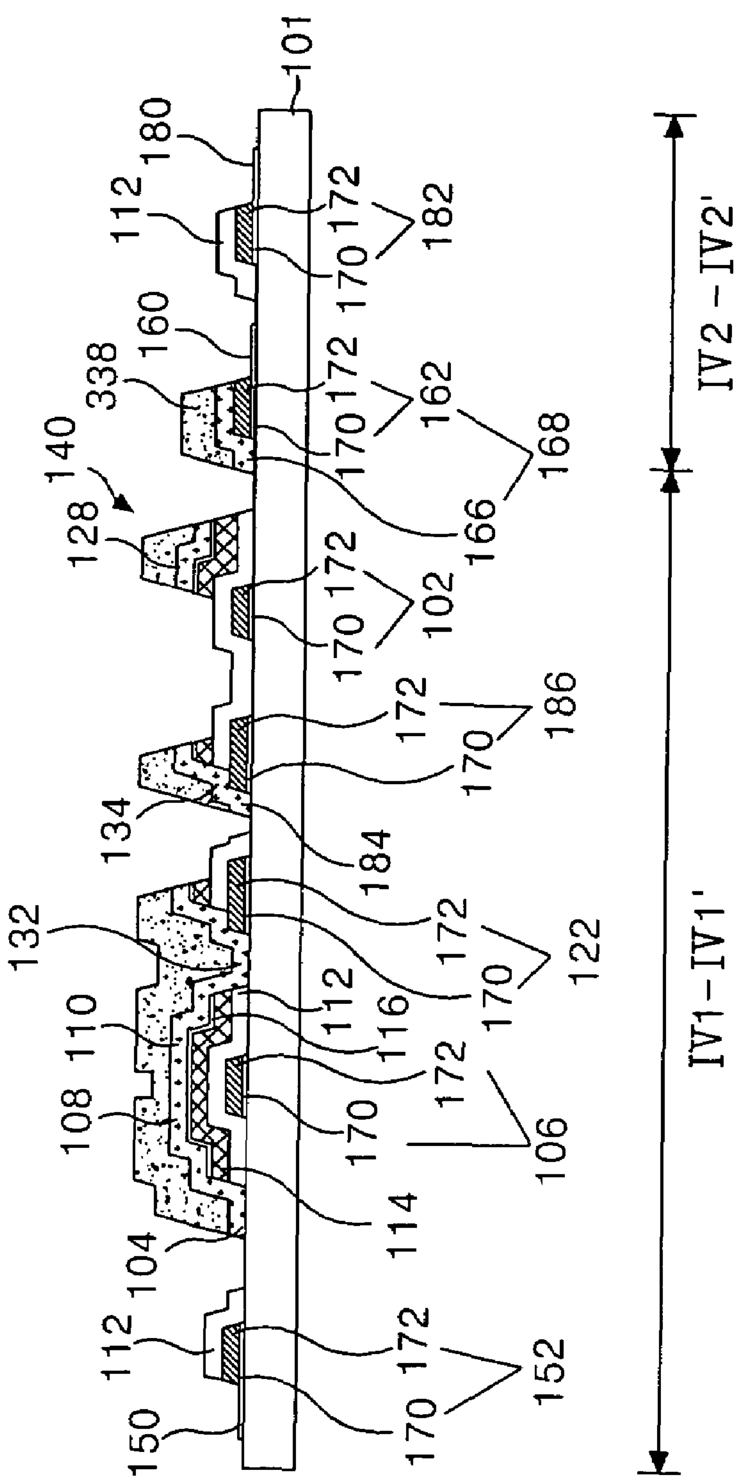

Referring to FIG. 22B, the second photo-resist film 336 may, via the third mask pattern 334, be selectively exposed to light and developed, thereby creating a second photo-resist pattern 338 having a step difference between the shielding and partial-exposure areas S2 and S3. Accordingly, the height of the second photo-resist pattern 338 within the partial-exposure area S3 may be lower than the height of the second photo-resist pattern 326 within the shielding areas S2.

Subsequently, the second photo-resist pattern 338 is used as a mask to pattern the data metal layer 109 in a wet etching process and form the aforementioned second conductive pattern group (i.e., the common electrode 184, the storage electrode 128, the data line 104, the source electrode 108, the drain electrode 110 and the upper data link electrode 166) wherein the source and drain electrodes 108 and 110 are connected to each other in a region corresponding to partial-exposure area S3 (i.e., the channel region of a subsequently formed TFT 130), wherein the source electrode 108 is connected to one side of the data line 104, and wherein the upper data link electrode 166 is connected to another side of the data line 104. Using the second conductive pattern group and the gate insulating pattern 112 as a mask, portions of the gate metal material 172 included within the second conductive pattern group are removed to expose the transparent conductive material 170 included therein.

Next, the second photo-resist pattern 338 is used as a mask to pattern the active and ohmic contact layers 114 and 116 in a dry etching process. The patterning may, for example, include dry etching portions of the active and ohmic contact layers 114 and 116 that are not overlapped by the second conductive pattern group. In one aspect of the present invention, the patterning may, for example, include dry etching portions of the active and ohmic contact layers 114 and 116 positioned between the $i^{th}$ gate line 102 and the $(i+1)^{th}$ common line 186.

Figure 22C:
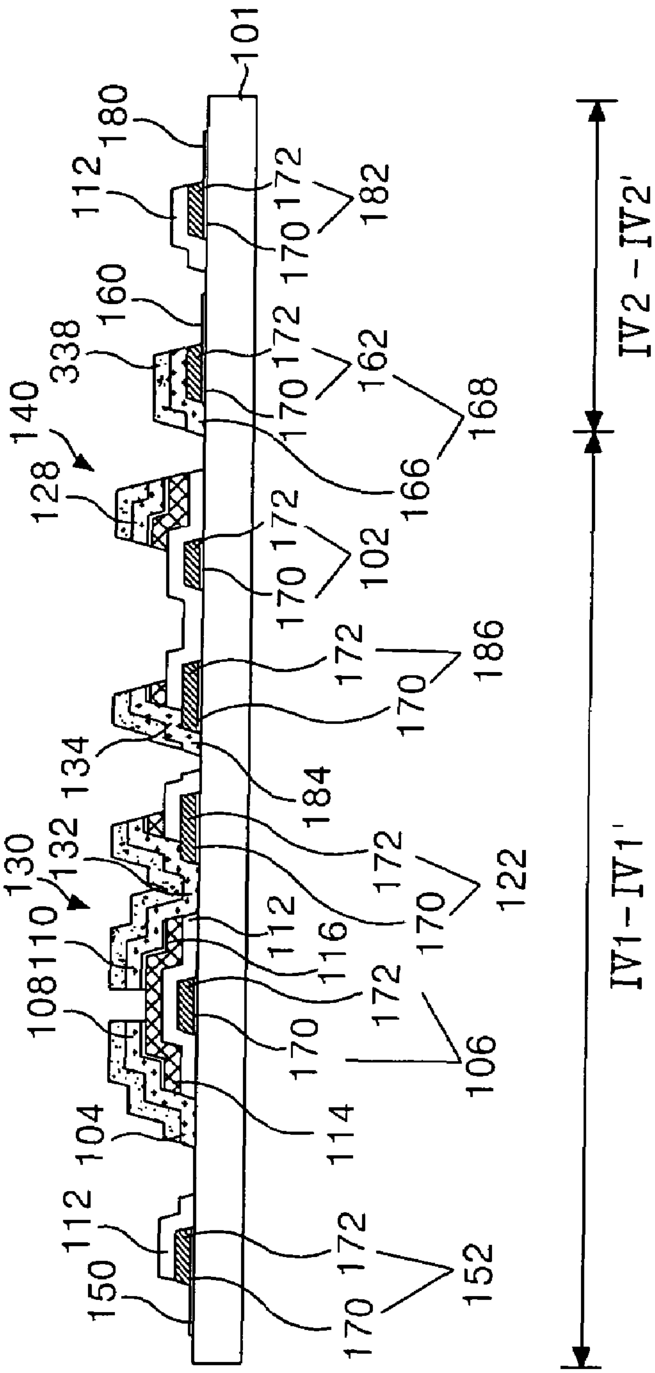
Figure 22D:
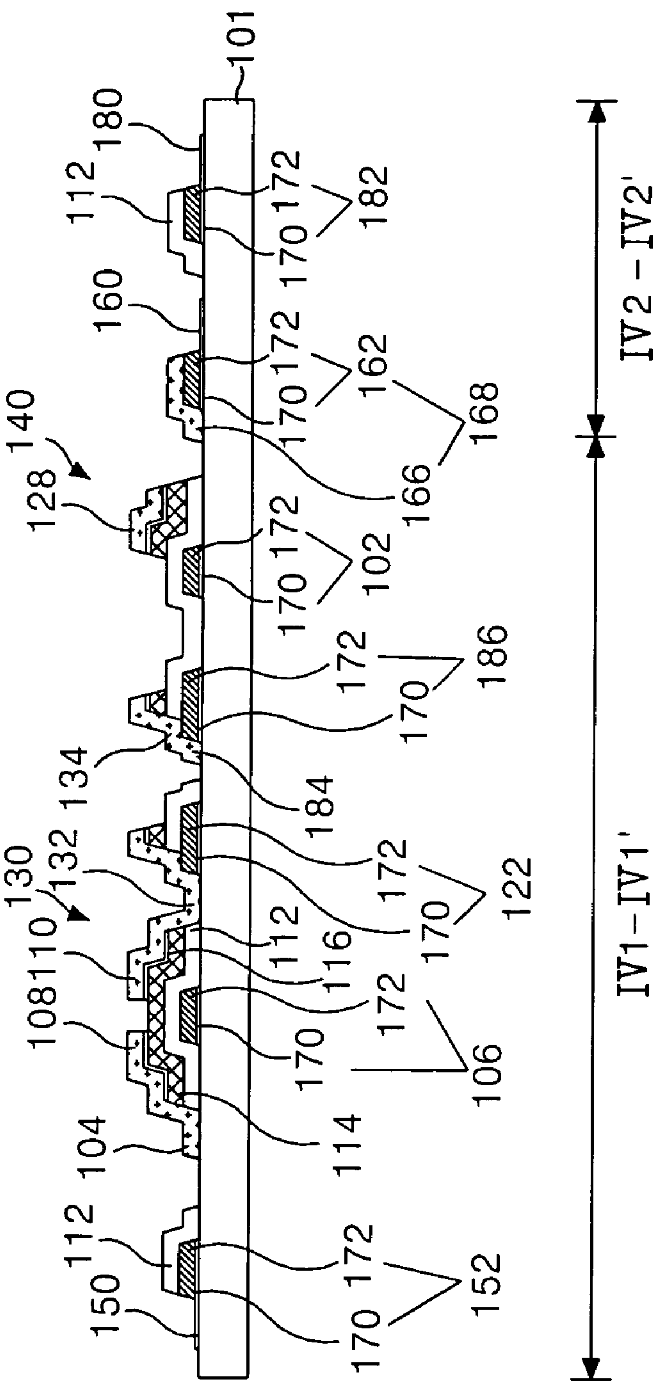

Referring to FIG. 22C, after the active and ohmic contact layers 114 and 116 are formed and patterned, the portion of the second photo-resist pattern 338 having the relatively lower height (i.e., the portion of the second photo-resist pattern 338 arranged within the channel region of the subsequently formed TFT 130, formed via the partial-exposure area S3 of the second mask pattern 334) is removed in an ashing process using oxygen ($O_2$) plasma. Upon performing the ashing process, the relatively thicker portions of the second photo-resist pattern 338 (i.e., portions of the second photo-resist pattern 338 arranged outside the channel region of the subsequently formed TFT 130, formed via the shielding areas S2) are thinned but, nevertheless, remain. Using the thinned second photo-resist pattern 338 as a mask, portions of the data metal layer 109 and the ohmic contact layer 116 in the channel portion of the subsequently formed TFT 130 are removed in an etching process. As a result, the active layer 114 within the channel portion is exposed and the source electrode 108 is disconnected from the drain electrode 110. With reference to FIG. 22D, the remaining second photo-resist pattern 338 is then removed in a stripping process.

Figure 22E:
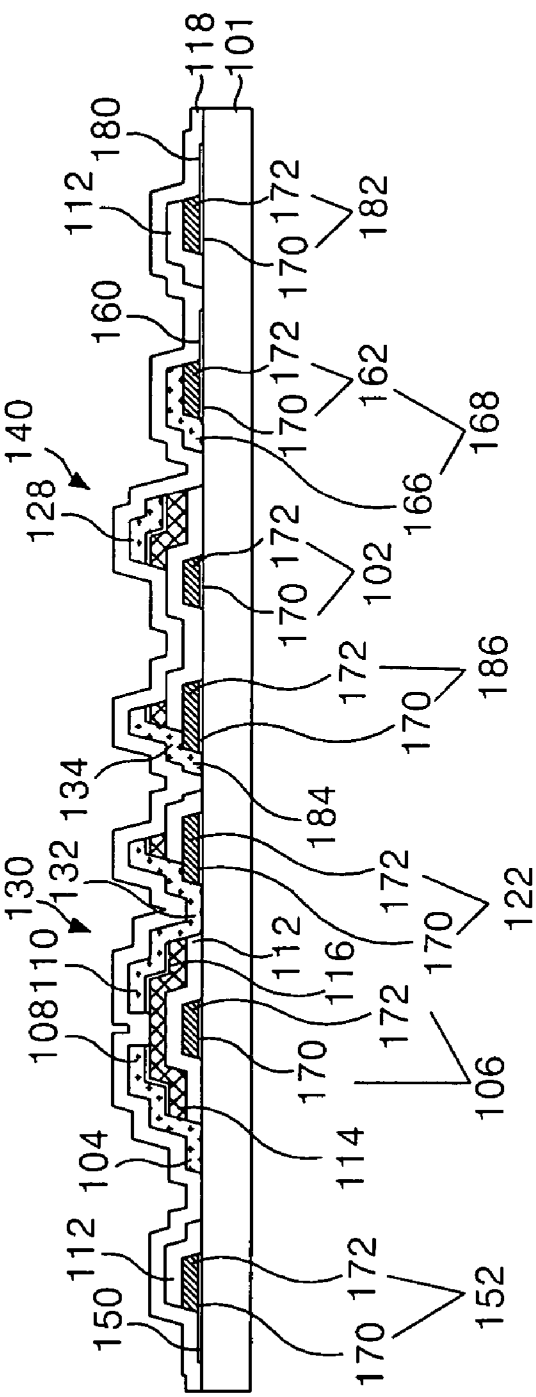

Referring next to FIG. 22E, the protective film 118 is formed over the entire surface of the substrate 101 and on the second conductive pattern group.

Figure 23:
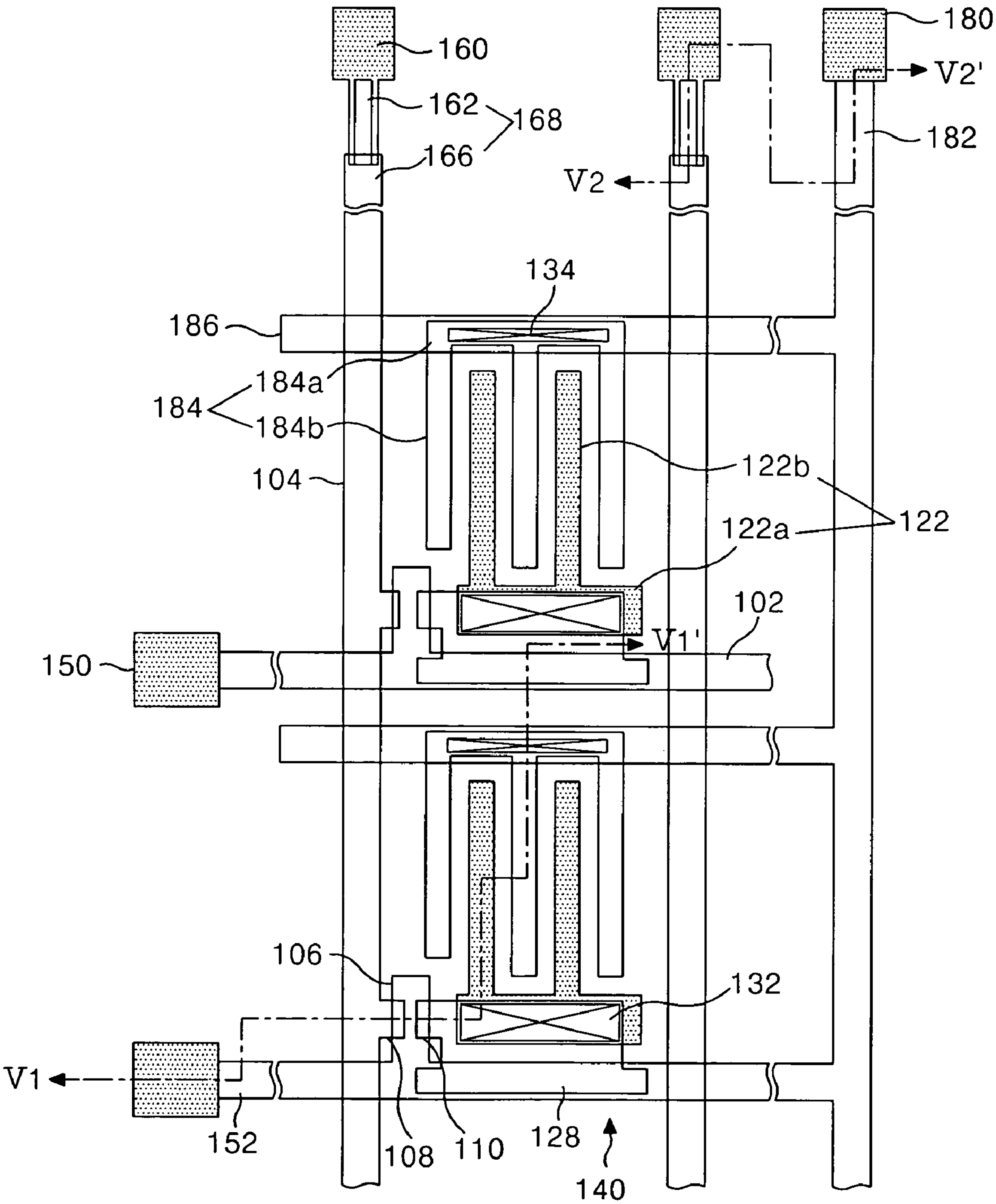
FIG. 23 illustrates a plan view of a TFT array substrate in an IPS mode LCD device according to a fourth embodiment of the present invention.
Figure 24:
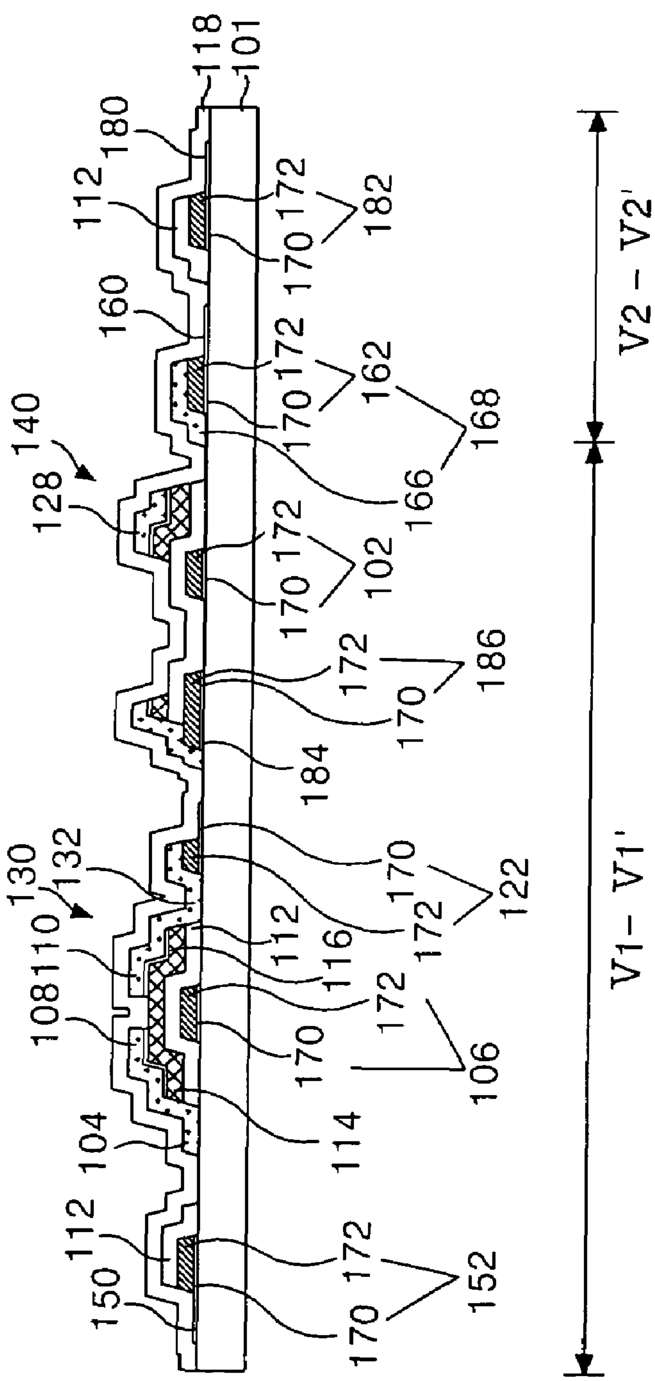
FIG. 24 illustrates a sectional view of the TFT array substrate taken along lines V1-V1' and V2-V2' shown in FIG. 23.

FIG. 23 illustrates a plan view of a TFT array substrate in an IPS mode LCD device according to a fourth embodiment of the present invention. FIG. 24 illustrates a sectional view of the TFT array substrate taken along lines V1-V1' and V2-V2' shown in FIG. 23.

The TFT array substrate shown in FIGS. 23 and 24, and method of fabricating the same, is, in many respects, similar to the TFT array substrate shown in FIGS. 16 and 17 but is different with respect to pixel electrode. Thus, for the sake of brevity, a detailed explanation of elements similar to both the fourth and third embodiments will be omitted.

Referring to FIGS. 23 and 24, the pixel electrode 122 is electrically connected to both the drain and storage electrodes 110 and 128, via a first contact hole 132. Accordingly, the pixel electrode 122 may, for example, include a pixel horizontal part 122*a* extending from the drain electrode 110, parallel to an adjacent gate line 102, and a plurality of pixel finger parts 122*b* oriented substantially perpendicularly with respect to the pixel horizontal part 122*a*. In another aspect of the present invention, a portion of the pixel electrode 122 that overlaps with the drain electrode 110 may comprise a transparent conductive material 170 and a gate metal material 172 formed on the transparent conductive material 170 while a portion of the pixel electrode 122 not overlapping the drain electrode 110 may comprise only the transparent conductive material 170. In still another aspect of the present invention, the first contact hole 132 may be formed through the gate insulating pattern 122, the active layer 114, and the ohmic contact layer 116, to expose the pixel electrode 122.

Similar to the first embodiment, portions of the coplanar transparent conductive material 170 comprised within the gate pad 150, the data pad 160, the common pad 180, and the pixel electrode 122 are exposed to ensure high reliability against corrosion.

Similar to the embodiments discussed above, the TFT array substrate in the fourth embodiment of the present invention may be fabricated using a three-mask process. The first and second mask processes used to form the TFT array substrate of the fourth embodiment are similar to the first and second mask processes previously discussed above with respect to the third embodiment of the present invention. Therefore, a description of the first and second mask processes will be briefly explained.

Similar to the process described in FIGS. 18A and 18B, a first conductive pattern group may be formed on the lower substrate 101 in a first mask process. In one aspect of the present invention, the first conductive line group may, for example, include the pixel electrode 122, the gate line 102, the gate electrode 106, the gate link 152, the gate pad 150, the data pad 160, the lower data link electrode 162, the common line 186, the common link 182, and the common pad 180.

Similar to the process described in FIGS. 19A, 19B, and 20A to 20C, the gate insulating pattern 112 and the active and ohmic contact layers 114 and 116 may be formed in the second mask process. As a result of the second mask process of the fourth embodiment, the gate pad 150, the common pad 180, the common electrode 184, the data pad 160, the lower data link electrode 162, and an entirety of the pixel electrode 122 may be exposed by the gate insulating pattern 112 and the active and ohmic contact layers 114 and 116. Further, the first and second contact holes 132 and 134 formed through the gate insulating pattern 112 and the active and ohmic contact layers 114 and 116 may expose the pixel electrode 122 and a portion of the common line 186, respectively.

FIGS. 25A to 25E illustrate sectional views specifically describing a third mask process in the method of fabricating the TFT array substrate according to the fourth embodiment of the present invention.

Figure 25A:
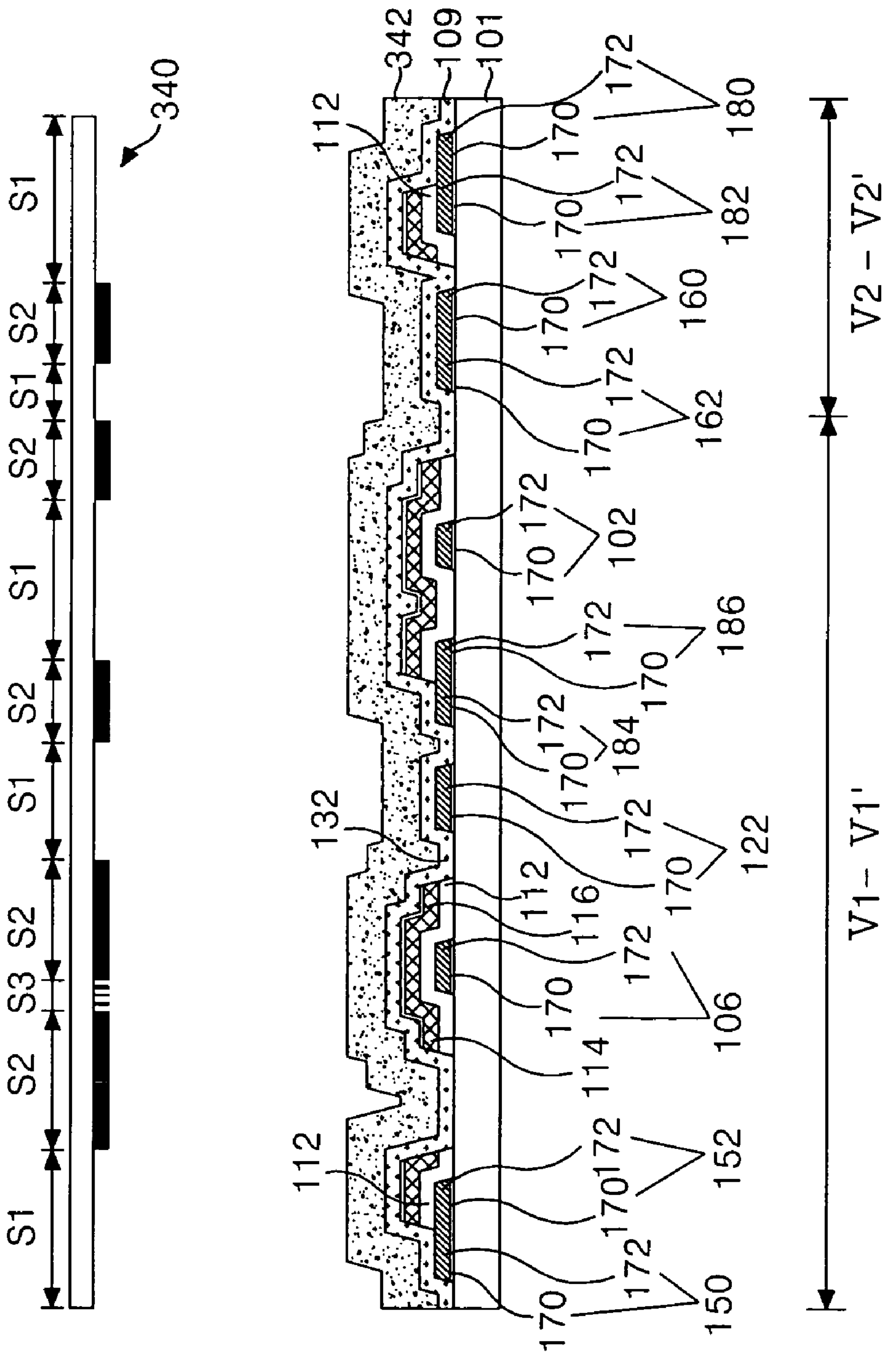
FIGS. 25A to 25E illustrate sectional views specifically describing a third mask process in the method of fabricating the TFT array substrate according to the fourth embodiment of the present invention.
Figure 25B:
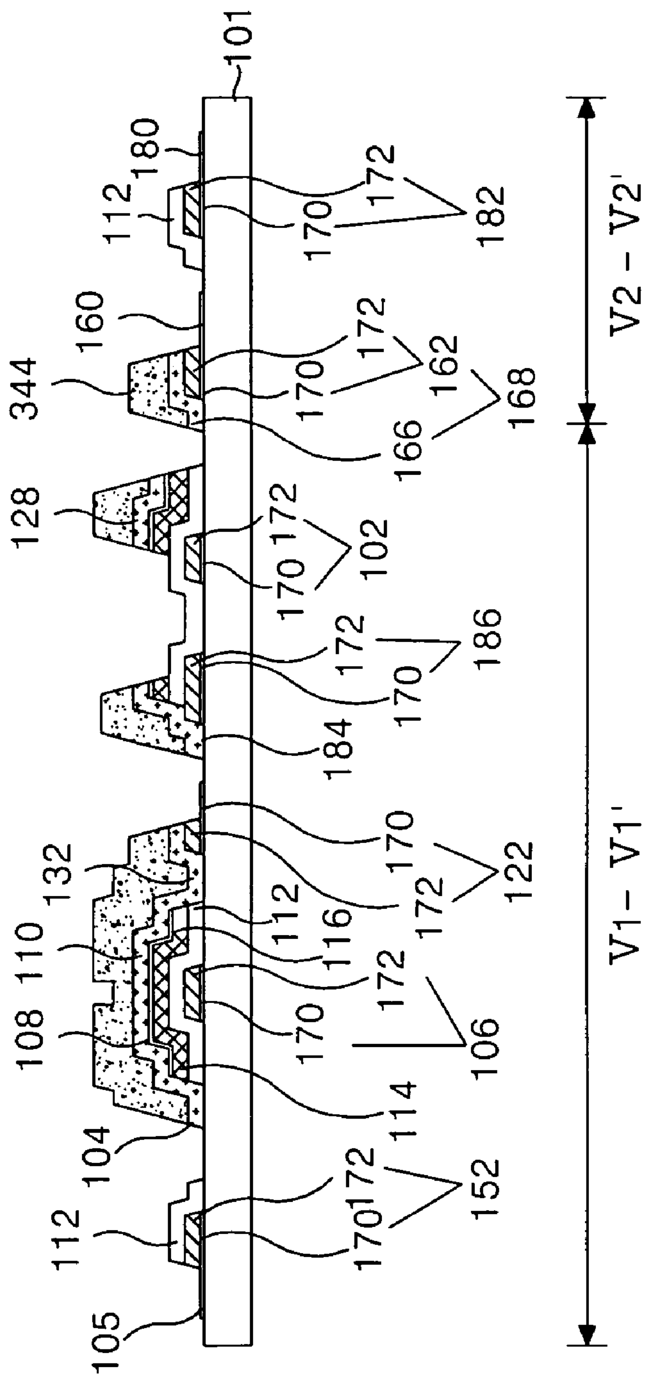

Referring generally to FIGS. 25A and 25B, a second conductive pattern group may be formed on the lower substrate 101 and on the gate insulating pattern 112, in addition to the active and ohmic contact layers 114 and 116, in a third process.

Referring specifically to FIG. 25A, a data metal layer 109 may be formed on the lower substrate 101, the gate insulating pattern 112, and on the active and ohmic contact layers 114 and 116. In one aspect of the present invention, the data metal layer 109 may be formed using a deposition technique such as sputtering, or the like. In another aspect of the present invention, the data metal layer 109 may, for example, include a metal such as molybdenum (Mo), copper (Cu), or the like, or combinations thereof.

A second photo-resist film 342 may then be formed over the entire surface of the data metal layer 109 and may then be photolithographically patterned using a third mask pattern 340. For example, the third mask pattern 340 may be provided as a partial-exposure mask and include a mask substrate formed of a suitably transparent material, a plurality of exposure areas S1, a plurality of shielding areas S2, and a partial-exposure area S3.

Referring to FIG. 25B, the second photo-resist film 342 may, via the third mask pattern 340, be selectively exposed to light and developed, thereby creating a second photo-resist pattern 344 having a step difference between the shielding and partial-exposure areas S2 and S3. Accordingly, the height of the second photo-resist pattern 344 within the partial-exposure area S3 may be lower than the height of the second photo-resist pattern 326 within the shielding areas S2.

Subsequently, the second photo-resist pattern 344 is used as a mask to pattern the data metal layer 109 in a wet etching process and form a second conductive pattern group (i.e., the storage electrode 128, the data line 104, the source electrode 108, the drain electrode 110, the common electrode 184, and the upper data link electrode 166) wherein the source and drain electrodes 108 and 110 are connected to each other in a region corresponding to partial-exposure area S3 (i.e., the channel region of a subsequently formed TFT 130), wherein the source electrode 108 is connected to one side of the data line 104, and wherein the upper data link electrode 166 is connected to another side of the data line 104. Using the second conductive pattern group and the gate insulating pattern 112 as a mask, portions of the gate metal material 172 included within the pixel electrode 122, the data pad 160, the gate pad 150 and the common pad 180 are removed to expose the transparent conductive material 170 included therein.

Next, the second photo-resist pattern 344 is used as a mask to pattern the active and ohmic contact layers 114 and 116 in a dry etching process. The patterning may, for example, include dry etching portions of the active and ohmic contact layers 114 and 116 that are not overlapped by the second conductive pattern group.

Figure 25C:
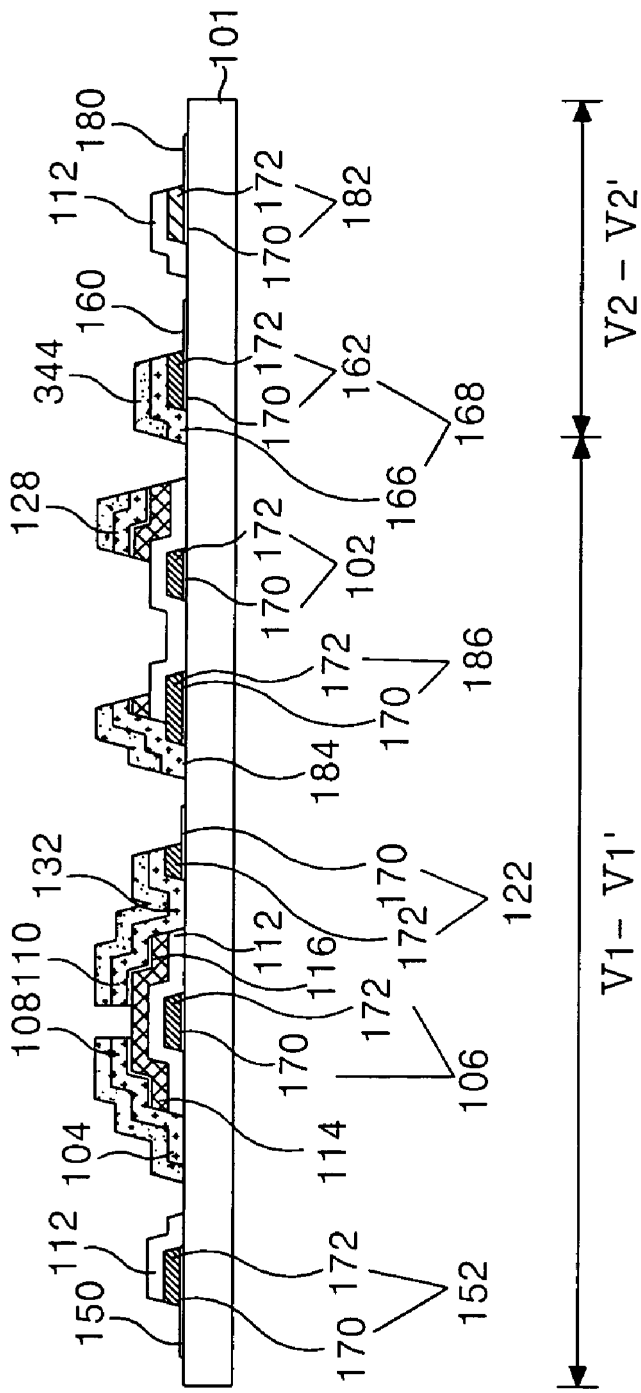
Figure 25D:
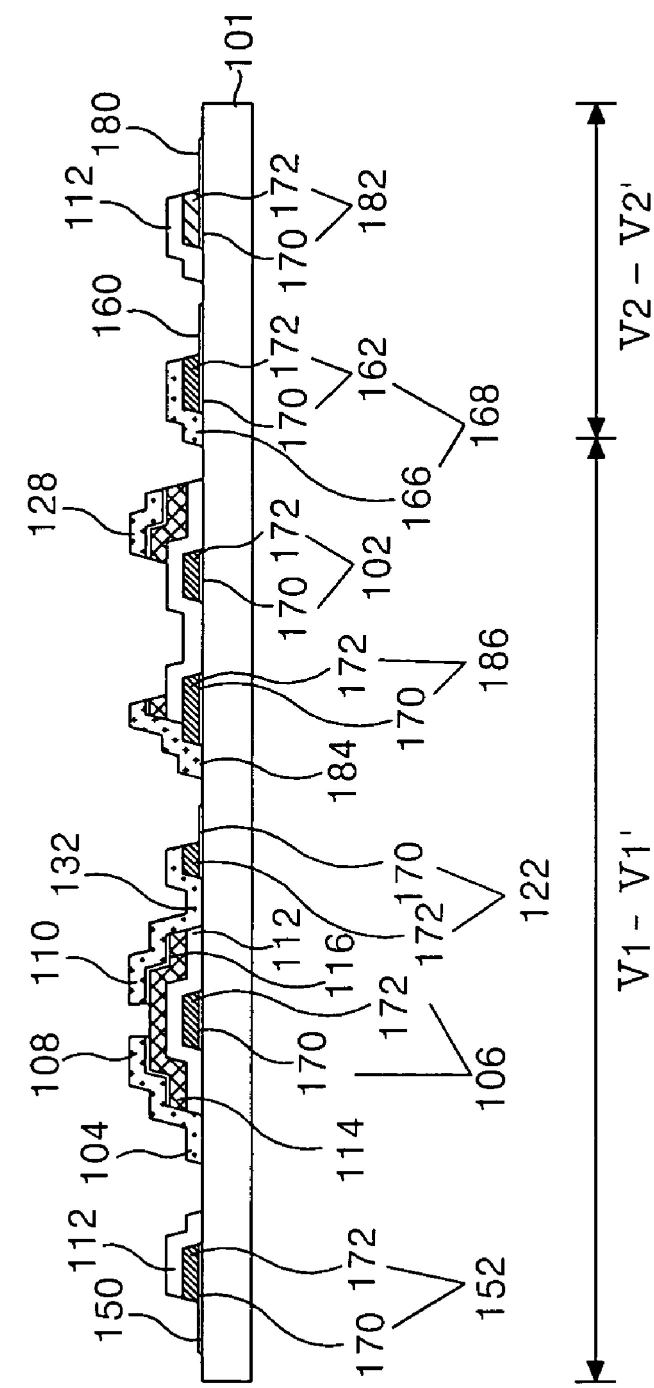

Referring to FIG. 25C, after the active and ohmic contact layers 114 and 116 are formed and patterned, the portion of the second photo-resist pattern 344 having the relatively lower height (i.e., the portion of the second photo-resist pattern 344 arranged within the channel region of the subsequently formed TFT 130, formed via the partial-exposure area S3 of the second mask pattern 340) is removed in an ashing process using oxygen ($O_2$) plasma. Upon performing the ashing process, the relatively thicker portions of the second photo-resist pattern 344 (i.e., portions of the second photo-resist pattern 344 arranged outside the channel region of the subsequently formed TFT 130, formed via the shielding areas S2) are thinned but, nevertheless, remain. Using the thinned second photo-resist pattern 344 as a mask, portions of the data metal layer 109 and the ohmic contact layer 116 in the channel portion of the subsequently formed TFT 130 are removed in an etching process. As a result the active layer 114 within the channel portion is exposed and the source electrode 108 is disconnected from the drain electrode 110. With reference to FIG. 25D, the remaining second photo-resist pattern 344 is then removed in a stripping process.

Figure 25E:
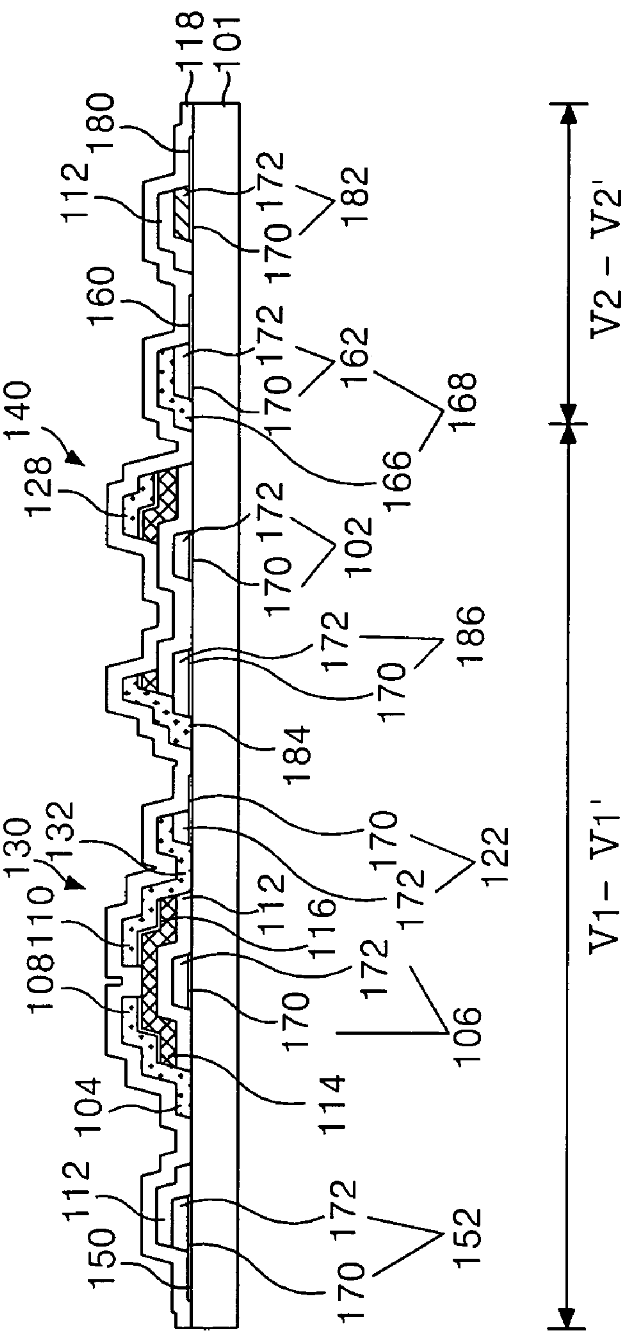

Referring next to FIG. 25E, the protective film 118 is formed over the entire surface of the substrate 101 and on the second conductive pattern group.

Figure 26:
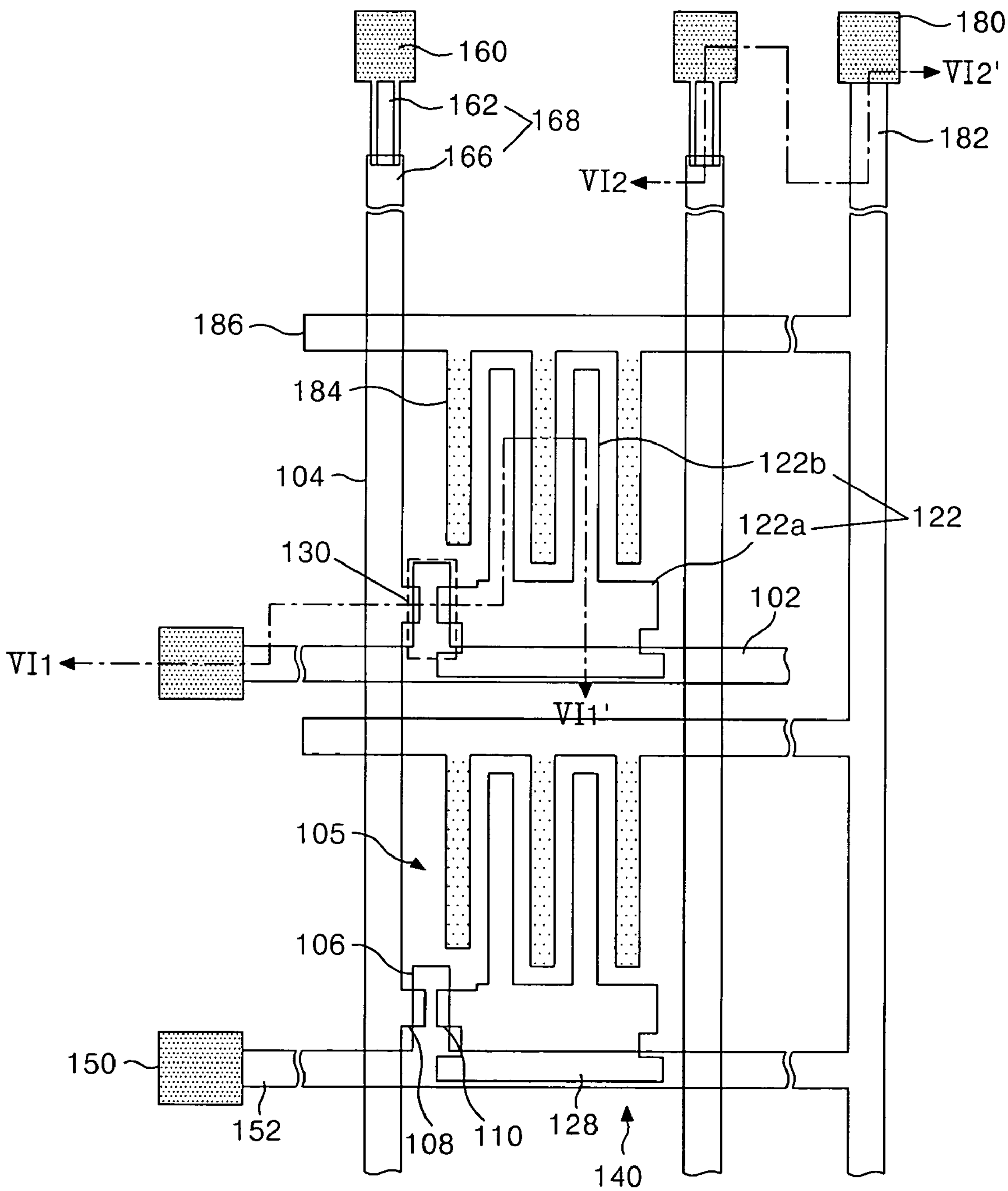
FIG. 26 illustrates a plan view of a TFT array substrate in an IPS mode LCD device according to a fifth embodiment of the present invention.
Figure 27:
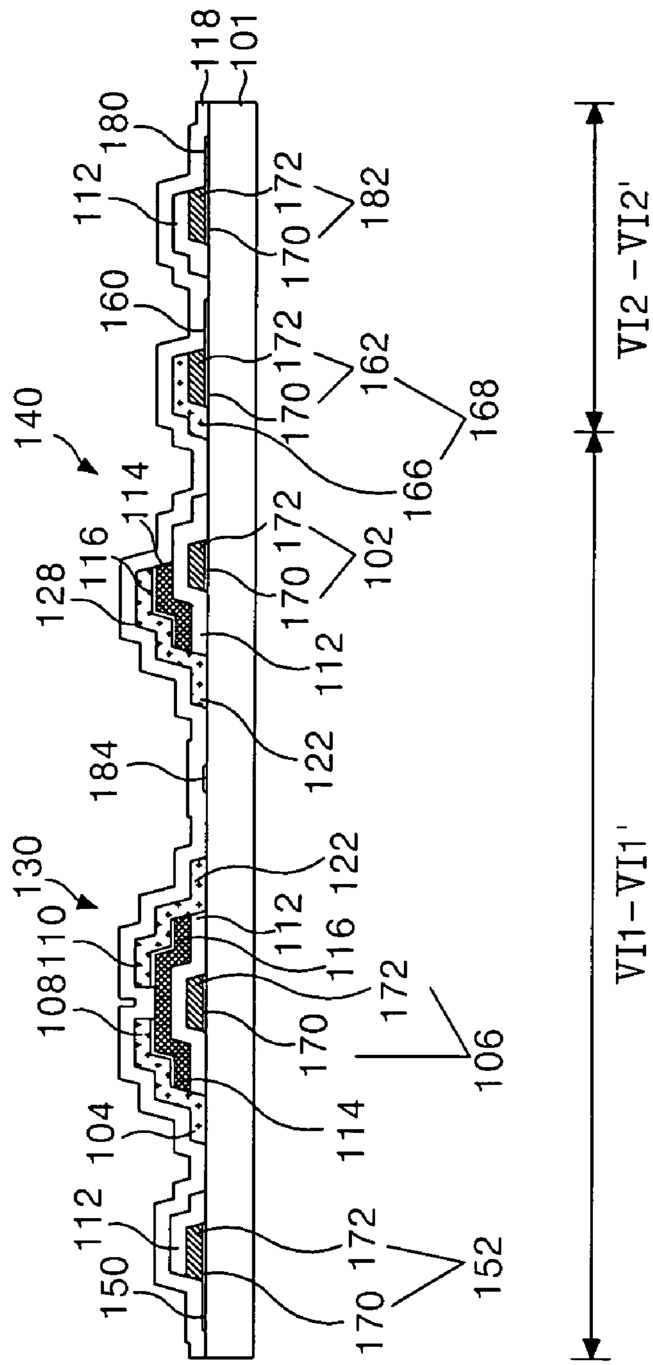
FIG. 27 illustrates a sectional view of the TFT array substrate taken along lines VI1-VI1' and VI2-VI2' shown in FIG. 26.

FIG. 26 illustrates a plan view of a TFT array substrate in an IPS mode LCD device according to a fifth embodiment of the present invention. FIG. 27 illustrates a sectional view of the TFT array substrate taken along lines VI1-VI1' and VI2-VI2' shown in FIG. 26.

The TFT array substrate shown in FIGS. 26 and 27, and method of fabricating the same, is, in many respects, similar to the TFT array substrate shown in FIGS. 11 and 12 but is different with respect to the pixel electrode. Thus, for the sake of brevity, a detailed explanation of elements similar to both the fifth and second embodiments will be omitted.

Referring to FIGS. 26 and 27, the pixel electrode 122 is an integral extension of both the drain electrode 110 and the storage electrode 128. Accordingly, the pixel electrode 122 may, for example, include a pixel horizontal part 122*a* extending from the drain electrode 110, parallel to an adjacent gate line 102, and a plurality of pixel finger parts 122*b* oriented substantially perpendicularly with respect to the pixel horizontal part 122*a*. In another aspect of the present invention, the common electrode 184 may comprise a material from which the data metal layer 109 is formed (e.g., molybdenum (Mo), chrome (Cr), copper (Cu), or the like, or combinations thereof).

As described above, portions of the transparent conductive material 170 comprised within the gate pad 150, the data pad 160, and the common pad 180 are exposed to ensure high reliability against corrosion.

Figure 28A:
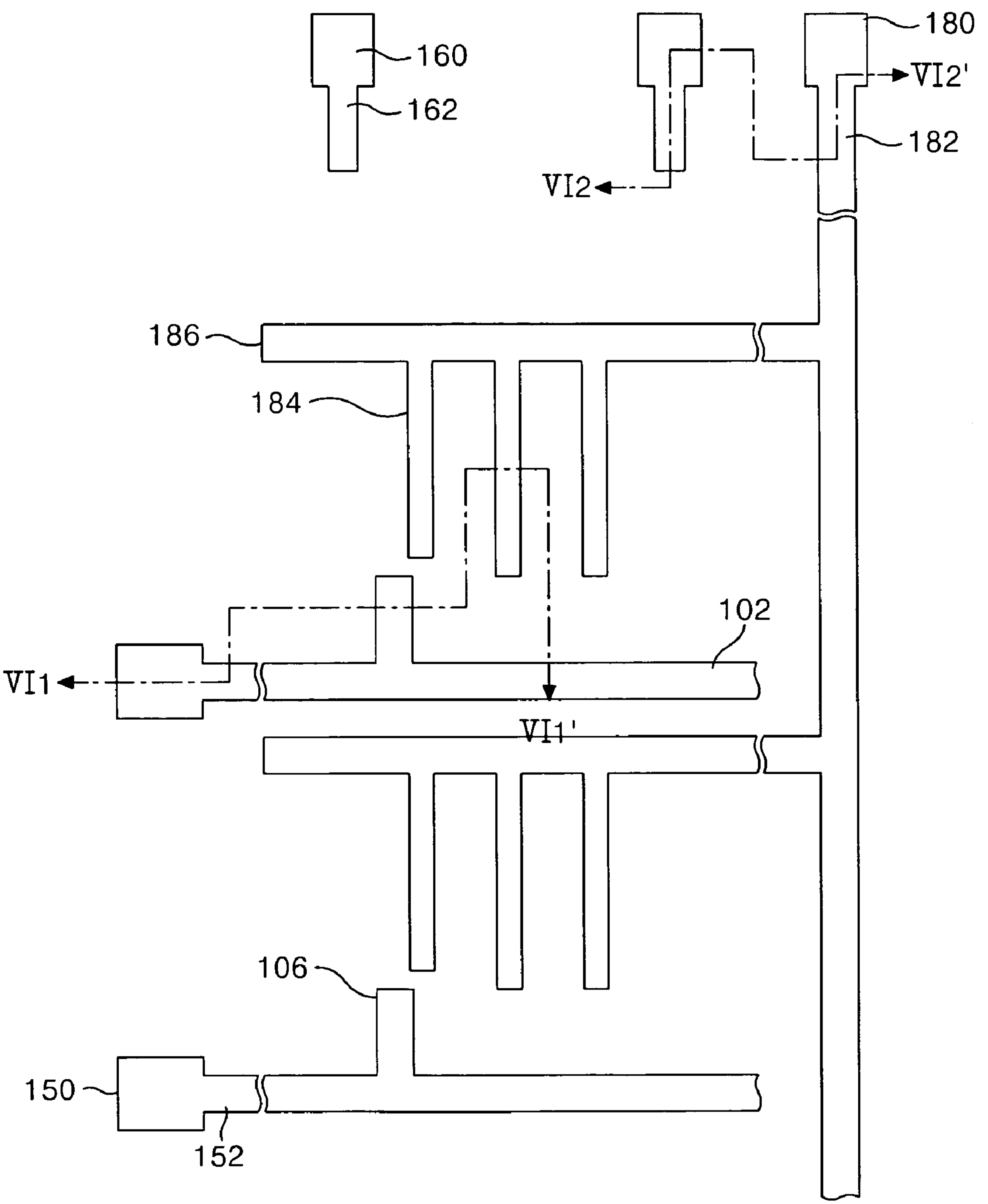
FIGS. 28A and 28B illustrate plan and section views, respectively, describing a first mask process in the method of fabricating the TFT array substrate according to the fifth embodiment of the present invention.
Figure 28B:
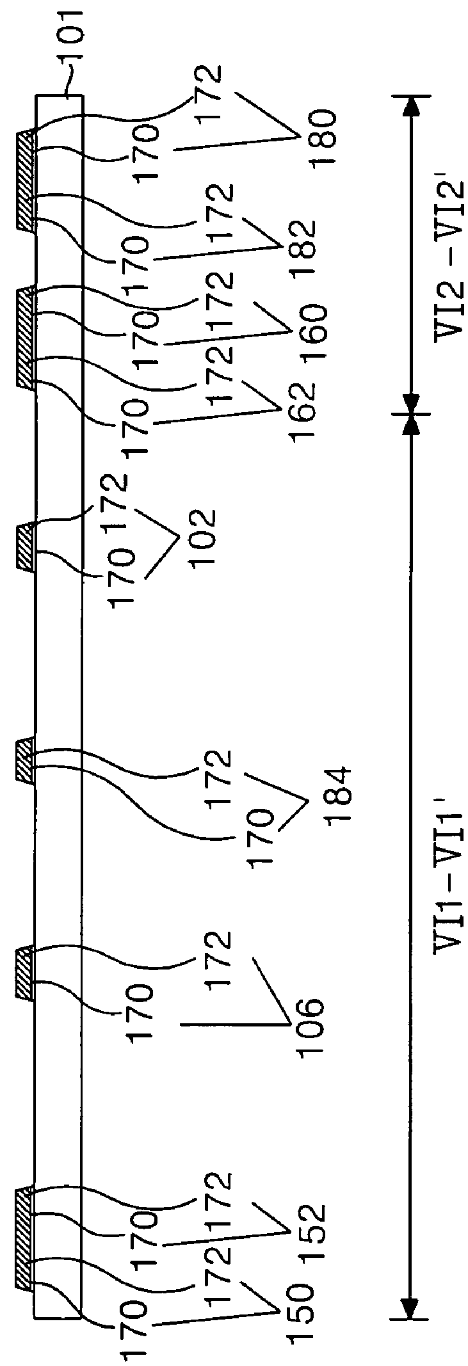

FIGS. 28A and 28B illustrate plan and section views, respectively, describing a first mask process in the method of fabricating the TFT array substrate according to the fifth embodiment of the present invention.

Referring to FIGS. 28A and 28B, a first conductive pattern may be formed on the lower substrate 101 in a first mask process. In one aspect of the present invention, the first conductive pattern group may, for example, include the gate line 102, the gate electrode 106, the gate link 152, the gate pad 150, the data pad 160, the lower data link electrode 162, the common line 186, the common link 182, the common pad 180, and the pixel electrode 122. In another aspect of the present invention, the first conductive pattern group may comprise the transparent conductive material 170 and the gate metal material 172.

Figure 29A:
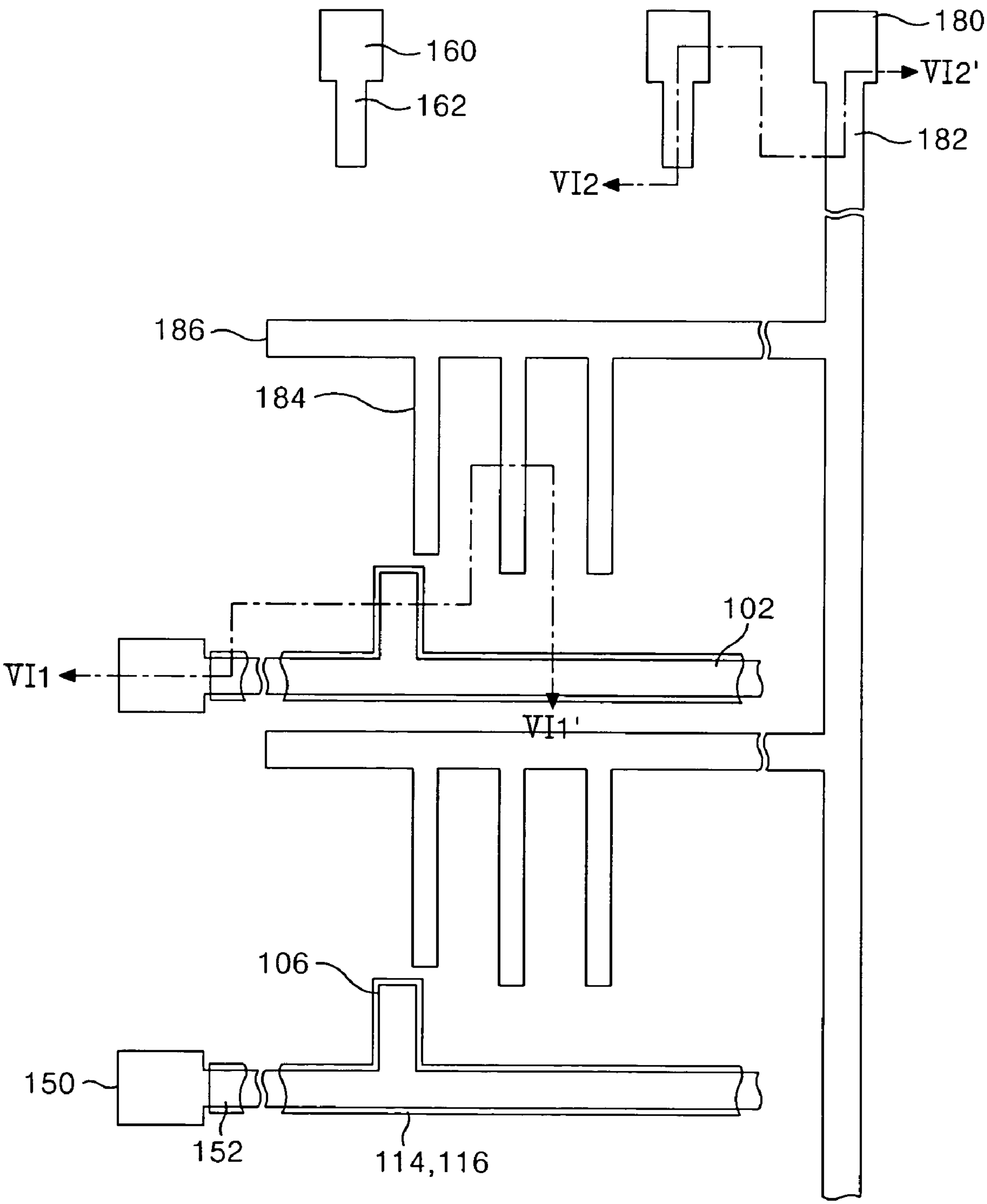
FIGS. 29A and 29B illustrate plan and sectional views, respectively, generally describing a second mask process in the method of fabricating the TFT array substrate according to the fifth embodiment of the present invention.
Figure 29B:
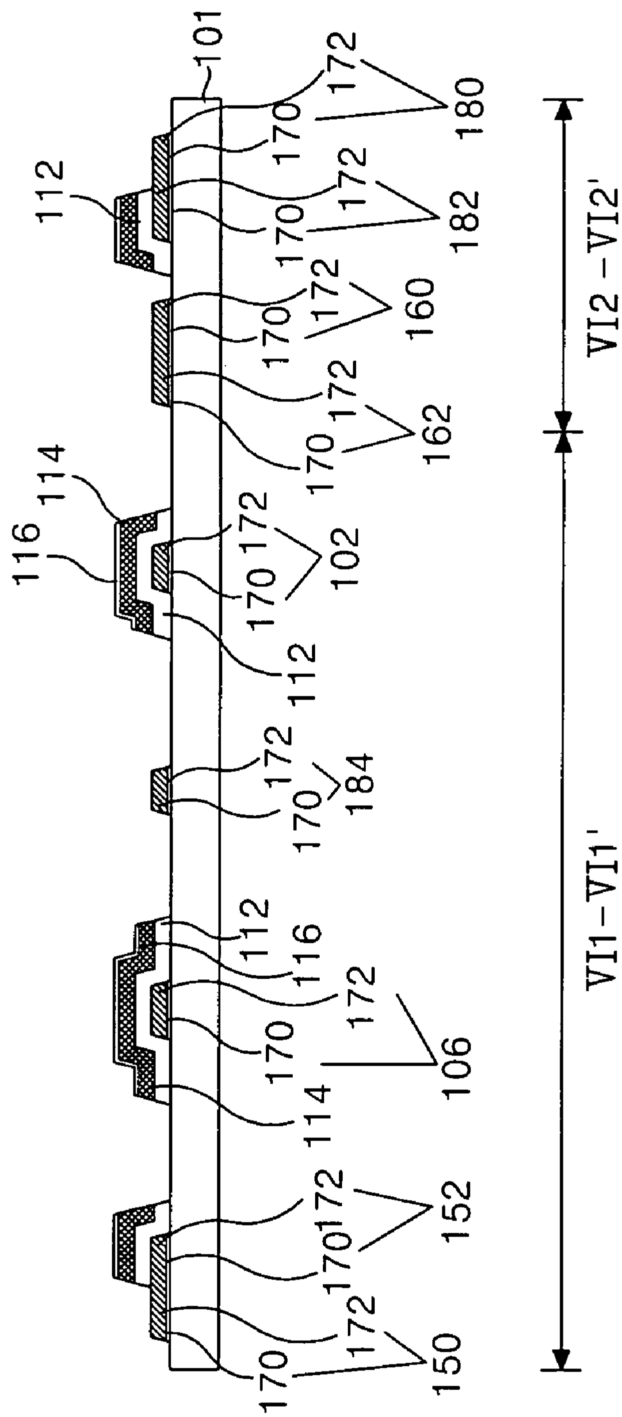

FIGS. 29A and 29B illustrate plan and sectional views, respectively, generally describing a second mask process in the method of fabricating the TFT array substrate according to the fifth embodiment of the present invention.

Referring to FIGS. 29A and 29B, a gate insulating pattern 112 and semiconductor patterns, comprised of the active and ohmic contact layers 114 and 116, are formed on the lower substrate 101 provided and on the first conductive pattern in a second mask process.

The second mask process of the fifth embodiment described above with respect to FIGS. 29A and 29B will now be described in greater detail with respect to FIGS. 30A to 30C.

Figure 30A:
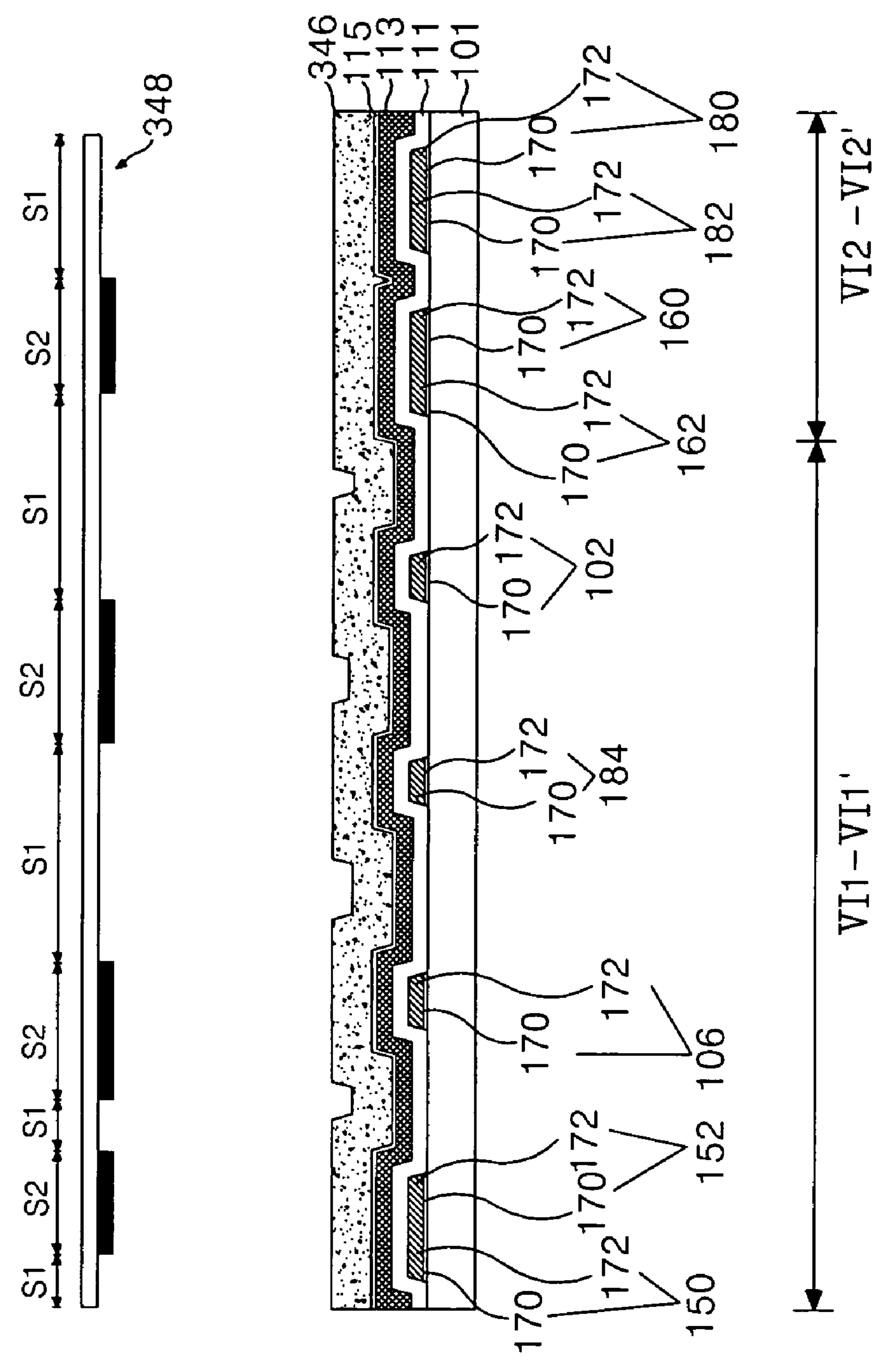
FIGS. 30A to 30C illustrate sectional views specifically describing the second mask process in the method fabricating the TFT array substrate according to the fifth embodiment of the present invention.

Referring to FIG. 30A, the gate insulating film 111, the first semiconductor layer 113, and the second semiconductor layer 115 may be sequentially formed on the lower substrate 101 and on the first conductive pattern group according to, for example, a deposition technique such as PECVD, sputtering or the like. A first photo-resist film 346 is then formed over the entire surface of the second semiconductor layer 115 and is photolithograpically patterned using a second mask pattern 348. According to principles of the present invention, the second mask pattern 348 may, for example, include a mask substrate defining a plurality of exposure areas S1 and a plurality of shielding areas S2.

Figure 30B:
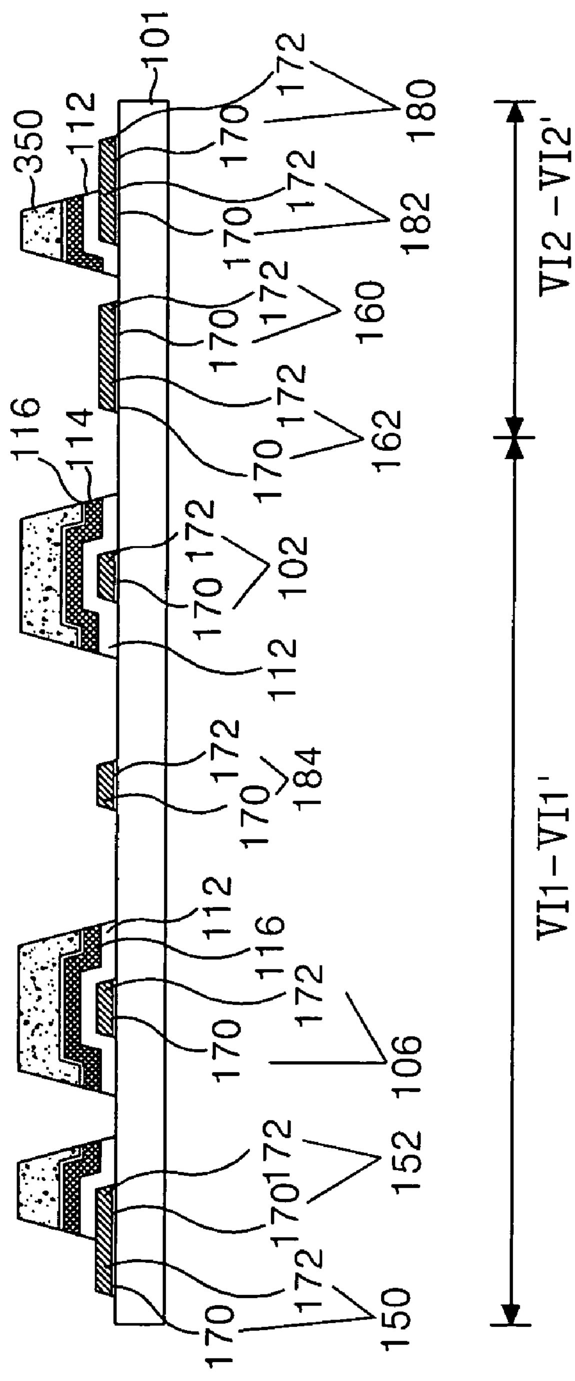
Figure 30C:
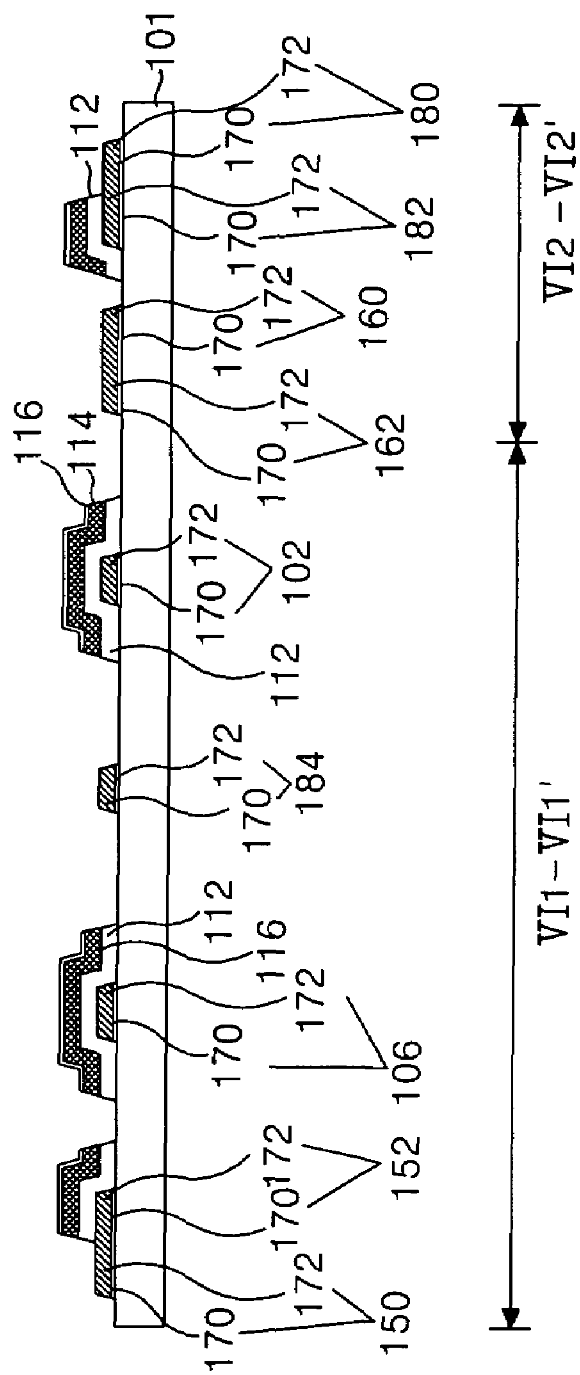

Referring to FIG. 30B, the first photo-resist film 346 may, via the second mask pattern 348, be selectively exposed to light and developed, thereby creating a first photo-resist pattern 350. The gate insulating film 111 and the first and second semiconductor layers 113 and 115 may then be patterned, via the first photo-resist pattern 350, using photolithographic and etching techniques to form the gate insulating pattern 112 in addition to the active and ohmic contact layers 114 and 116. After forming the gate insulating pattern 112 and the active and ohmic contact layers 114 and 116, the first photo-resist pattern 350 is stripped. As a result of the second mask process, and with reference to FIG. 30C, the gate pad 150, the data pad 160, the lower data link electrode 162, the common pad 180, and the common electrode 184 are exposed by the gate insulating pattern 112 and the active and ohmic contact layers 114 and 116.

Figure 31A:
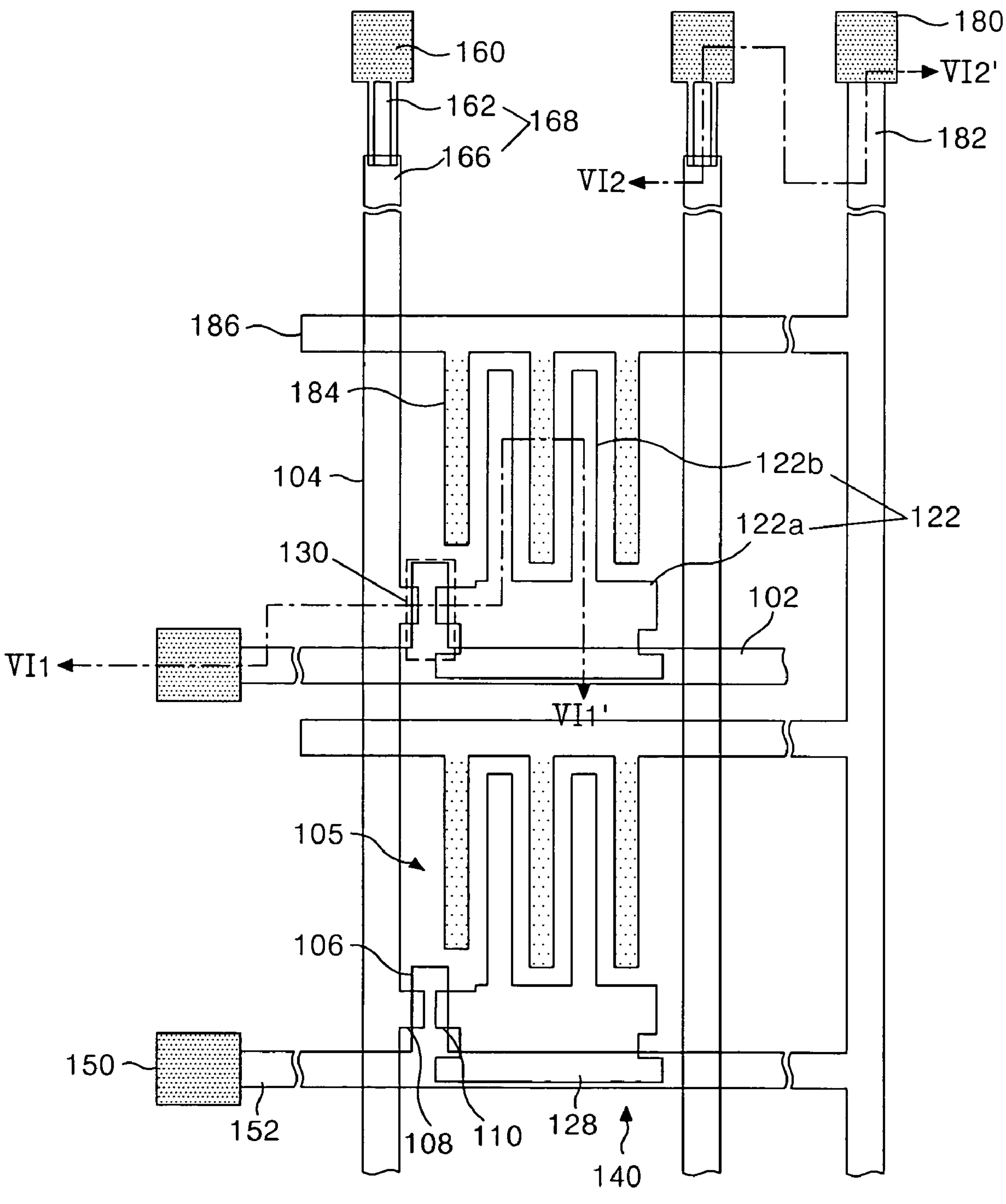
FIGS. 31A and 31B illustrate plan and section views generally describing a third mask process in the method of fabricating the TFT array substrate according to the fifth embodiment of the present invention.
Figure 31B:
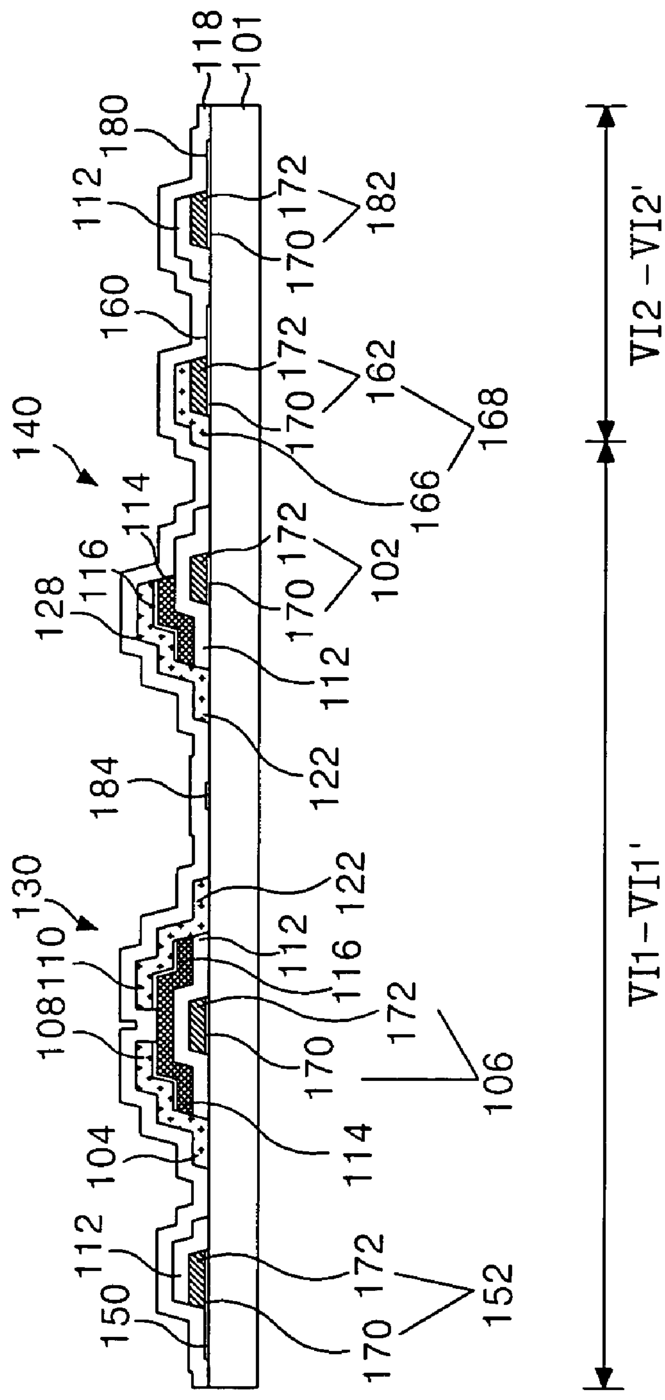

FIGS. 31A and 31B illustrate plan and section views generally describing a third mask process in the method of fabricating the TFT array substrate according to the fifth embodiment of the present invention.

Referring to FIGS. 31A and 31B, a second conductive pattern group may be formed on the lower substrate 101 and on the gate insulating pattern 112, in addition to the active and ohmic contact layers 114 and 116, in a third mask process. In one aspect of the present invention, the second conductive pattern group may, for example, include the data line 104, the source electrode 108, the drain electrode 110, the storage electrode 128, the upper data link electrode 166, and the pixel electrode 122. In another aspect of the present invention, portions of the gate metal material 172 included within the data pad 160, the gate pad 150, the common pad 180, the pixel electrode 122, and the common electrode 184 may, during the third mask process, be removed to expose the transparent conductive material 170 included therein.

The third mask process of the fifth embodiment described above will now be described in greater detail with reference to FIGS. 32A to 32E.

Figure 32A:
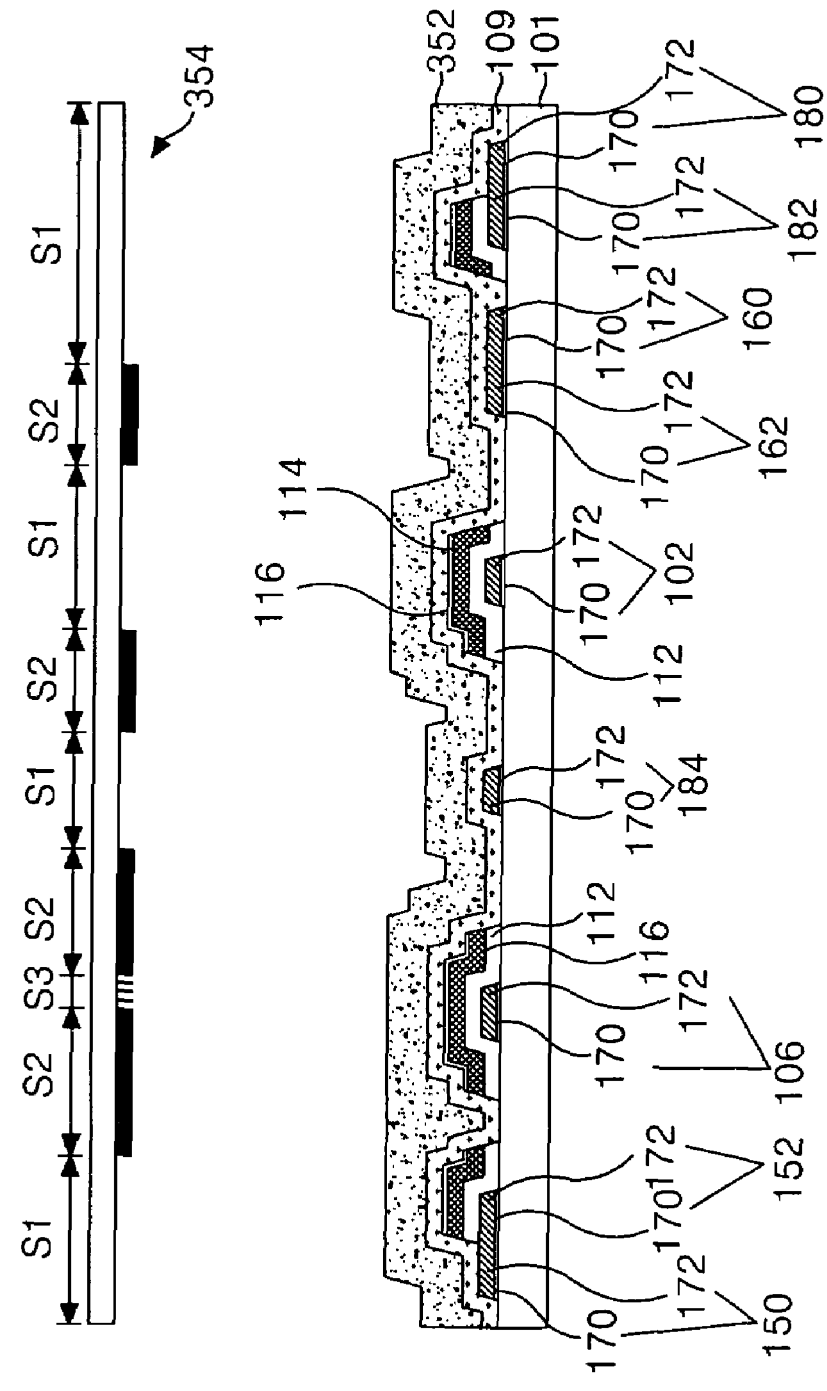
FIGS. 32A to 32E illustrate sectional views for specifically describing the third mask process in the method of fabricating the TFT array substrate according to the fifth embodiment of the present invention.

Referring to FIG. 32A, a data metal layer 109 may be formed on the lower substrate 101, the gate insulating pattern 112, and on the active and ohmic contact layers 114 and 116. In one aspect of the present invention, the data metal layer 109 may be formed using a deposition technique such as sputtering, or the like. In another aspect of the present invention, the data metal layer 109 may, for example, include a metal such as molybdenum (Mo), copper (Cu), or the like, or combinations thereof.

A second photo-resist film 352 is then formed over the entire surface of the data metal layer 109 and is photolithographically patterned using a third mask pattern 354. For example, the third mask pattern 354 may be provided as a partial-exposure mask and include a mask substrate formed of a suitably transparent material, a plurality of exposure areas S1, a plurality of shielding areas S2, and a partial-exposure area S3.

Figure 32B:
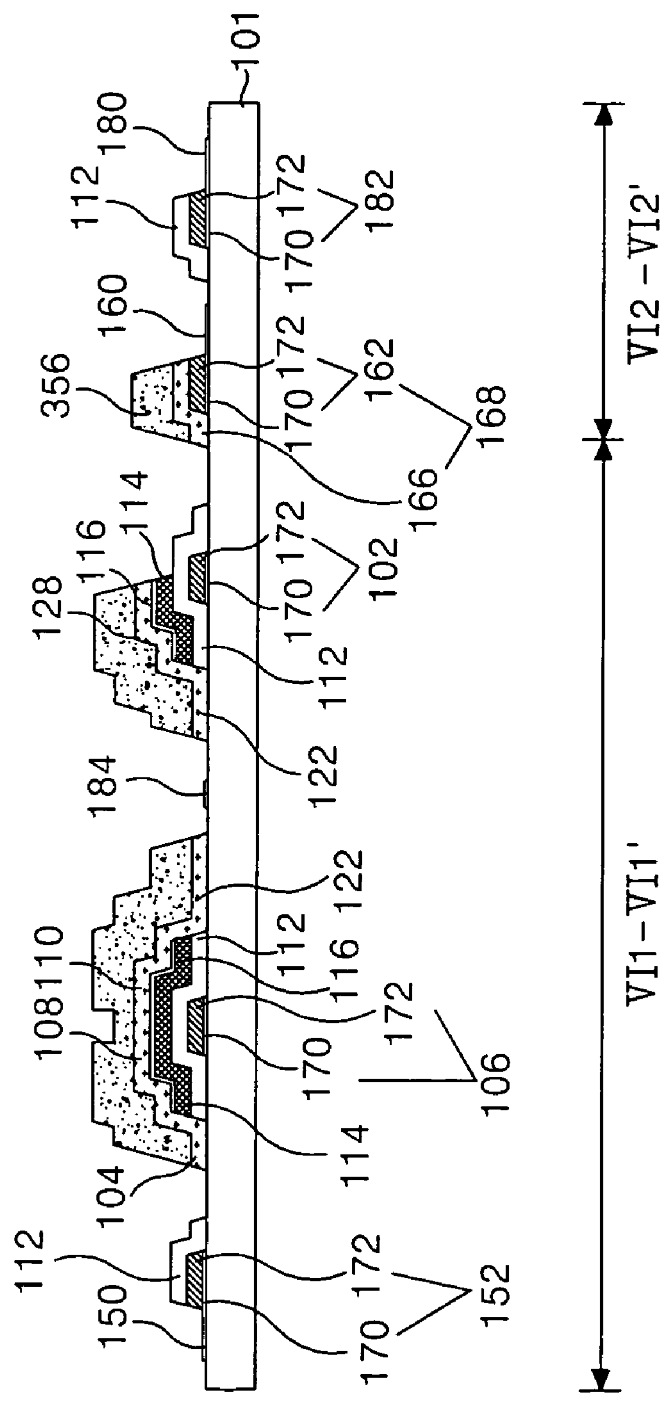

Referring to FIG. 32B, the second photo-resist film 352 may, via the third mask pattern 354, be selectively exposed to light and developed, thereby creating a second photo-resist pattern 356 having a step difference between the shielding and partial-exposure areas S2 and S3. Accordingly, the height of the second photo-resist pattern 356 within the partial-exposure area S3 may be lower than the height of the second photo-resist pattern 356 within the shielding areas S2.

Subsequently, the second photo-resist pattern 356 is used as a mask to pattern the data metal layer 109 in a wet etching technique and form the aforementioned second conductive pattern group (i.e., the storage electrode 128, the data line 104, the source electrode 108, the drain electrode 110, the pixel electrode 122, and the upper data link electrode 166) wherein the source and drain electrodes 108 and 110 are connected to each other in a region corresponding to partial-exposure area S3 (i.e., the channel region of a subsequently formed TFT 130), wherein the source electrode 108 is connected to one side of the data line 104, and wherein the upper data link electrode 166 is connected to another side of the data line 104. Using the second conductive pattern group and the gate insulating pattern 112 as a mask, portions of the gate metal material 172 included within the data pad 160, the gate pad 150, the common pad 180, and the common electrode 184 are removed to expose the transparent conductive material 170 included therein.

Next, the second photo-resist pattern 356 is used as a mask to pattern the active and ohmic contact layers 114 and 116 in a dry etching process. The patterning may, for example, include dry etching portions of the active and ohmic contact layers 114 and 116 that are not overlapped by the second conductive pattern group.

Figure 32C:
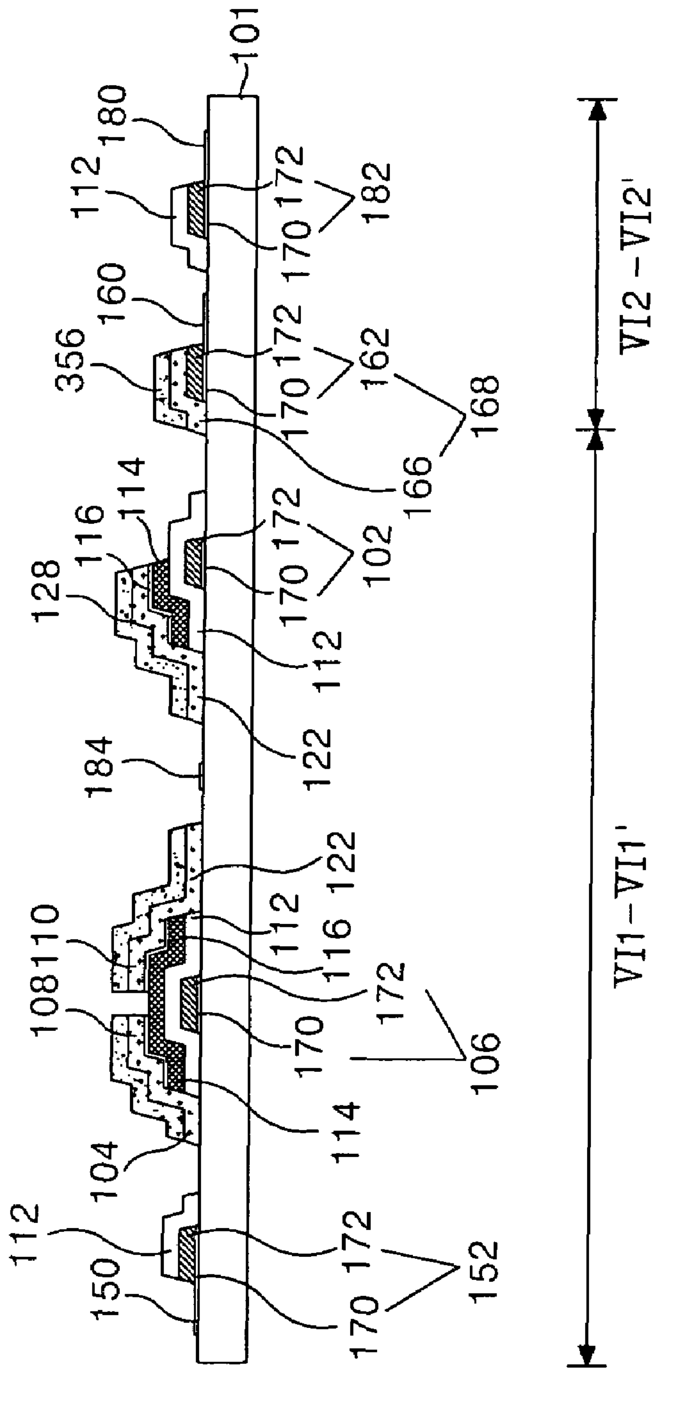
Figure 32D:
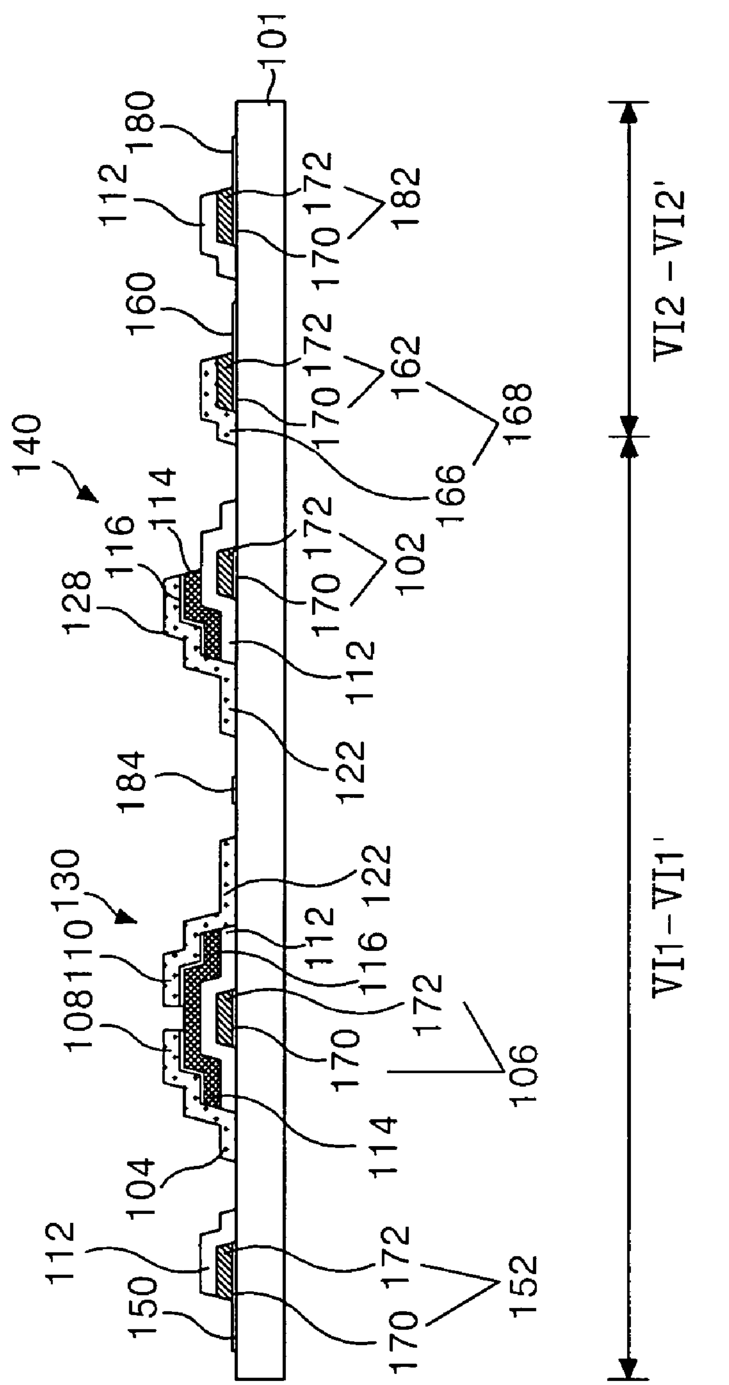

Referring to FIG. 32C, after the active and ohmic contact layers 114 and 116 are formed and patterned, the portion of the second photo-resist pattern 356 having the relatively lower height (i.e., the portion of the second photo-resist pattern 356 arranged within the channel region of the subsequently formed TFT 130, formed via the partial-exposure area S3 of the second mask pattern 354) is removed in an ashing process using oxygen ($O_2$) plasma. Upon performing the ashing process, the relatively thicker portions of the second photo-resist pattern 356 (i.e., portions of the second photo-resist pattern 356 arranged outside the channel region of the subsequently formed TFT 130, formed via the shielding areas S2) are thinned but, nevertheless, remain. Using the thinned second photo-resist pattern 356 as a mask, portions of the data metal layer 109 and the ohmic contact layer 116 in the channel portion of the subsequently formed TFT 130 are removed in an etching process. As a result, the active layer 114 within the channel portion is exposed and the source electrode 108 is disconnected from the drain electrode 110. With reference to FIG. 32D, the remaining second photo-resist pattern 356 is then removed in a stripping process.

Figure 32E:
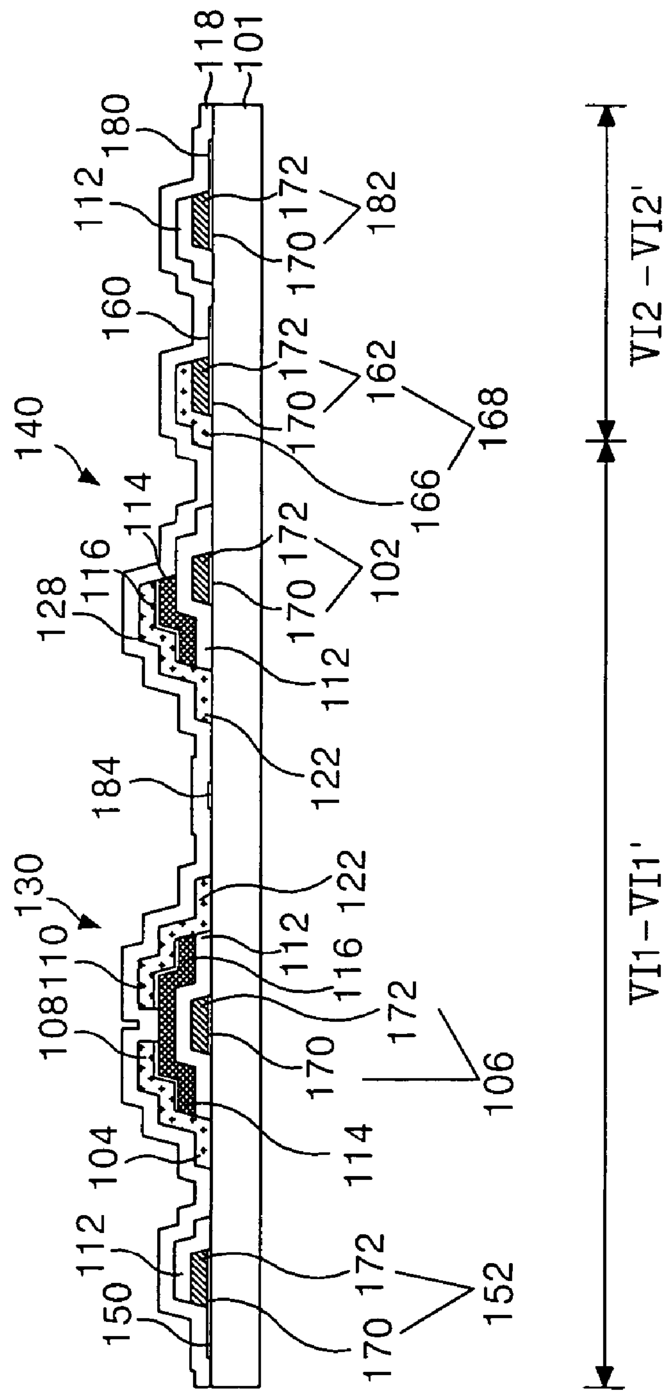

Referring next to FIG. 32E, the protective film 118 is formed over the entire surface of the substrate 101 and on the second conductive pattern group.

Figure 33:
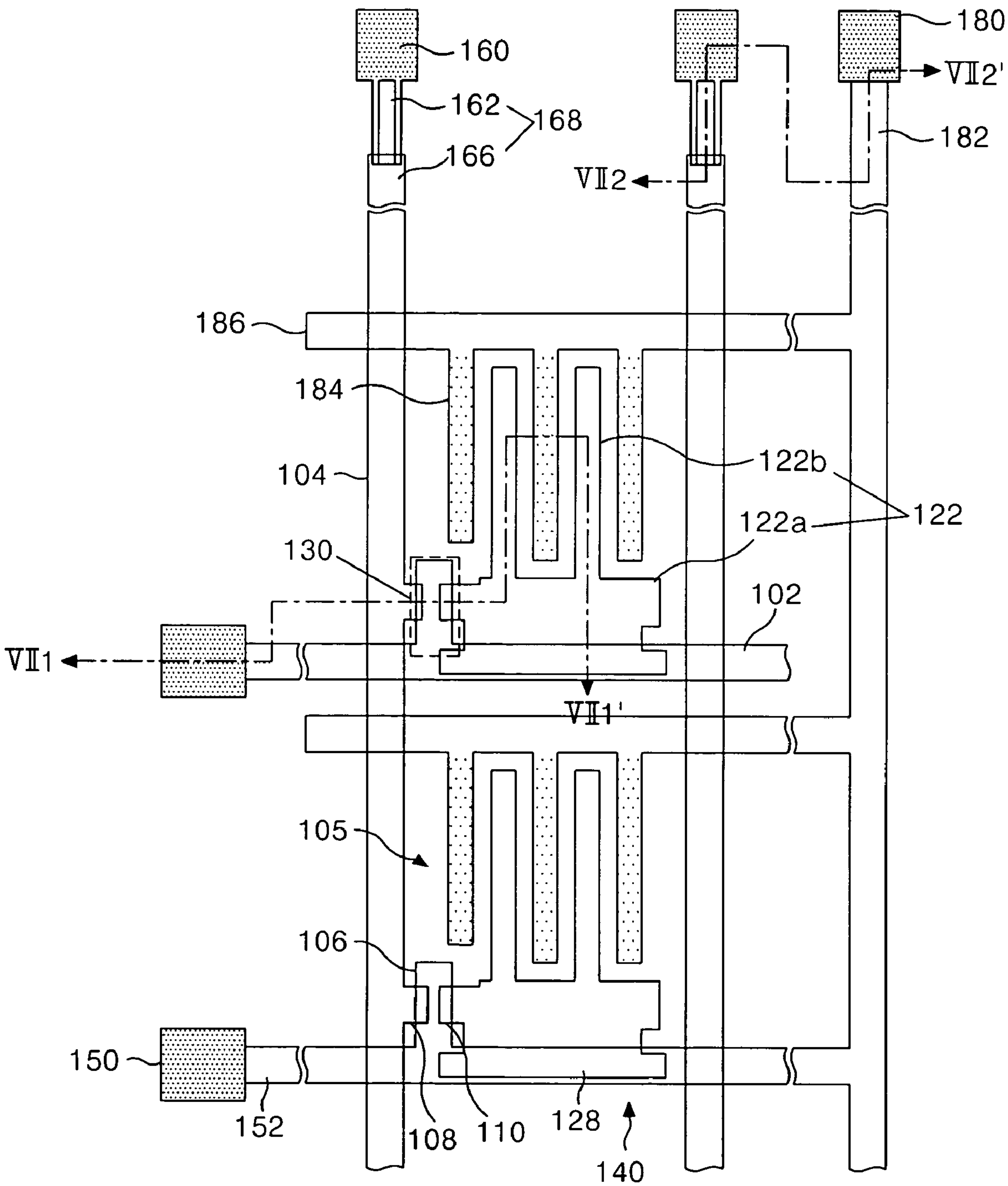
FIG. 33 illustrates a plan view of a TFT array substrate in an IPS mode LCD device according to a sixth embodiment of the present invention.
Figure 34:
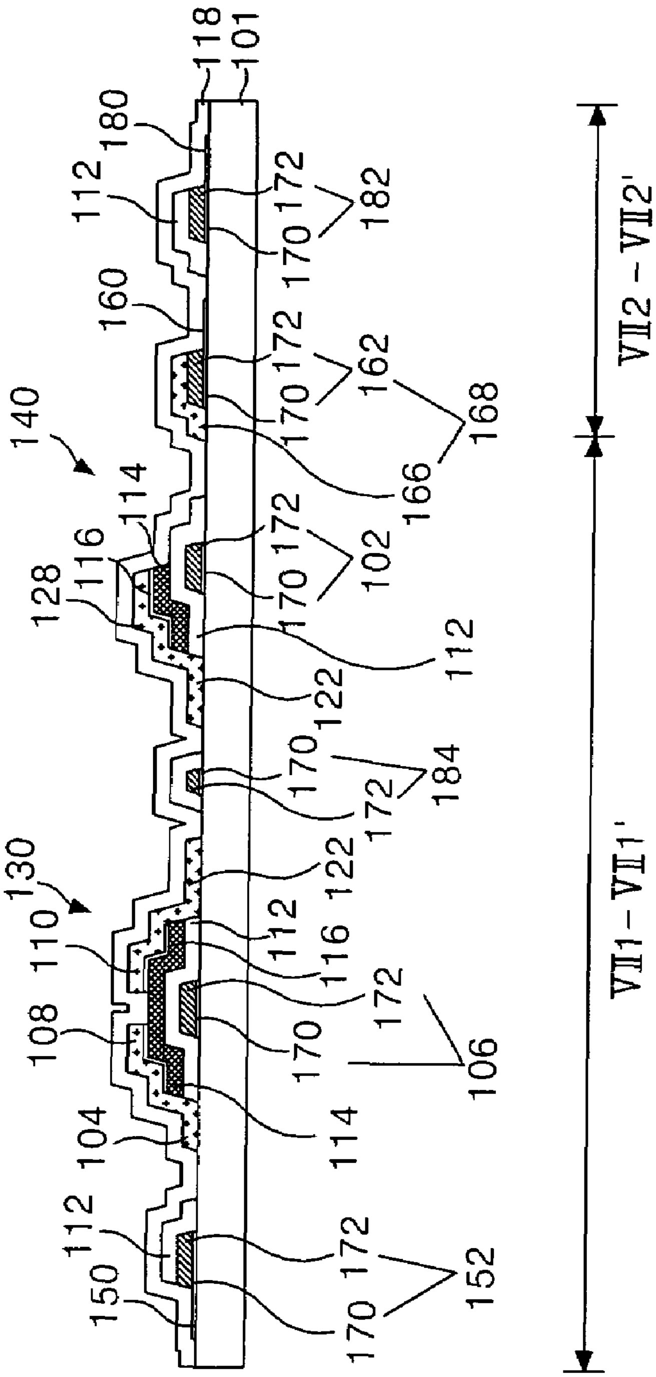
FIG. 34 illustrates a sectional view of the TFT array substrate taken along lines VII1-VII1' and VII2-VII2' shown in FIG. 33.

FIG. 33 illustrates a plan view of a TFT array substrate in an IPS mode LCD device according to a sixth embodiment of the present invention. FIG. 34 illustrates a sectional view of the TFT array substrate taken along lines VII1-VII1' and VII2-VII2' shown in FIG. 33.

The TFT array substrate shown in FIGS. 33 and 34, and method of fabricating the same, is, in many respects, similar to the TFT array substrate shown in FIGS. 26 and 27 but is different with respect to the common electrode. Thus, for the sake of brevity, a detailed explanation of elements similar to both the sixth and fifth embodiments will be omitted.

The common electrode 184 may be connected to the common line 186 and may comprise the transparent conductive material 170 and the overlaying gate metal material 172. In one aspect of the present invention, the common electrode 184 is oriented parallel to the plurality of pixel finger parts 122*b*.

The common pad 180 extends from the common line 186 and is connected to the common electrode 184. The gate pad 150 extends from the gate line 102 parallel to the common line 186 and the data pad 160 extends from the data line 104. The gate and data lines 102 and 104 cross each other and are electrically insulated from each other. Portions of the coplanar transparent conductive material 170 comprised within the gate pad 150, the data pad 160, the common pad 180, and the pixel electrode 122 are exposed to ensure high reliability against corrosion.

Similar to the embodiments discussed above, the TFT array substrate in the sixth embodiment of the present invention may be fabricated using a three-mask process. The first mask process used to form the TFT array substrate of the sixth embodiment is similar to the first and second mask processes previously discussed above with respect to the fifth embodiment of the present invention. Therefore, a description of the first mask process will be briefly explained.

Similar to the process illustrated in FIGS. 28A and 28B, a first conductive pattern group may be formed on the lower substrate 101 in a first mask process. In one aspect of the present invention, the first conductive pattern group may, for example, include the gate line 102, the gate electrode 106, the gate link 152, the gate pad 150, the data pad 160, the lower data link electrode 162, the common line 186, the common link 182, and the common pad 180. In another aspect of the present invention, the first conductive pattern group may comprise the transparent conductive material 170 and the overlaying gate metal material 172.

The second mask process of the sixth embodiment will now be described in greater detail with respect to FIGS. 35A to 35C.

Figure 35A:
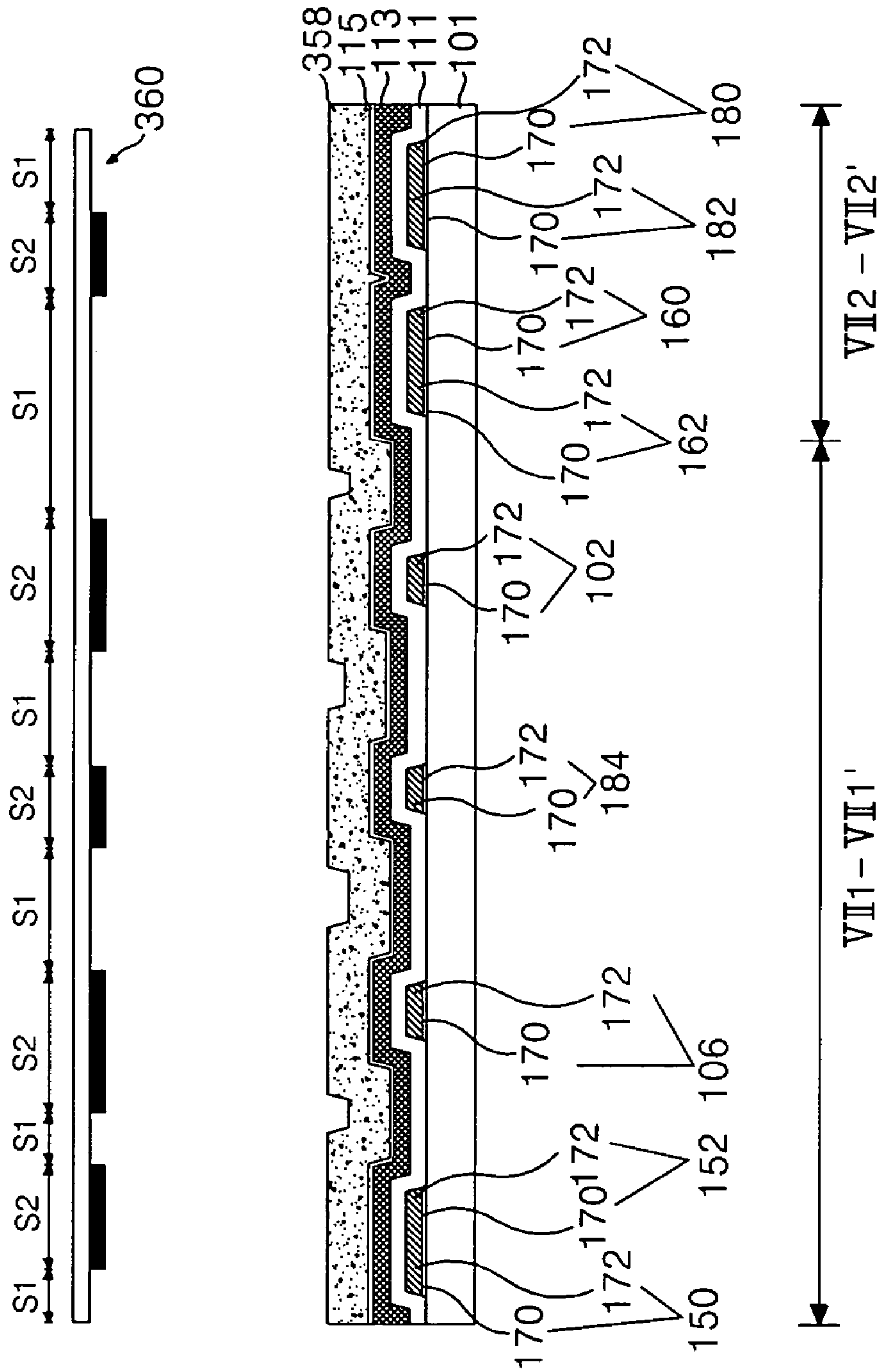
FIGS. 35A to 35C illustrate sectional views generally describing a method of fabricating the TFT array substrate according to the sixth embodiment of the present invention.

Referring to FIG. 35A, the gate insulating film 111, the first semiconductor layer 113, and the second semiconductor layer 115 may be sequentially formed on the lower substrate 101 and on the first conductive pattern group according to, for example, a deposition technique such as PECVD, sputtering, or the like. A first photo-resist film 358 is then formed over the entire surface of the second semiconductor layer 115 and is photolithographically patterned using a second mask pattern 360. According to principles of the present invention, the second mask pattern 360 may, for example, include a mask substrate defining a plurality of exposure areas S1 and a plurality of shielding areas S2.

Figure 35B:
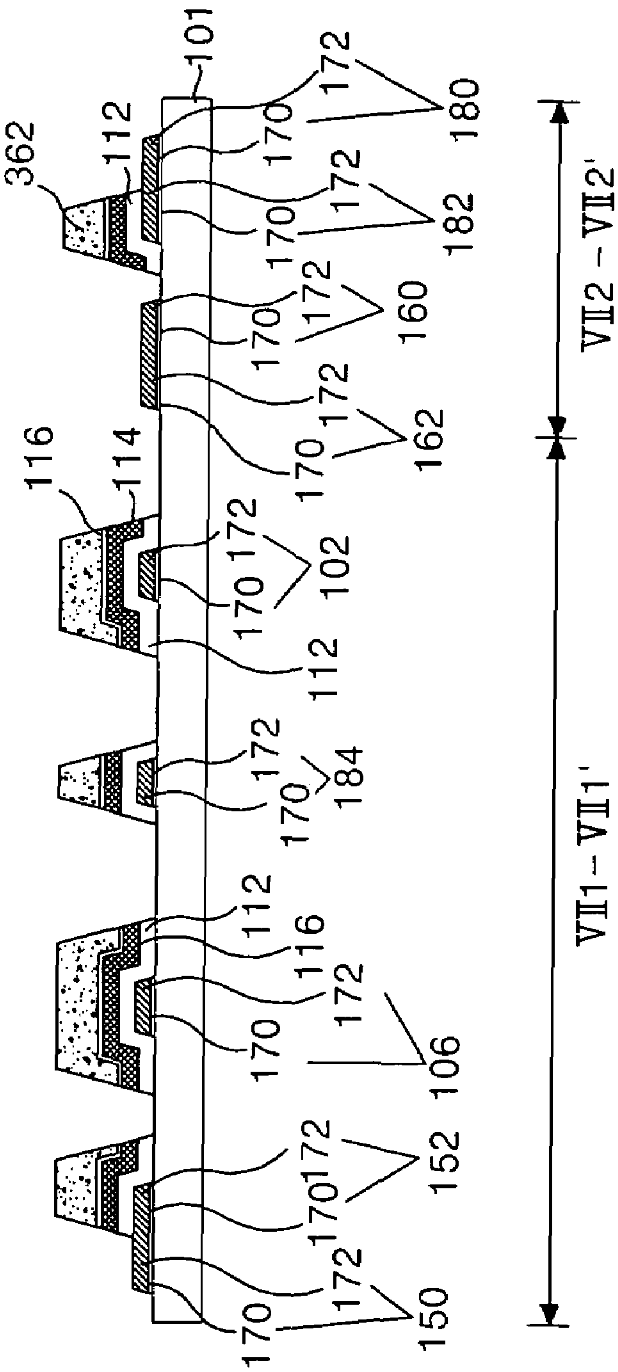
Figure 35C:
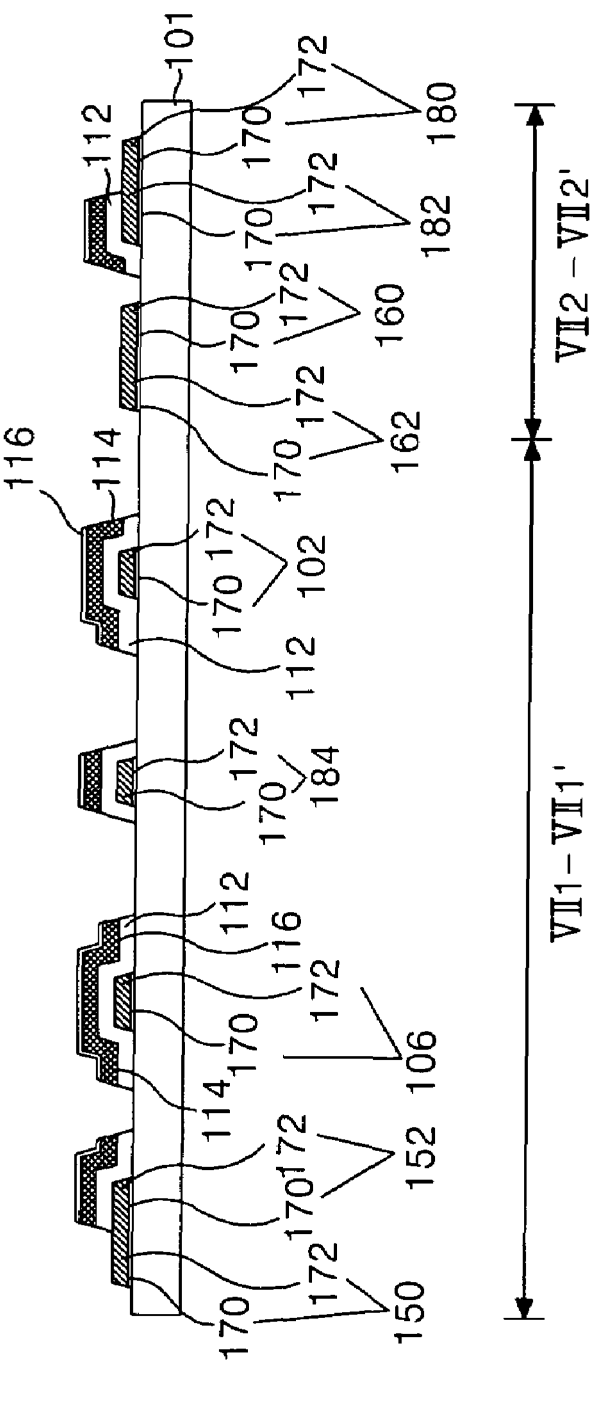

Referring to FIG. 35B, the first photo-resist film 358 may, via the second mask pattern 360, be selectively exposed to light and developed, thereby creating a first photo-resist pattern 362. The gate insulating film 111 and the first and second semiconductor layers 113 and 115 may then be patterned, via the first photo-resist pattern 362, using photolithographic and etching techniques to form the gate insulating pattern 112 in addition to the active and ohmic contact layers 114 and 116. After forming the gate insulating pattern 112 and the active and ohmic contact layers 114 and 116, the first photo-resist pattern 362 is stripped. As a result of the second mask process, and with reference to FIG. 35C, the gate pad 150, the data pad 160, the lower data link electrode 162, and the common pad 180 are exposed by the gate insulating pattern 112 and the active and ohmic contact layers 114 and 116.

The third mask process of the sixth embodiment will now be described in greater detail with respect to FIGS. 36A to 36E.

Figure 36A:
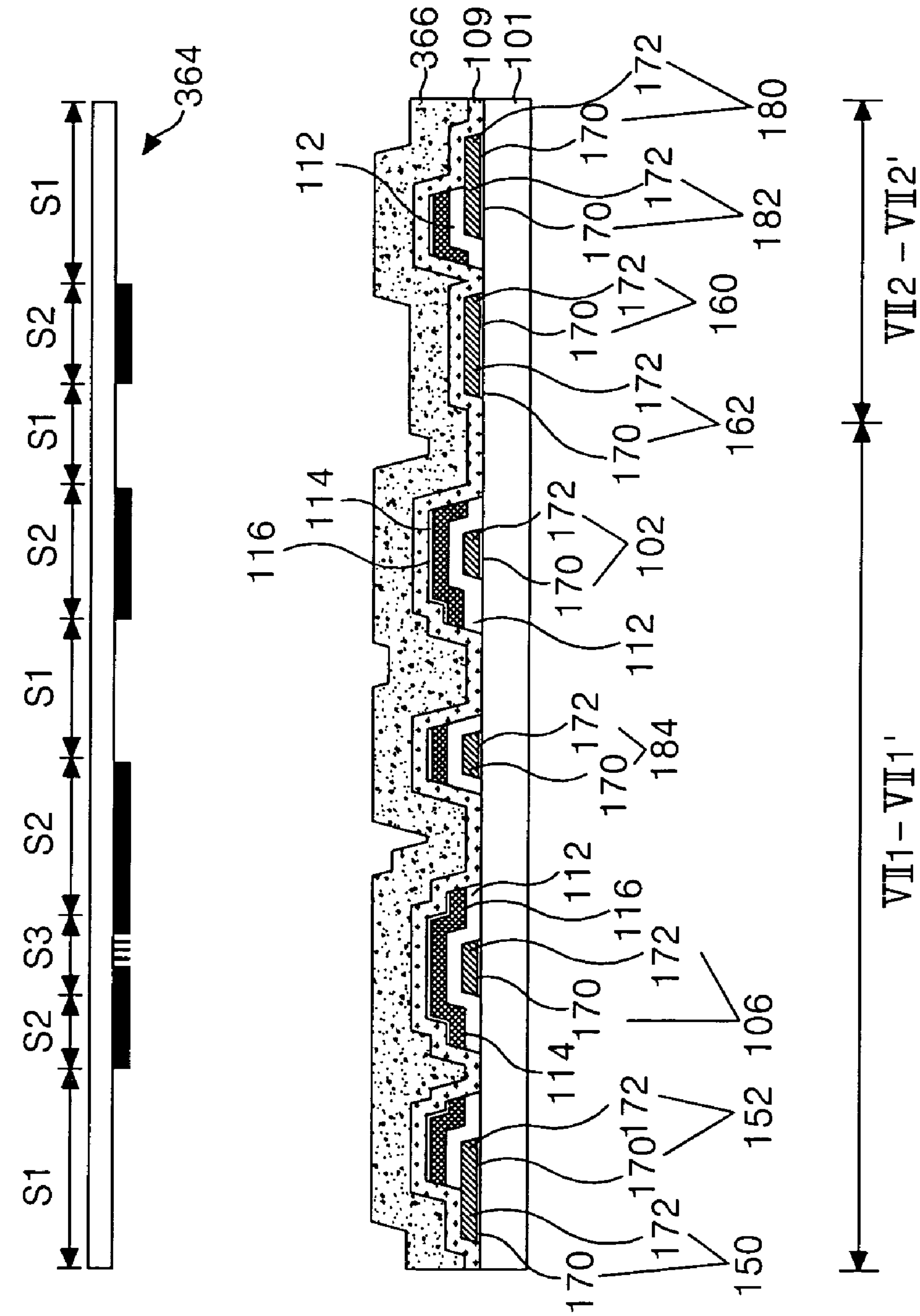
FIGS. 36A to 36E illustrate sectional views specifically describing a third mask process in the method of fabricating the TFT array substrate according to the sixth embodiment of the present invention.
Figure 36B:
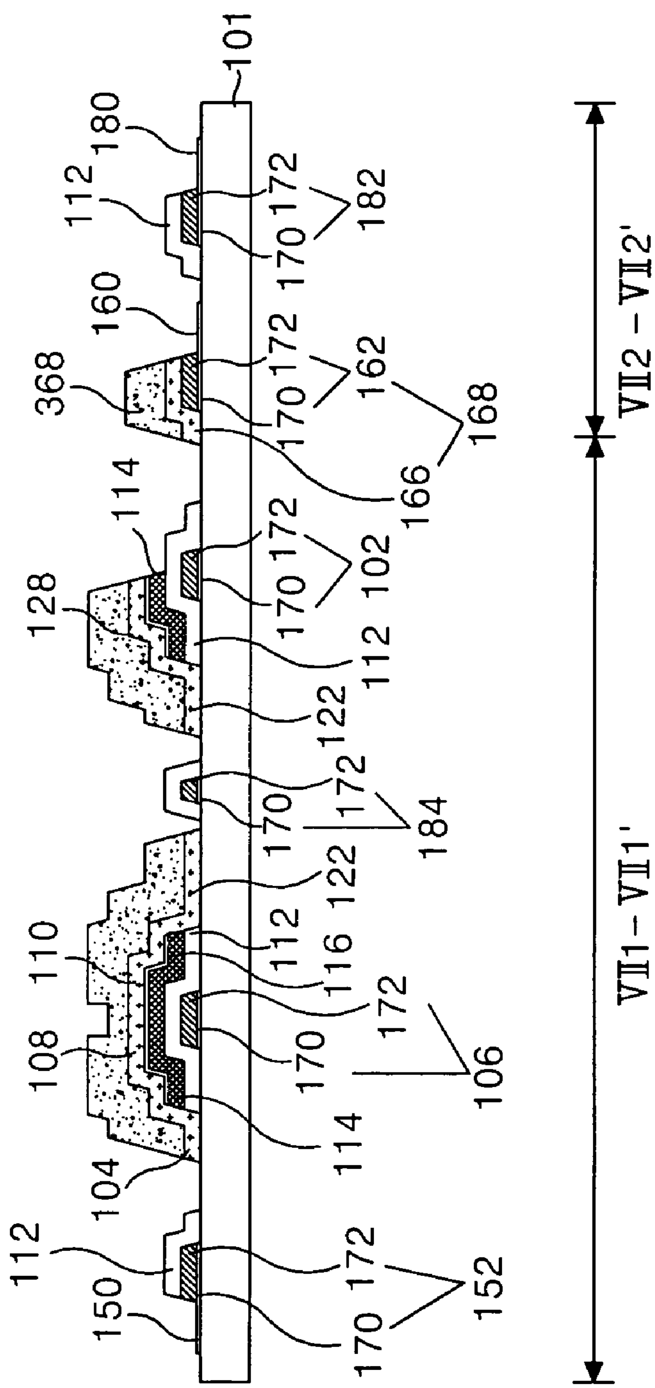

Referring to FIG. 36A, a second conductive pattern group may be formed on the lower substrate 101 and on the gate insulating pattern 112, in addition to the active and ohmic contact layers 114 and 116, in a third mask process. In one aspect of the present invention, the second conductive pattern group may, for example, include the data line 104, the source electrode 108, the drain electrode 110, the storage electrode 128, the upper data link electrode 166, and the pixel electrode 122. In another aspect of the present invention, portions of the gate metal material 172 included within the data pad 160, the gate pad 150, the common pad 180, and the common electrode 184 may, during the third mask process, be removed to expose the transparent conductive material 170 included therein.

Referring to FIG. 36A, a data metal layer 109 may be formed on the lower substrate 101, the gate insulating pattern 112, and on the active and ohmic contact layers 114 and 116.

A second photo-resist film 366 is then formed over the entire surface of the data metal layer 209 and is photolithographically patterned using a third mask pattern 364. For example, the third mask pattern 364 that may be provided as a partial-exposure mask and include a mask substrate formed of a suitably transparent material, a plurality of exposure areas S1, a plurality of shielding areas S2, and a partial-exposure area S3.

Referring to 36B, the second photo-resist film 366 may, via the third mask pattern 364, be selectively exposed to light and developed, thereby creating a photo-resist pattern 368 having step difference between the shielding and partial-exposure areas S2 and S3. Accordingly, the height of the second photo-resist pattern 368 within the partial-exposure area S3 may be lower than the height of the second photo-resist pattern 368 within the shielding areas S2.

Subsequently, the second photo-resist pattern 368 is used as a mask to pattern the data metal layer 109 in a wet etching technique and form the aforementioned second conductive pattern group (i.e., the storage electrode 128, the data line 104, the source electrode 108, the drain electrode 110, the pixel electrode 122, and the upper data link electrode 166) wherein the source and drain electrodes 108 and 110 are connected to each other in a region corresponding to partial-exposure area S3 (i.e., the channel region of a subsequently formed TFT 130), wherein the source electrode 108 is connected to one side of the data line 104, and wherein the upper data link electrode 166 is connected to another side of the data line 104. Using the second conductive pattern group and the gate insulating pattern 112 as a mask, portions of the gate metal material 172 included within the data pad 160, the gate pad 150, the common pad 180, and the common electrode 184 are removed to expose the transparent conductive material 170 included therein.

Next, the second photo-resist pattern 368 is used as a mask to pattern the active and ohmic contact layers 114 and 116 in a dry etching process. The patterning may, for example, include dry etching portions of the active and ohmic contact layers 114 and 116 that are not overlapped by the second conductive pattern group.

Figure 36C:
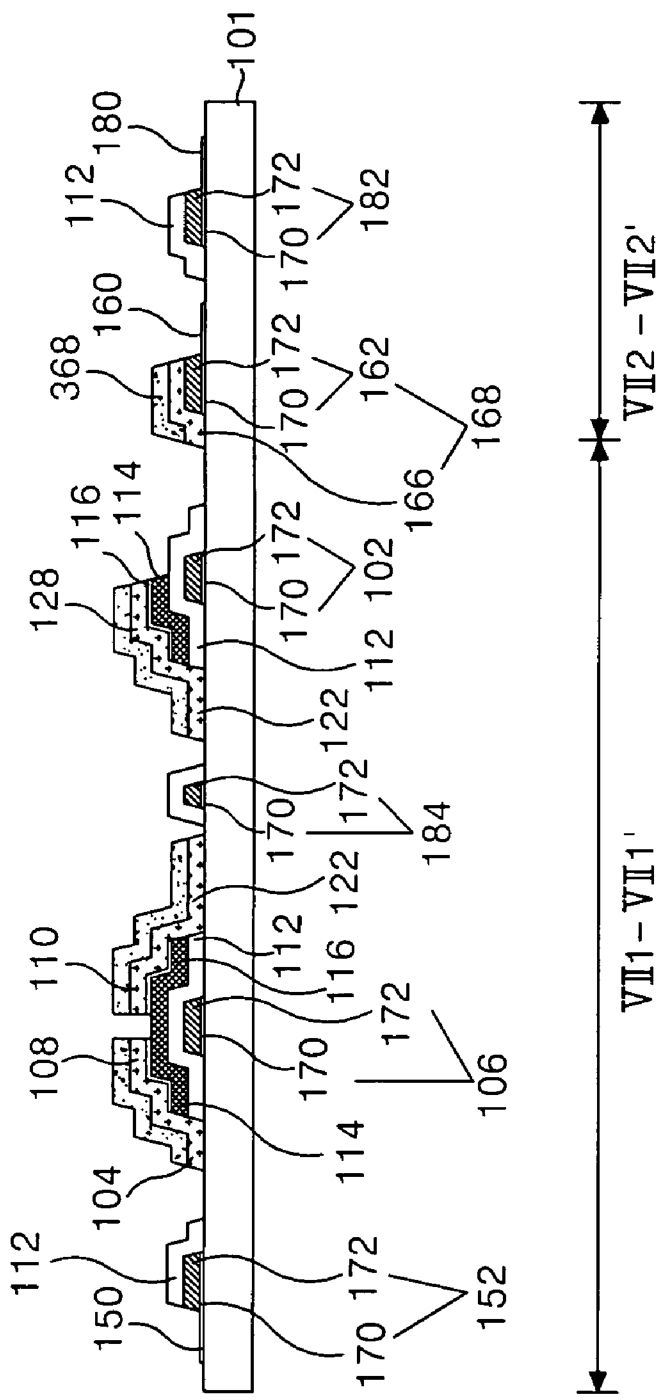
Figure 36D:
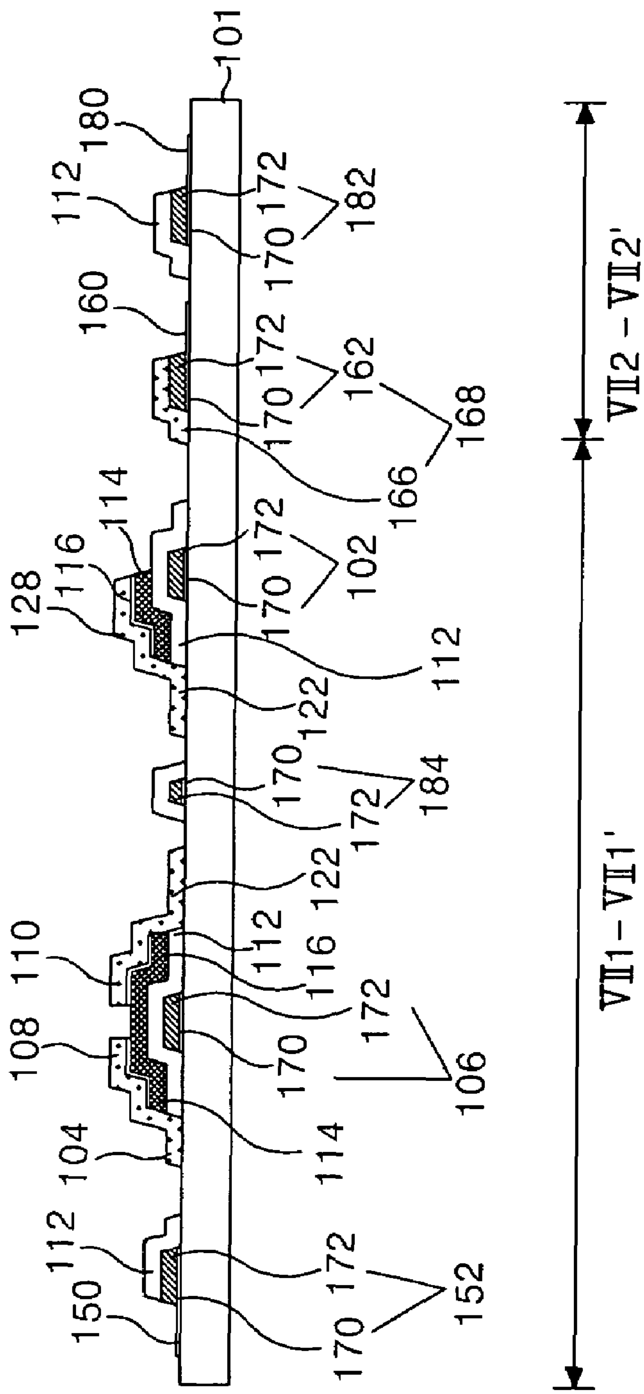

Referring to FIG. 36C, after the active and ohmic contact layers 114 and 116 are formed and patterned, the portion of the second photo-resist pattern 368 having the relatively lower height (i.e., the portion of the second photo-resist pattern 368 arranged within the channel region of the subsequently formed TFT 130, formed via the partial-exposure area S3 of the second mask pattern 364) is removed in an ashing process using oxygen ($O_2$) plasma. Upon performing the ashing process, the relatively thicker portions of the second photo-resist pattern 368 (i.e., portions of the second photo-resist pattern 368 arranged outside the channel region of the subsequently formed TFT 130, formed via the shielding areas S2) are thinned but, nevertheless, remain. Using the thinned second photo-resist pattern 356 as a mask, portions of the data metal layer 109 and the ohmic contact layer 116 in the channel portion of the subsequently formed TFT 130 are removed in an etching process. As a result, the active layer 114 within the channel portion is exposed and the source electrode 108 is disconnected from the drain electrode 110. With reference to FIG. 36D, the remaining second photo-resist pattern 368 is then removed in a stripping process.

Figure 36E:
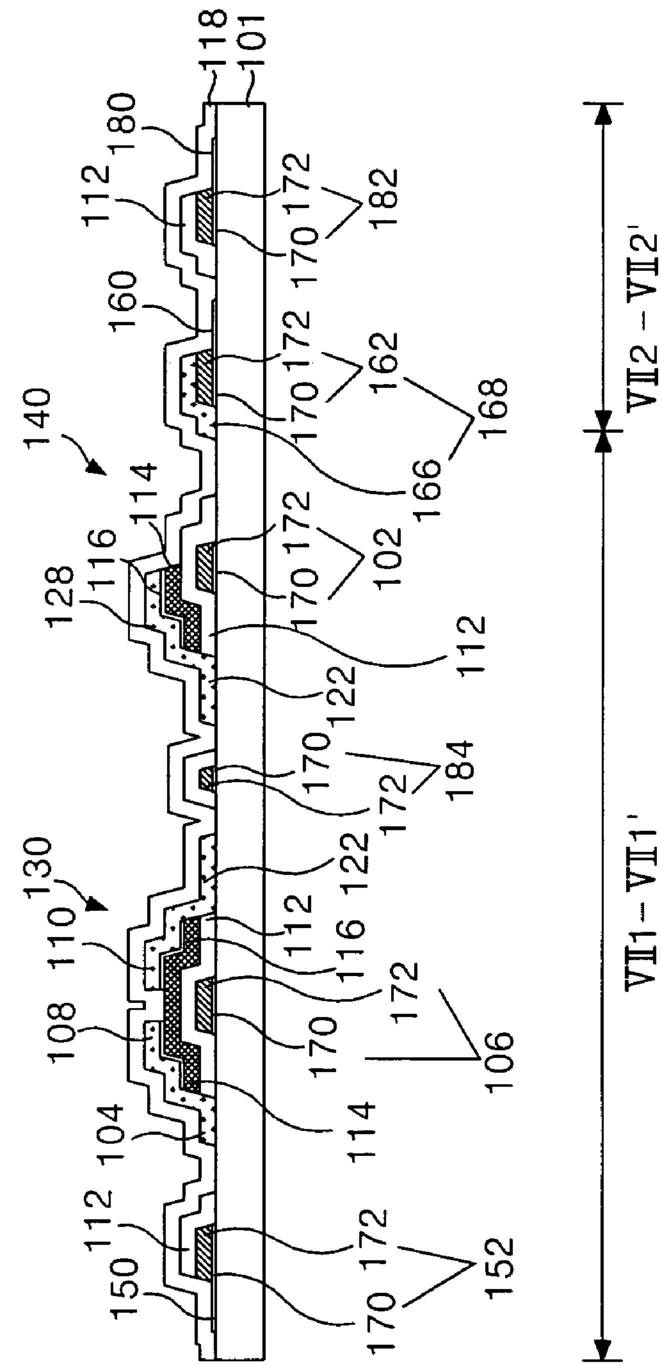

Referring next to FIG. 36E, the protective film 118 is formed over the entire surface of the substrate 101 and on the second conductive pattern group.

Figure 37:
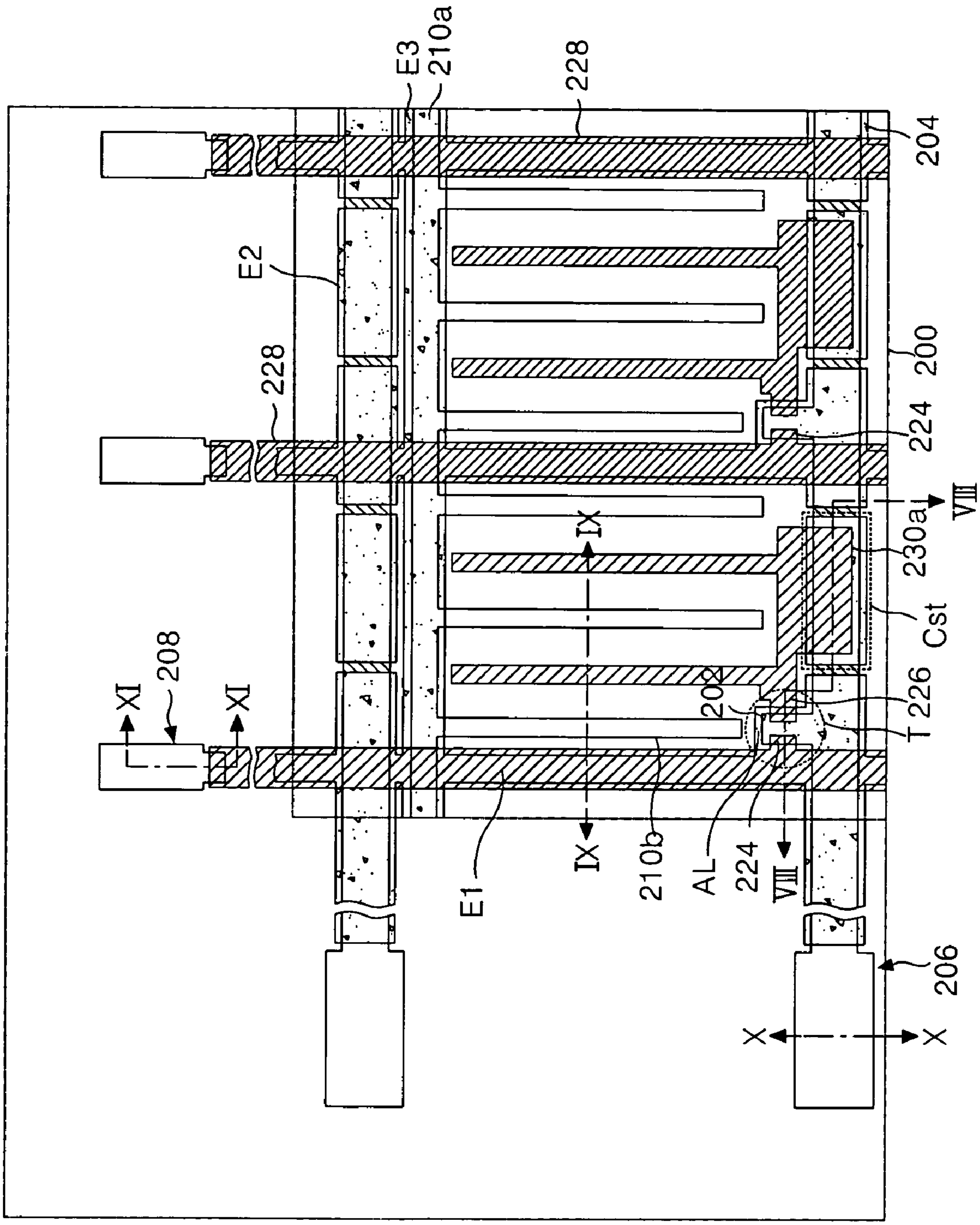
FIG. 37 illustrates a plan view of a TFT array substrate in an LPS mode LCD device according to a seventh embodiment of the present invention.
Figure 38:
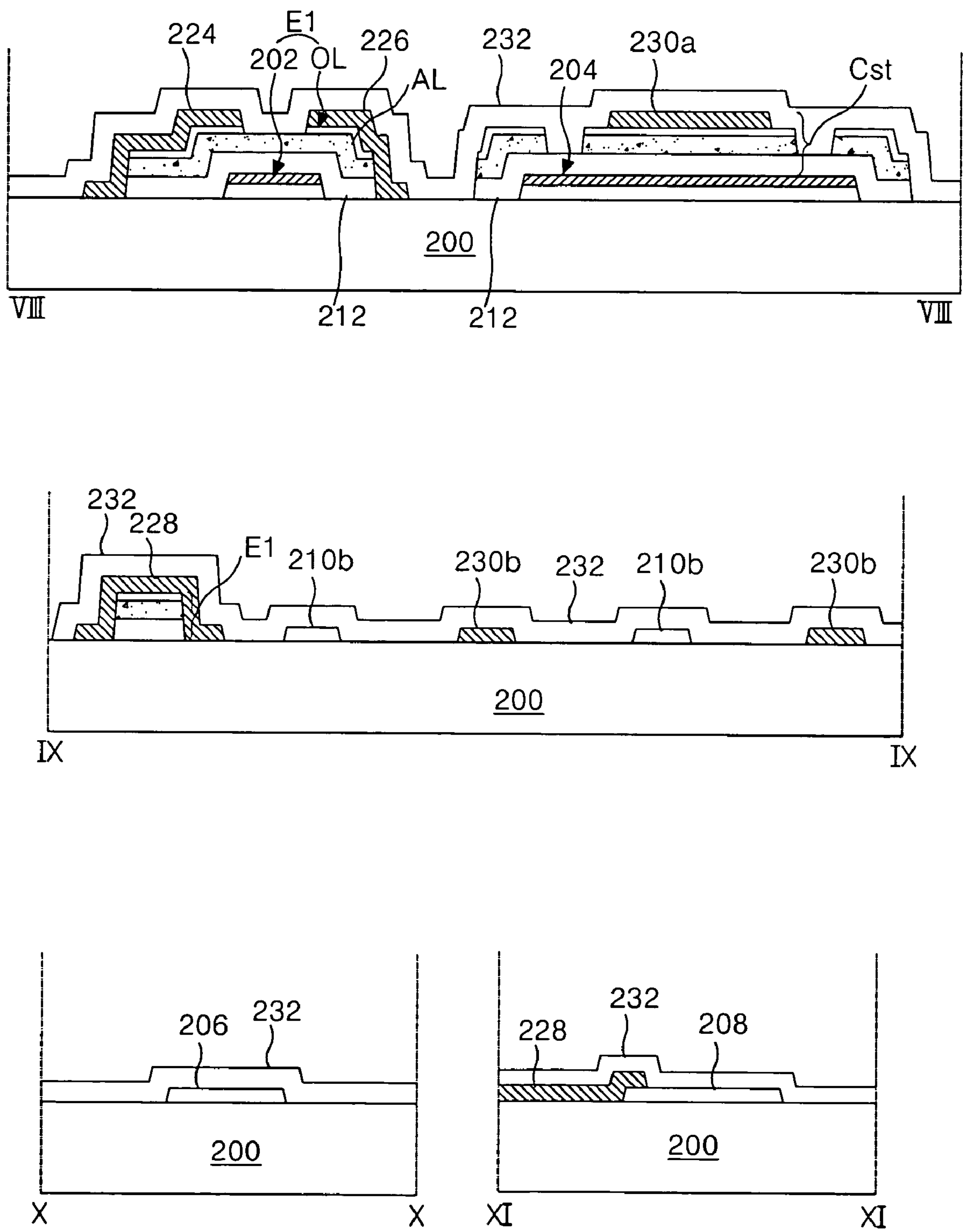
FIG. 38 illustrates a sectional view of the TFT array substrate taken along lines VIII-VIII', IX-IX', X-X' and XI-XI' shown in FIG. 37.

FIG. 37 illustrates a plan view of a TFT array substrate in an IPS mode LCD device according to a seventh embodiment of the present invention. FIG. 38 illustrates a sectional view of the TFT array substrate taken along lines VIII-VIII', IX-IX', X-X' and XI-XI' shown in FIG. 37.

The TFT array substrate shown in FIGS. 37 and 38, and method of fabricating the same, is, in many respects, similar to the TFT array substrate shown in FIGS. 26 and 27 but is different with respect to the structural relationship between semiconductor patterns, the gate and common lines, and the second conductive pattern group. Thus, for the sake of brevity, a detailed explanation of elements similar to both the seventh and fifth embodiments will be omitted.

Referring to FIGS. 37 and 38, the TFT array substrate according to the seventh embodiment of the present invention include first, second, and third semiconductor patterns E1, E2, and E3, respectively.

The first semiconductor pattern E1 is formed along a lower portion of data line 228 and at the thin film transistor (T). Along the lower portion of data line 228, the first semiconductor pattern E1 functions as a buffer layer. At the thin film transistor T, the first semiconductor pattern E1 defines a channel between source and drain electrodes 224 and 226. Spaced apart from the first semiconductor pattern E1, the second semiconductor pattern E2 is formed on the gate line 204 in a storage capacitor (Cst) area. The third semiconductor pattern E3 is formed on a common line 210*a* and is connected to the first semiconductor pattern E1.

According to the seventh embodiment of the present invention, the TFT array substrate may include an exposed common pad (not shown), an exposed gate pad 206, and an exposed data pad 208 formed of a corrosion resistant material such as a transparent conductive material A1.

A method of fabricating the TFT array substrate according to the seventh embodiment of the present invention illustrated in FIGS. 37 and 38 will now be described in greater detail below.

Figure 39A:
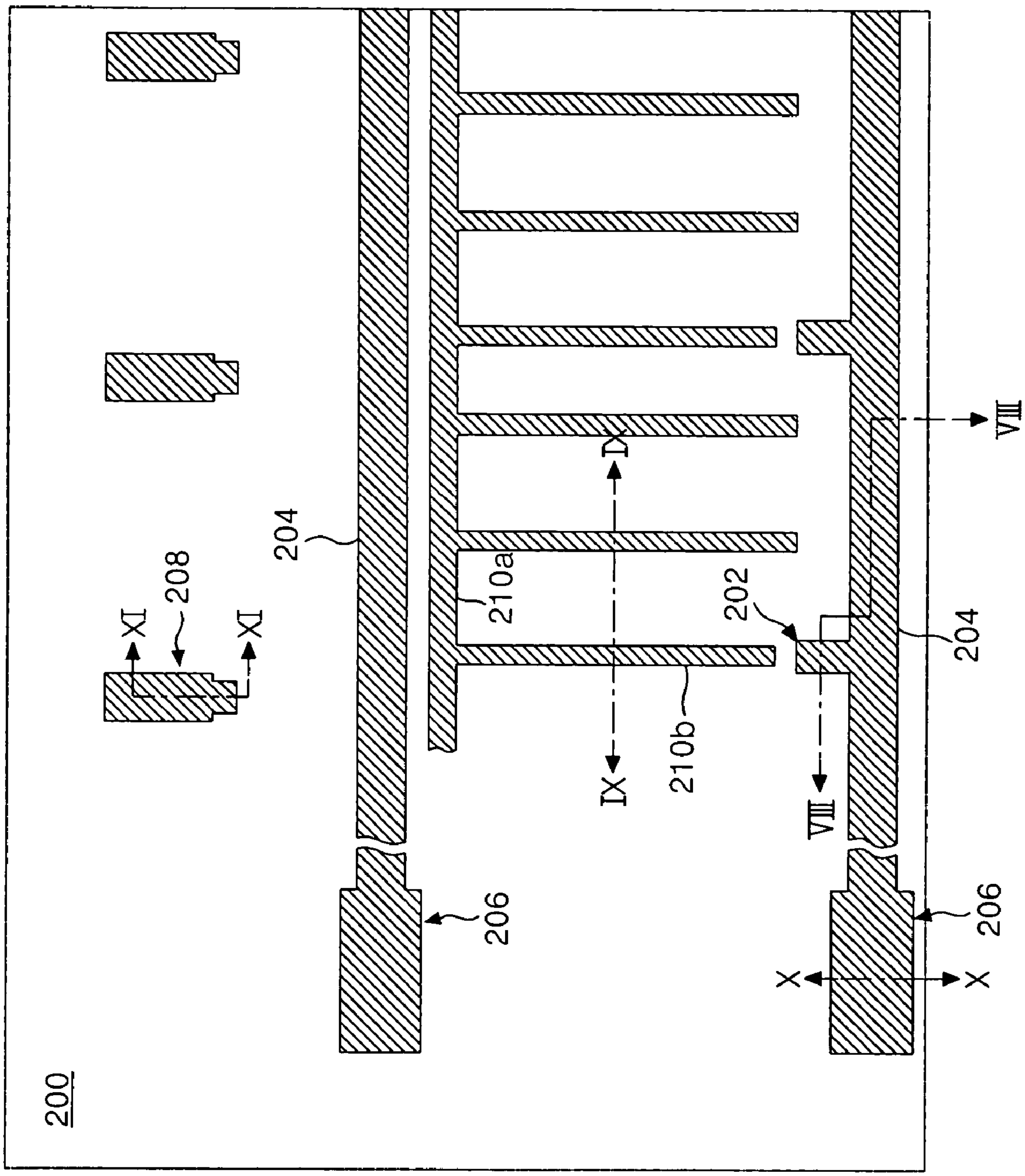
FIGS. 39A and 39B illustrate plan and sectional views, respectively, describing a first mask process in the method of fabricating the TFT array substrate according to the seventh embodiment of the present invention.
Figure 39B:
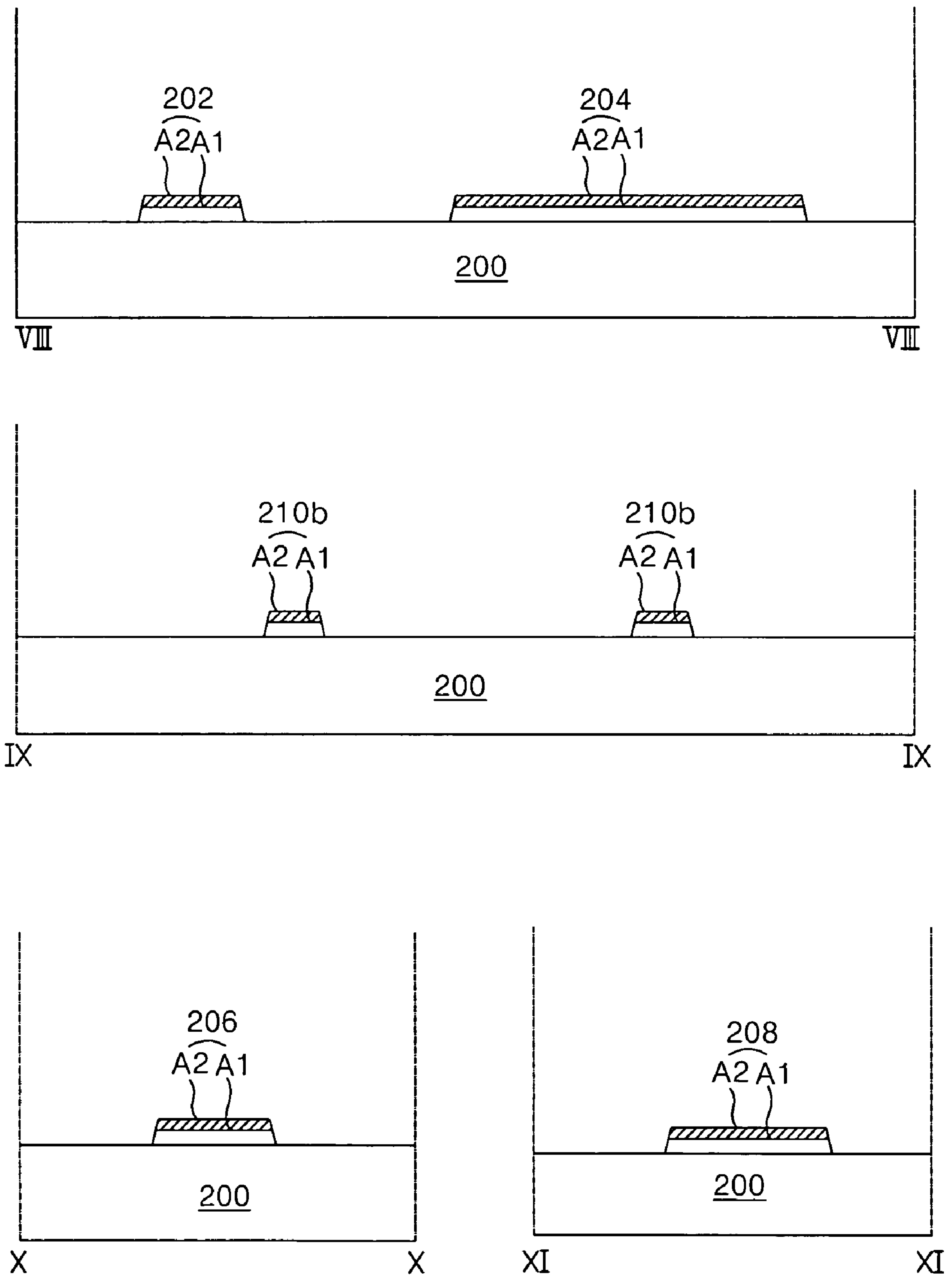

FIGS. 39A and 39B illustrate plan and sectional views, respectively, describing a first mask process in the method of fabricating the TFT array substrate according to the seventh embodiment of the present invention.

Referring to FIGS. 39A and 39B, a first conductive pattern group may be formed on a lower substrate 200 in a first mask process. In one aspect of the present invention, the first conductive pattern group may, for example, include the gate line 204, a gate electrode 202, the gate pad 206, the data pad 208, the common electrode 210*b*, a common line 210*a*, and the common pad (not shown). In one aspect of the present invention, the first conductive pattern group may comprise a transparent conductive material A1 and the gate metal material A2 sequentially deposited on the lower substrate 101. The transparent conductive material A1 and gate metal layer A2 may then be patterned using photolithographic and etching techniques using a first mask pattern to provide the aforementioned first conductive pattern group.

Figure 40A:
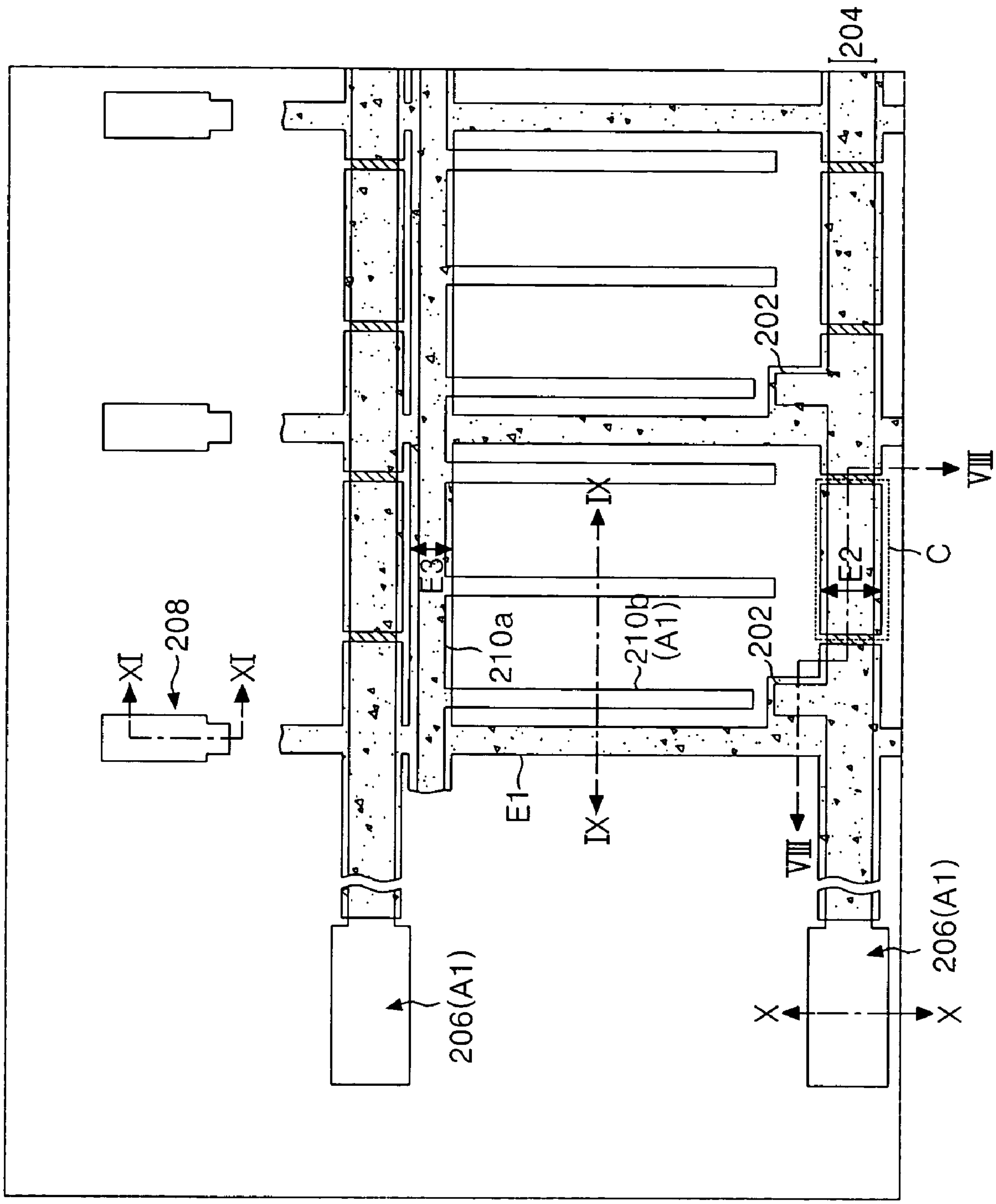
FIGS. 40A and 40B illustrate plan and sectional views, respectively, generally describing a second mask process in the method of fabricating the TFT array substrate according to the seventh embodiment of the present invention.
Figure 40B:
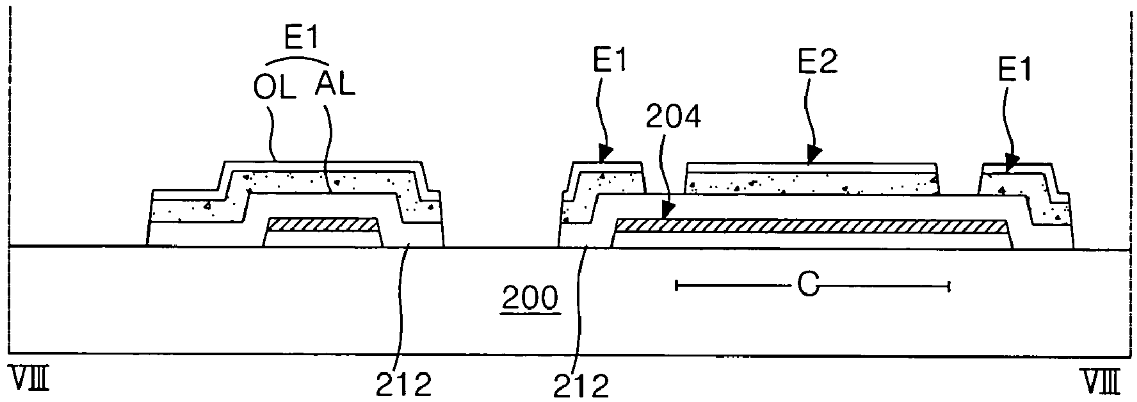
Figure 40B:
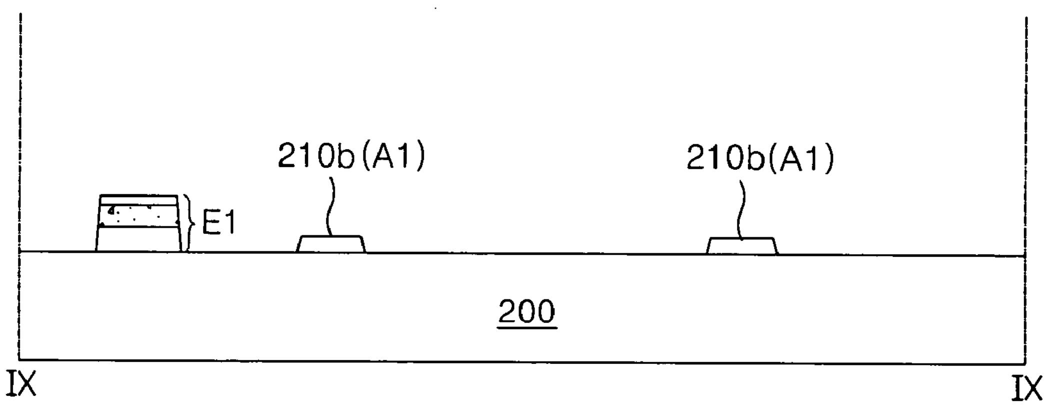
Figure 40B:
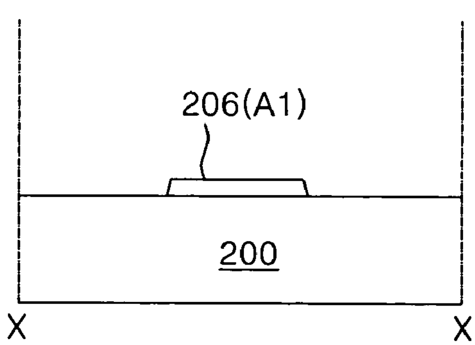
Figure 40B:
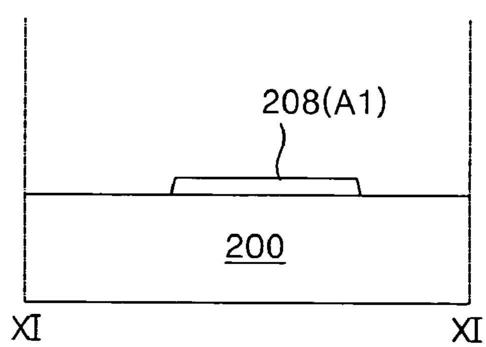

FIGS. 40A and 40B illustrate plan and sectional views, respectively, generally describing a second mask process in the method of fabricating the TFT array substrate according to the seventh embodiment of the present invention.

Referring to FIGS. 40A and 40B, a gate insulating pattern 212 and semiconductor patterns, comprised of an active layer 214 and an ohmic contact layer 216, may be formed on the lower substrate 200 and on the first conductive pattern group in a second mask process. As a result of the second mask process, portions of the gate metal material A2 included within the common electrode 210*b*, the common pad (not shown), the gate pad 206 and the data pad 208 may be removed to expose the transparent conductive material A1 included therein.

The second mask process of the seventh embodiment described above with respect to FIGS. 40A and 40B will now be described in greater detail with respect to FIGS. 41A to 41F.

Figure 41A:
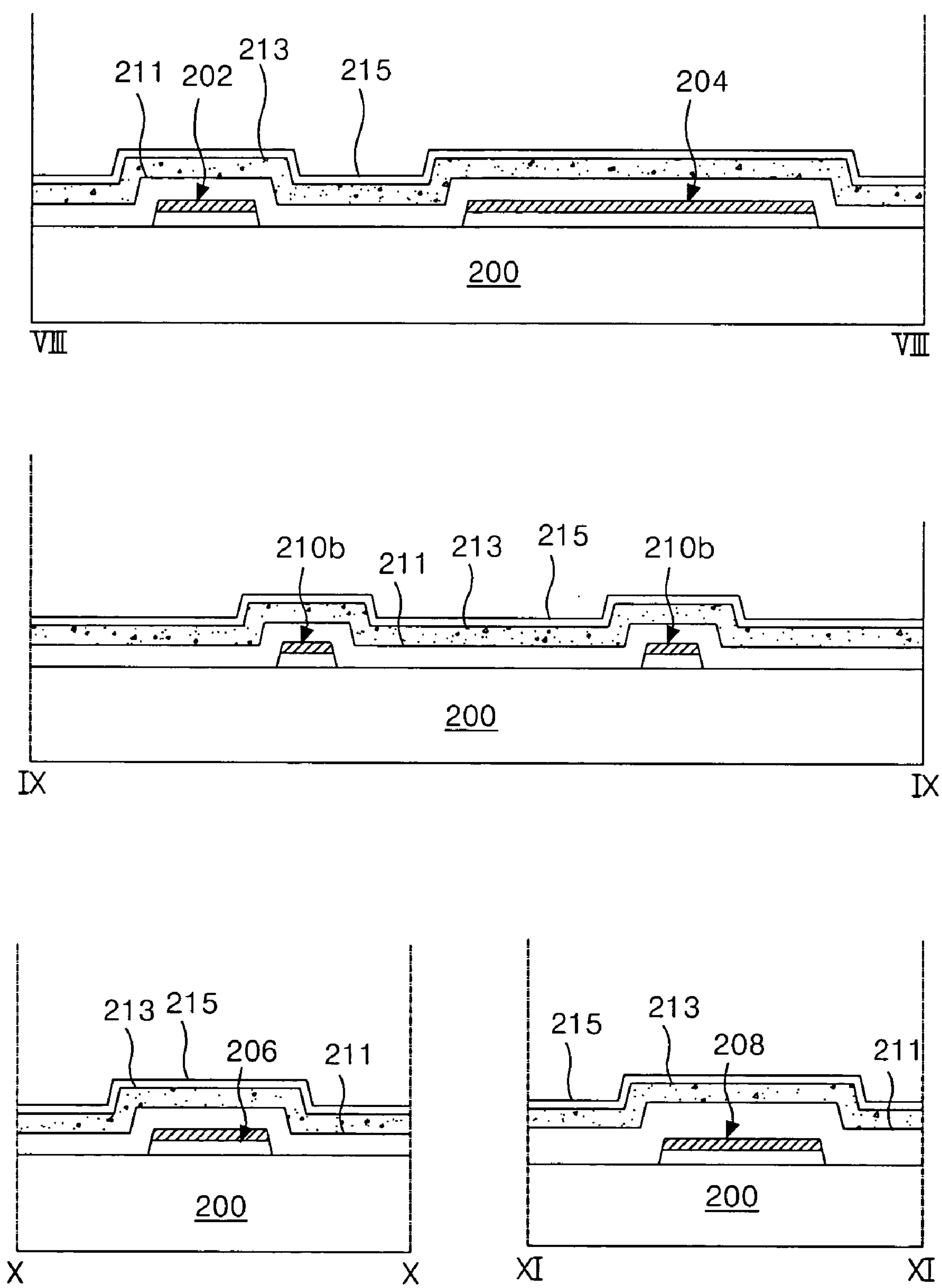
FIGS. 41A to 41F illustrate sectional views specifically describing the second mask process in the method fabricating the TFT array substrate according to the seventh embodiment of the present invention.

Referring to FIG. 41A, a gate insulating film 211, a first semiconductor layer 213, and a second semiconductor layer 215 may be sequentially formed on the lower substrate 200 and on the first conductive pattern group.

Figure 41B:
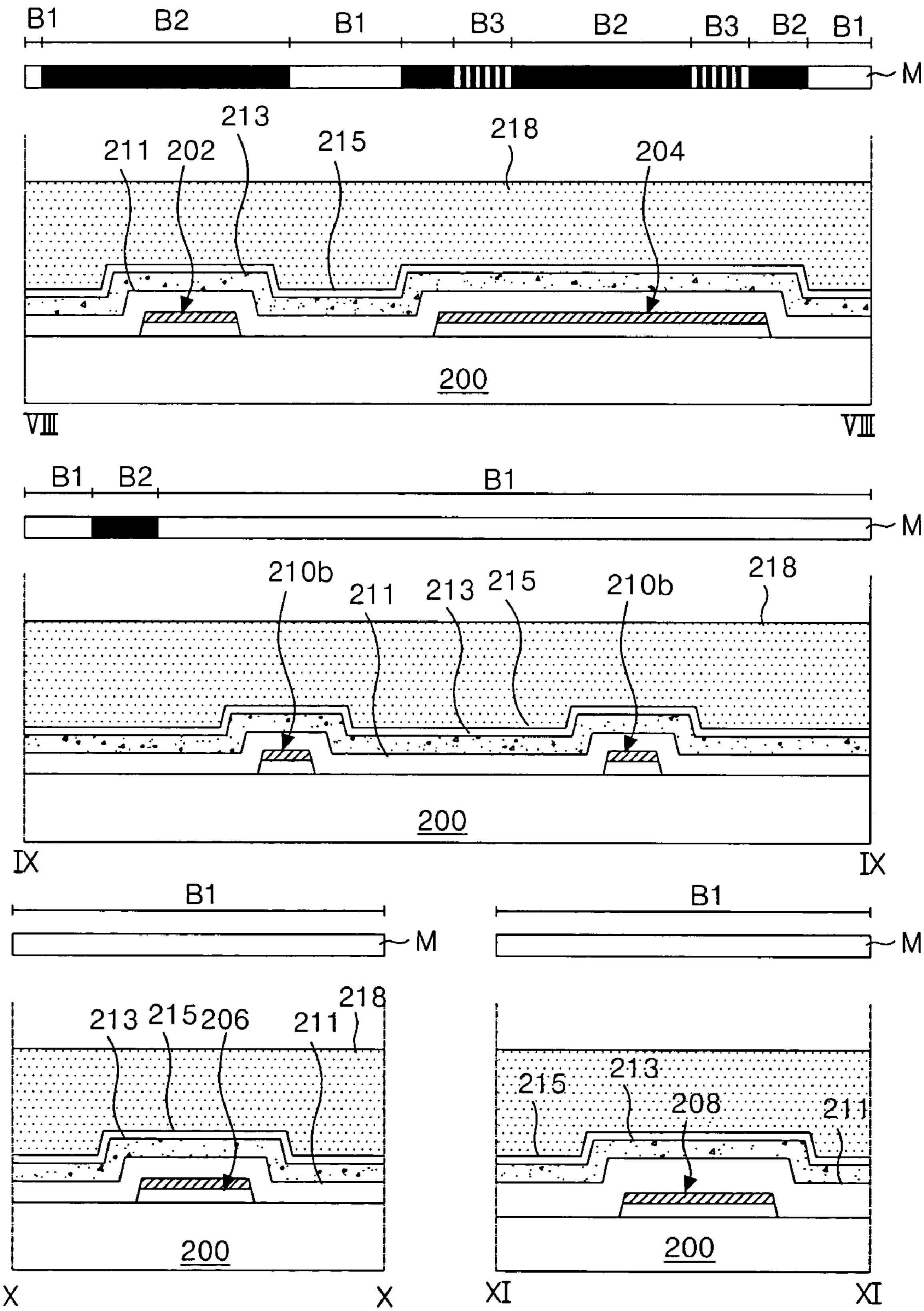

Referring to FIG. 41B, a first photo-resist film 218 is then formed over the entire surface of the second semiconductor layer 215 and is photolithographically patterned using a second mask pattern M. According to principles of the seventh embodiment of the present invention, the second mask pattern M may be similar to the third mask patterns of the embodiments discussed above. For example, include a mask substrate defining a plurality of exposure areas B1, a plurality of shielding areas B2, and a plurality of partial-exposure areas B3. In one aspect of the present invention, the shielding areas B2 may be aligned over the gate line 204, the gate electrode 202, and the common electrode 210*b*, and the partial-exposure areas B3 may be aligned over a spaced area D located between the subsequently formed first and second semiconductor patterns E1 and E2.

Figure 41C:
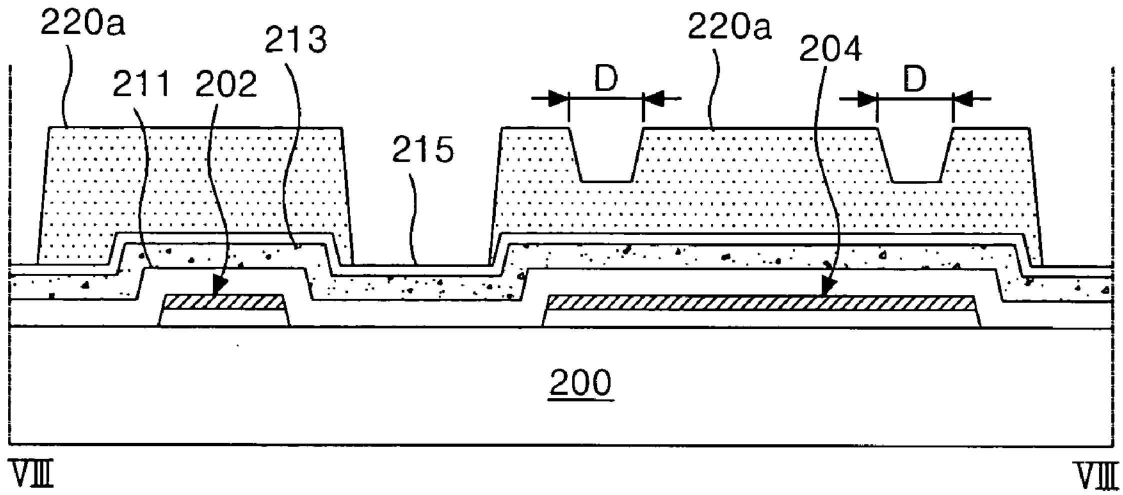
Figure 41C:
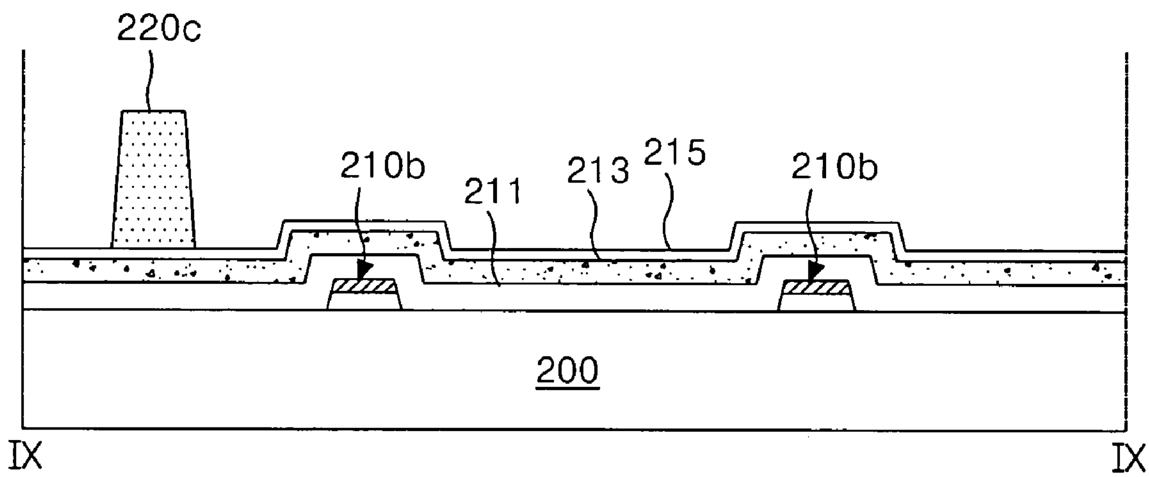
Figure 41C:
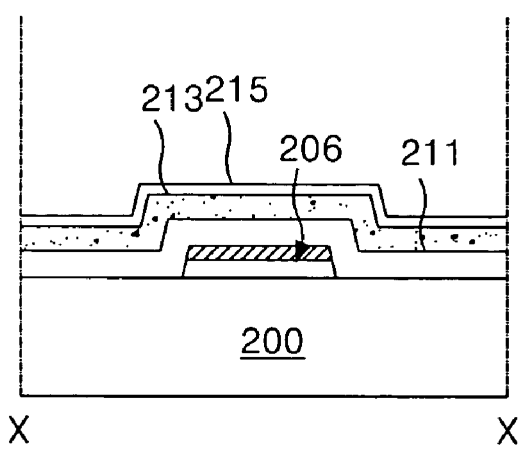
Figure 41C:
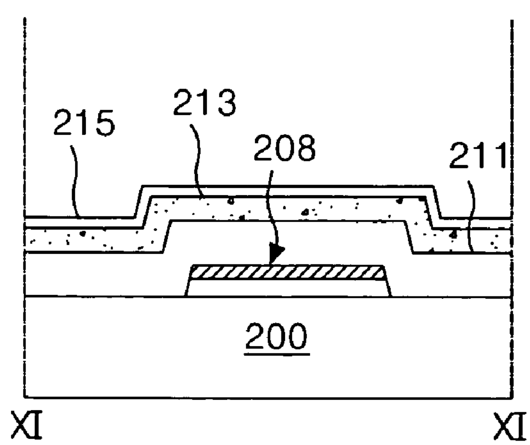
Figure 42:
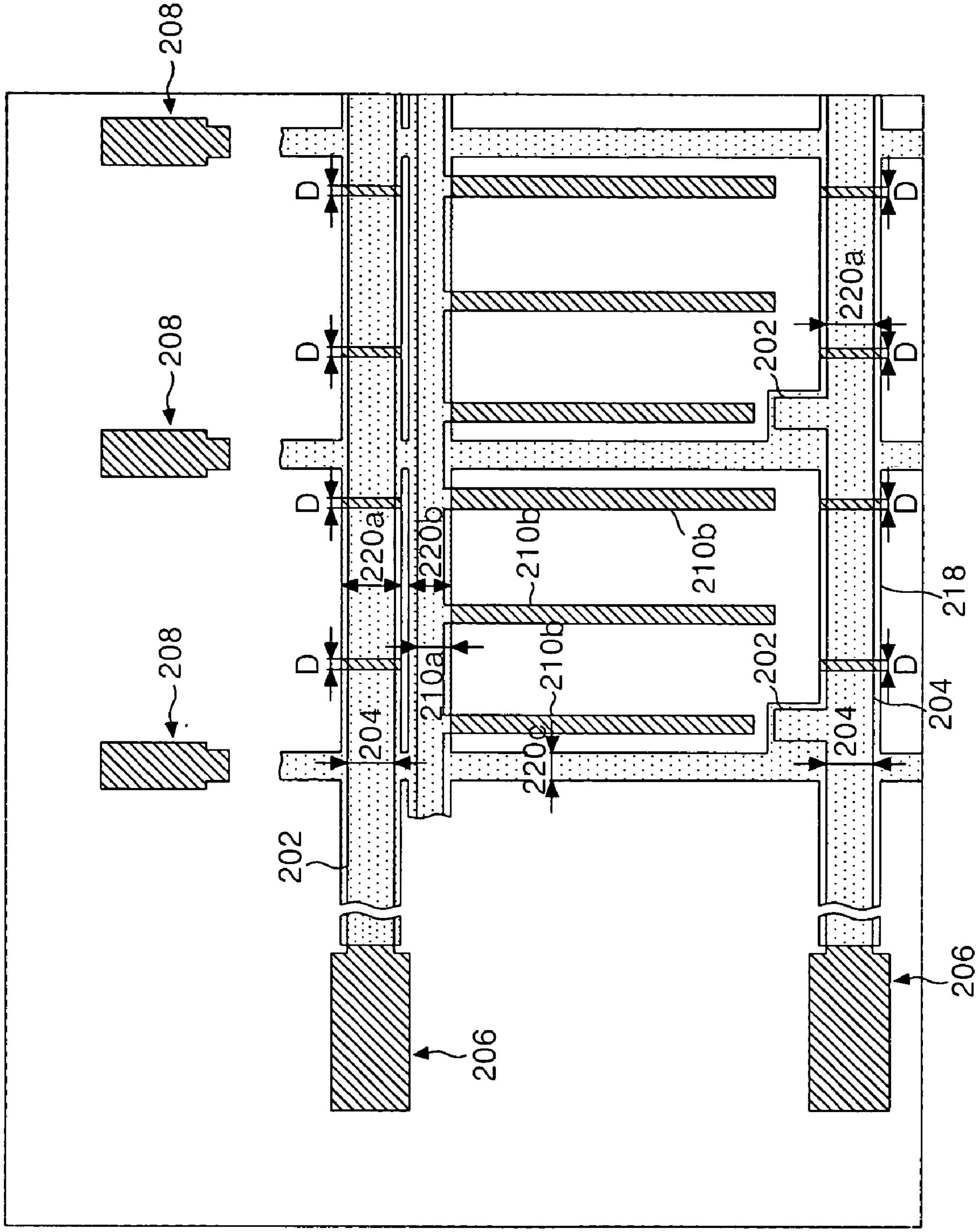
FIG. 42 illustrates a plan view of the photo-resist pattern shown in FIG. 41C.

Referring to FIGS. 41C and 42, the first photo-resist film 218 may, via the second photo mask pattern M, be selectively exposed to light and developed, thereby creating a first photo-resist pattern 220. Thus, upon creating the first photo-resist pattern 220, portions of the first photo-resist film 218 arranged within the exposure area B1 are completely removed, the thickness of portions of the first photo-resist film 218 arranged within the shielding areas B2 remain unchanged, and the thickness of portions of the first photo-resist film 218 arranged within the partial-exposure areas B3 is reduced.

According to principles of the present invention, a first portion 220*a* of the first photo-resist pattern 220 may overlap the gate line 204, a second portion of the first photo-resist pattern 220*b* may overlap the common line 210*a*, and a third portion of the first photo-resist pattern 220*c* may connect the first and second portions of the first photo-resist pattern 220*a* and 220*b*. In one aspect of the present invention, the first portion of the first photo-resist pattern 220*a* may comprise step differences at the aforementioned spaced area D.

Figure 41D:
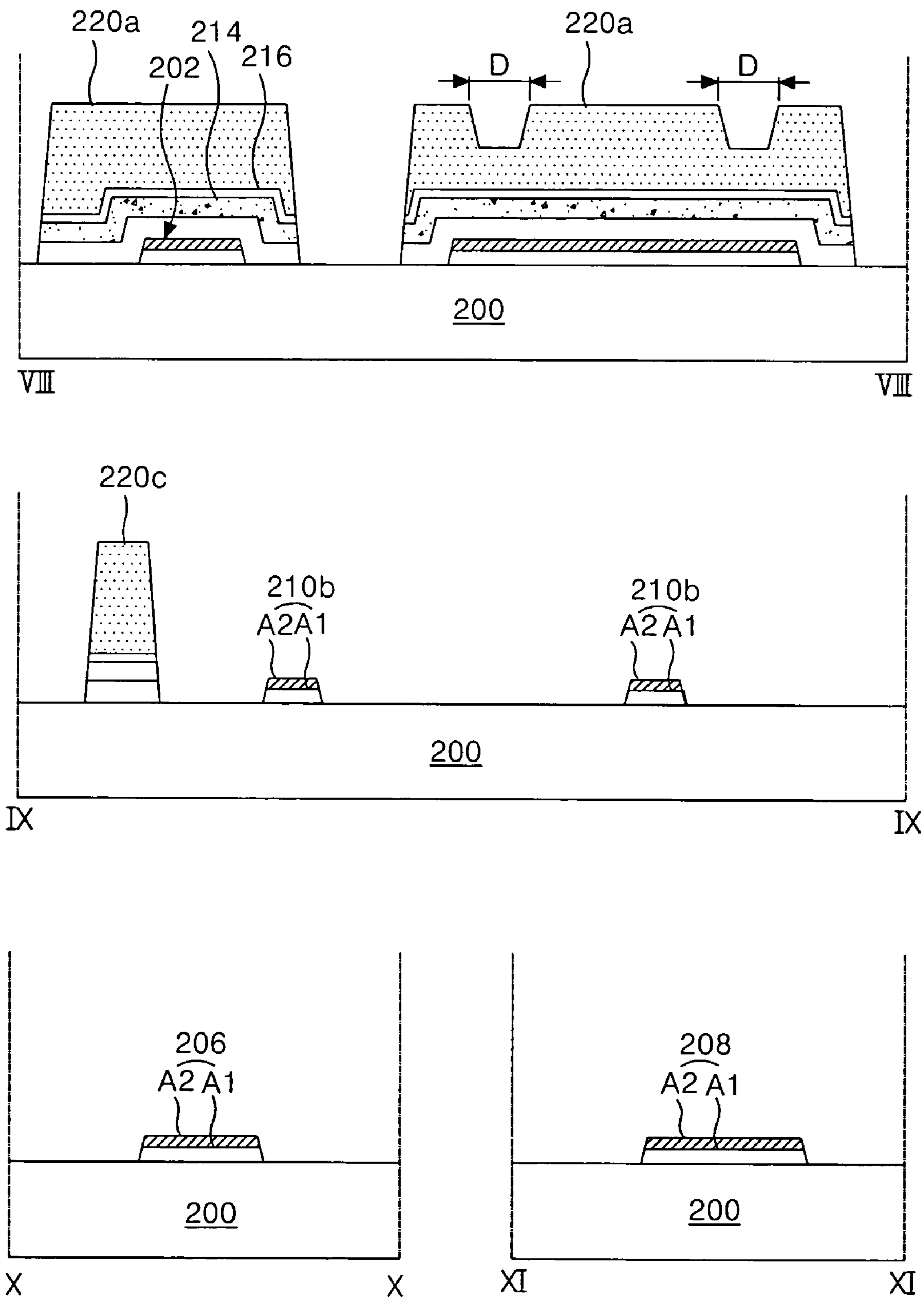

Referring to FIG. 41D, the gate insulating film 211 and the first and second semiconductor layers 213 and 213 may, via the first photo-resist pattern 220, be patterned using photolithographic and etching techniques to form the gate insulating pattern 212 in addition to the active and ohmic contact layers 214 and 216, respectively, and the first to third semiconductor patterns E1, E2, and E3, are formed to be aligned with the first portion of the photo-resist pattern 220*a*. As a result of the patterning, the gate pad 206, the data pad 208, the common pad (not shown) and the common electrode 210*b* are exposed by the gate insulating pattern 212 and the first to third semiconductor patterns E1, E2 and E3.

Figure 41E:
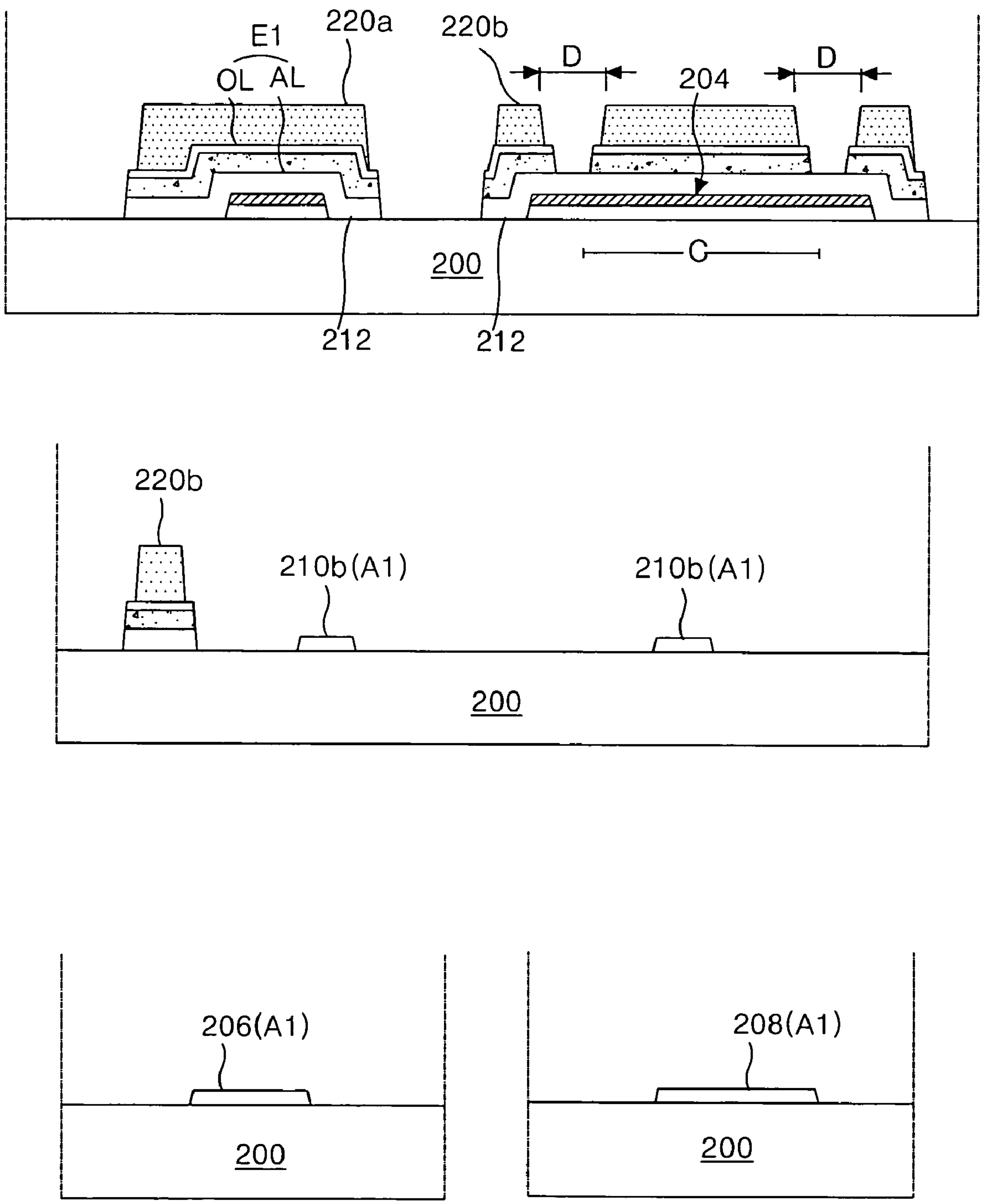

Referring to FIG. 41E, the gate metal material A2 included in the exposed gate pad 206, the data pad 208, the common pad (not shown), and the common electrode 210*b* are removed in an etching process to expose the transparent conductive material A1 included therein. After forming the gate insulating pattern 112 and the active and ohmic contact layers 114 and 116, and after exposing the transparent conductive material A1 included in the gate pad 206, the data pad 208, the common pad (not shown), and the common electrode 210*b*, the first photo-resist pattern 220 is subjected to an ashing process using oxygen ($O_2$) plasma.

Figure 41F:
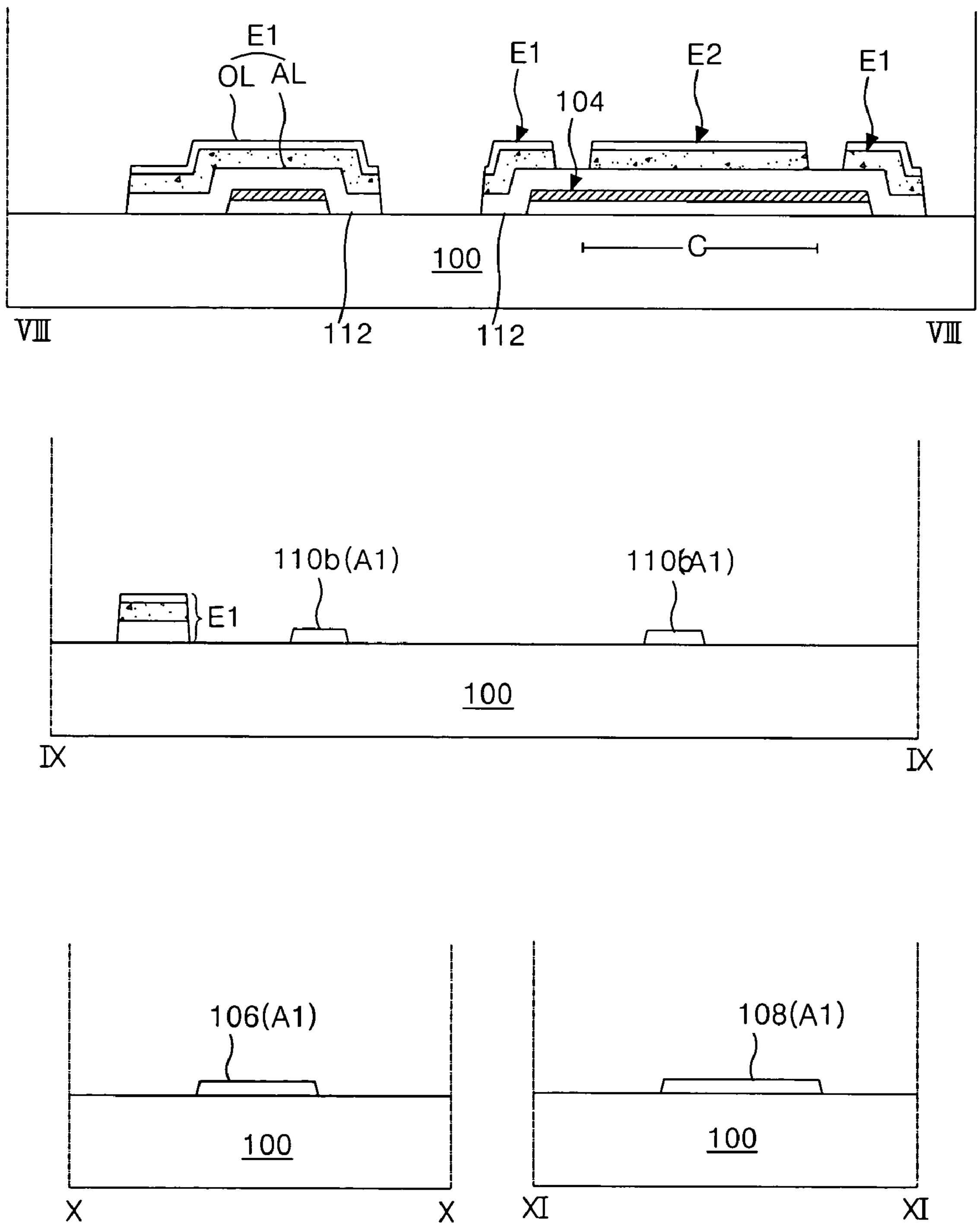

Accordingly, portions of the first photo-resist pattern 220 within the partial-exposure area B3 are removed. Upon performing the ashing process, the relatively thicker portions of the first photo-resist pattern 220 (i.e., portions of the first photo-resist pattern 220 within the shielding areas B2 and on the regions corresponding to the first to third semiconductor patterns E1, E2, and E3) are thinned but, nevertheless, remain. Using the thinned first photo-resist pattern 220, portions of the active and ohmic contact layers 214 and 216 in the partial-exposure areas B3 are removed in an etching process. As a result of the etching process the first and second semiconductor patterns E1 and E2 are separated from each other. With reference to FIG. 41F, the remaining first photo-resist pattern 220 is then removed in a stripping process.

Figure 43A:
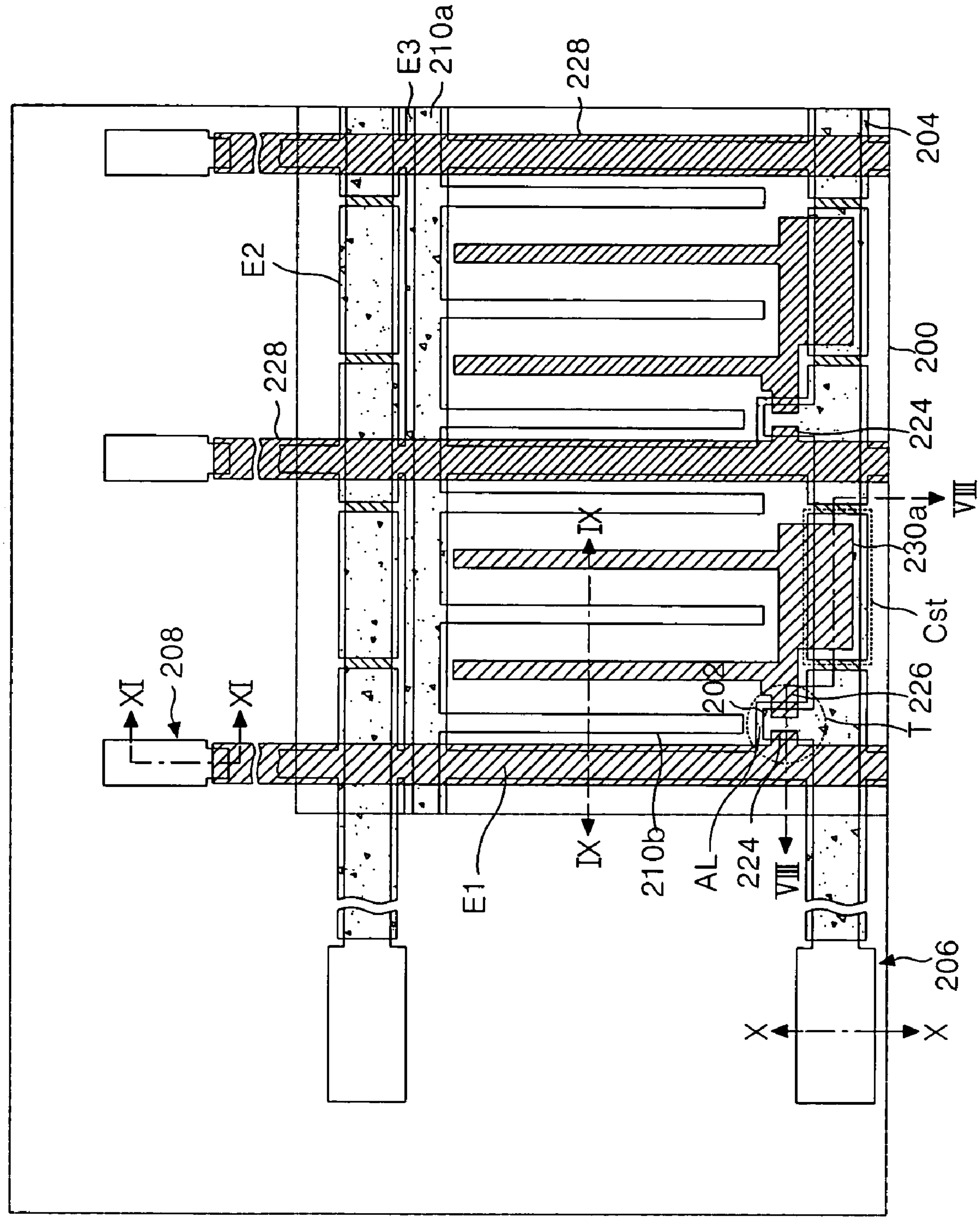
FIGS. 43A and 43B illustrate plan and sectional views, respectively, describing a third mask process in the method of fabricating the TFT array substrate according to the seventh embodiment of the present invention.
Figure 43B:
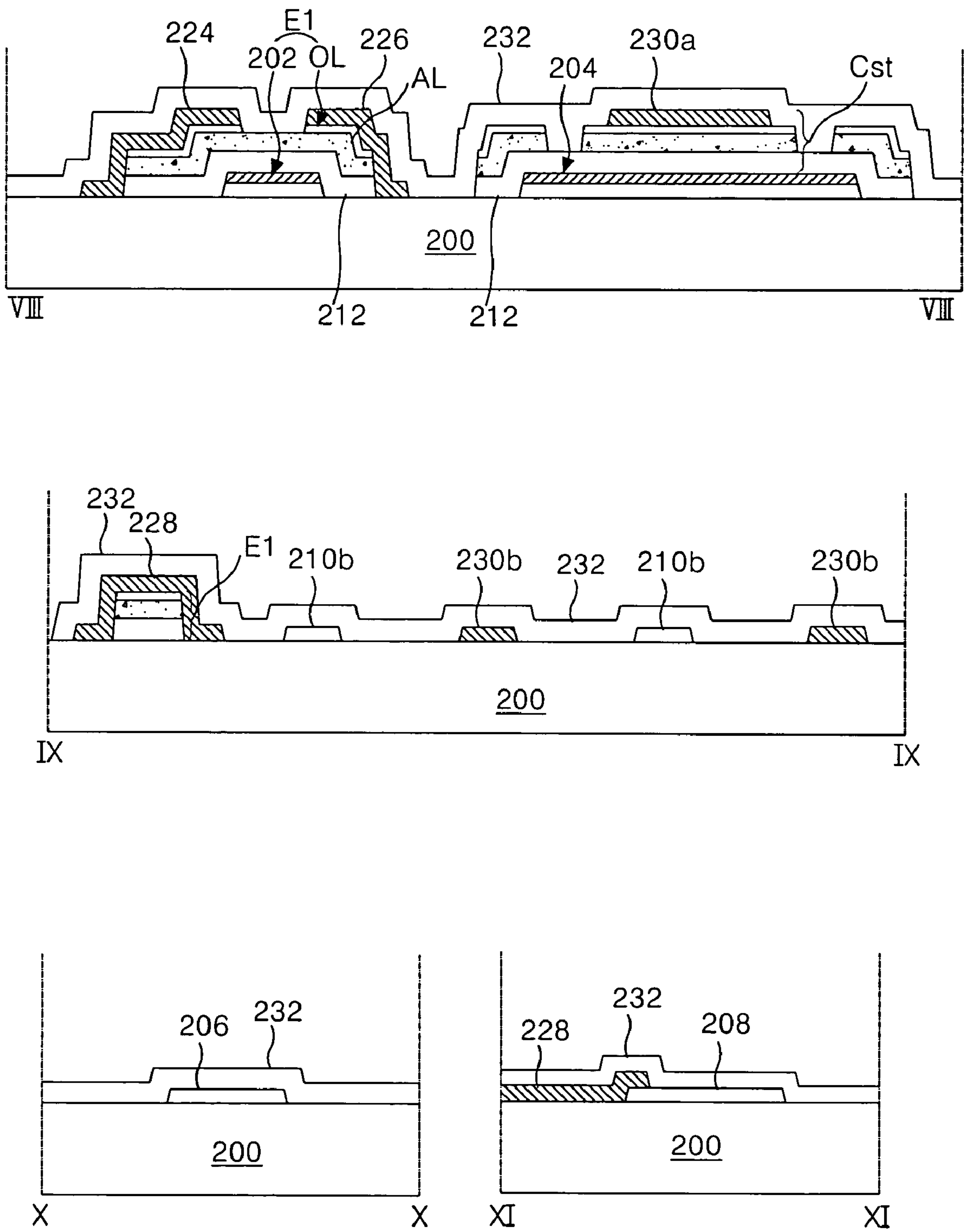

FIGS. 43A and 43B illustrate plan and sectional views, respectively, describing a third mask process in the method of fabricating the TFT array substrate according to the seventh embodiment of the present invention.

According to principles of the present invention, the TFT array substrate of the seventh embodiment may be formed using a third mask process in a manner similar to the embodiments discussed above. Therefore, a description of the third mask process will be briefly explained with reference to FIGS. 43A and 43B.

Referring to FIGS. 43A and 43B, a second conductive pattern group may be formed on the lower substrate 200 and on the gate insulating pattern 212, in addition to the first to third semiconductor patterns E1 to E3 in a third mask process. In one aspect of the present invention, the second conductive pattern group may, for example, include data line 228, source electrode 224, drain electrode 226, and pixel electrode 230 is formed on the lower substrate 100 provided with the gate insulating pattern 212 and the first to third semiconductor patterns E1, E2 and E3. A protective film 232 is provided to cover the second conductive pattern group.

According to principles of the present invention, the pixel electrode 230 may, for example, include a horizontal part 230*a* extending from the drain electrode 226 and serving an upper electrode of the storage capacitor Cst, and a plurality of vertical parts 230*b* extending substantially perpendicularly from the horizontal part 230*a* to generate a horizontally oriented electric field using the common electrode 210*b*.

A data metal layer is deposited onto the lower substrate 200, the gate insulating pattern 212, and on the first to third semiconductor patterns E1 to E3. A second photo-resist film is then formed over the entire surface of the data metal layer and may be photolithographically patterned using a third mask pattern to form a second photo-resist pattern. According to principles of the seventh embodiment of the present invention, the third mask pattern may be similar to the second mask patterns of the embodiments discussed above. Using the second photo-resist pattern, a portion of an ohmic contact layer OL between the source and drain electrodes 224 and 226 may be removed using the source and drain electrodes 224 and 226 of the second conductive pattern group as a mask, thereby exposing a portion active layer AL.

Finally, the protective film 232 is formed over the entire surface of the substrate 200 and on the second conductive pattern group.

Figure 44:
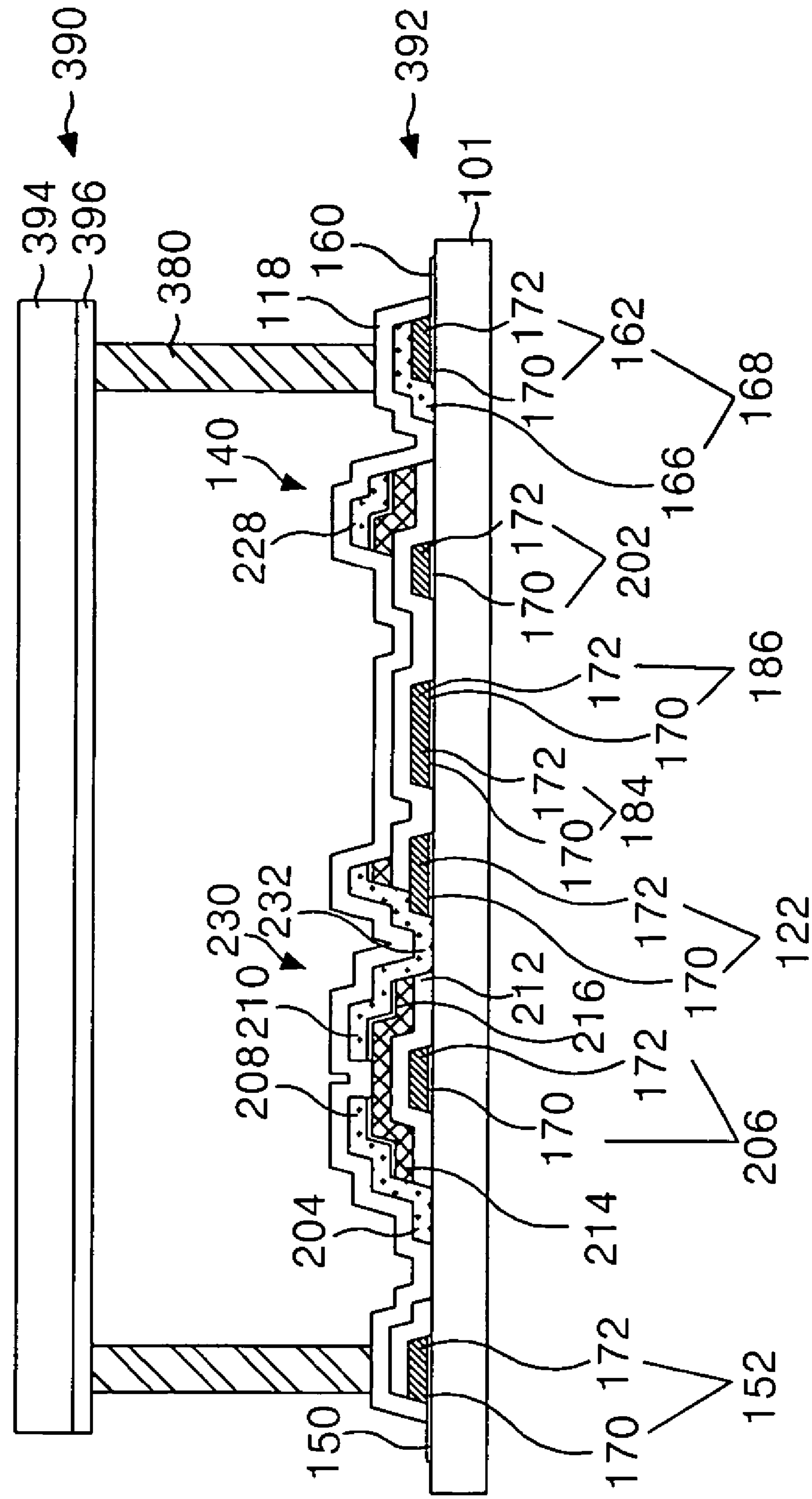
FIG. 44 illustrates a sectional view of a first LCD panel comprising the TFT array substrate according to the first to seventh embodiments of the present invention.

FIG. 44 illustrates a sectional view of a first LCD panel comprising the TFT array substrate according to the first to seventh embodiments of the present invention.

Referring to FIG. 44, a liquid crystal display (LCD) panel may, for example, include a color filter array substrate 390 and a TFT array substrate 392 joined to each other by a sealant 380. While the TFT array substrate 392 is presently illustrated as the TFT array substrate of the first embodiment shown in FIG. 5, it will be readily appreciated that the TFT array substrate of the LCD panel shown in FIG. 44 may be provided as described in any of the embodiments described above.

According to principles of the present invention, the color filter array substrate 390 may, for example, include a color filter array 396 arranged on an upper substrate 394. In one aspect of the present invention, the color filter array 396 may, for example, include a black matrix, color filters, and common electrodes.

As shown in FIG. 44, the TFT array substrate 392 extends beyond the color filter array substrate 396. Accordingly, the protective film 118 may be formed over an entirety of the surface of the portion of the TFT array substrate 392 that is overlapped by the color filter array substrate 390 while the protective film 118 may be removed from portions of the TFT array substrate that are not overlapped by the color filter array substrate 390 so as to expose transparent conductive material 170 included in at least one of the gate pad 150, the data pad 160, and the common pad 180.

A method of fabricating the LCD panel illustrated in FIG. 44 will now be described in greater detail below.

The color filter array substrate 390 and TFT array substrate 392 may be separately prepared and joined to each other via the sealant 380. Using the color filter array substrate 390 as a mask, portions of the protective film 118 on the surface of the TFT array substrate 392 beyond the color filter array substrate 390 may be patterned in a pad opening process. Accordingly, the pad opening process may expose the transparent conductive material 170 included in at least one of the gate pad 150, the data pad 160, and the common pad 180.

According to principles of the present invention, the pad opening process may involve sequentially scanning each pad exposed by the color filter array substrate 390 using a plasma. In one aspect of the present invention, the plasma may be generated using an atmosphere plasma generator, a normal-pressure plasma generator, or both, to expose the transparent conductive material 170 of the gate pad 150, the data pad 160 and the common pad 180. Alternatively, the pad opening process may involve immersing the entire LCD panel (i.e., the color filter array substrate 390 joined to the TFT array substrate 392) into an etching liquid. Alternatively, the pad opening process may involve immersing only the portion of the TFT array substrate 392 containing the gate pad 150, the data pad 160, and the common pad 180 (i.e., the pad area) into the etching liquid.

Figure 45:
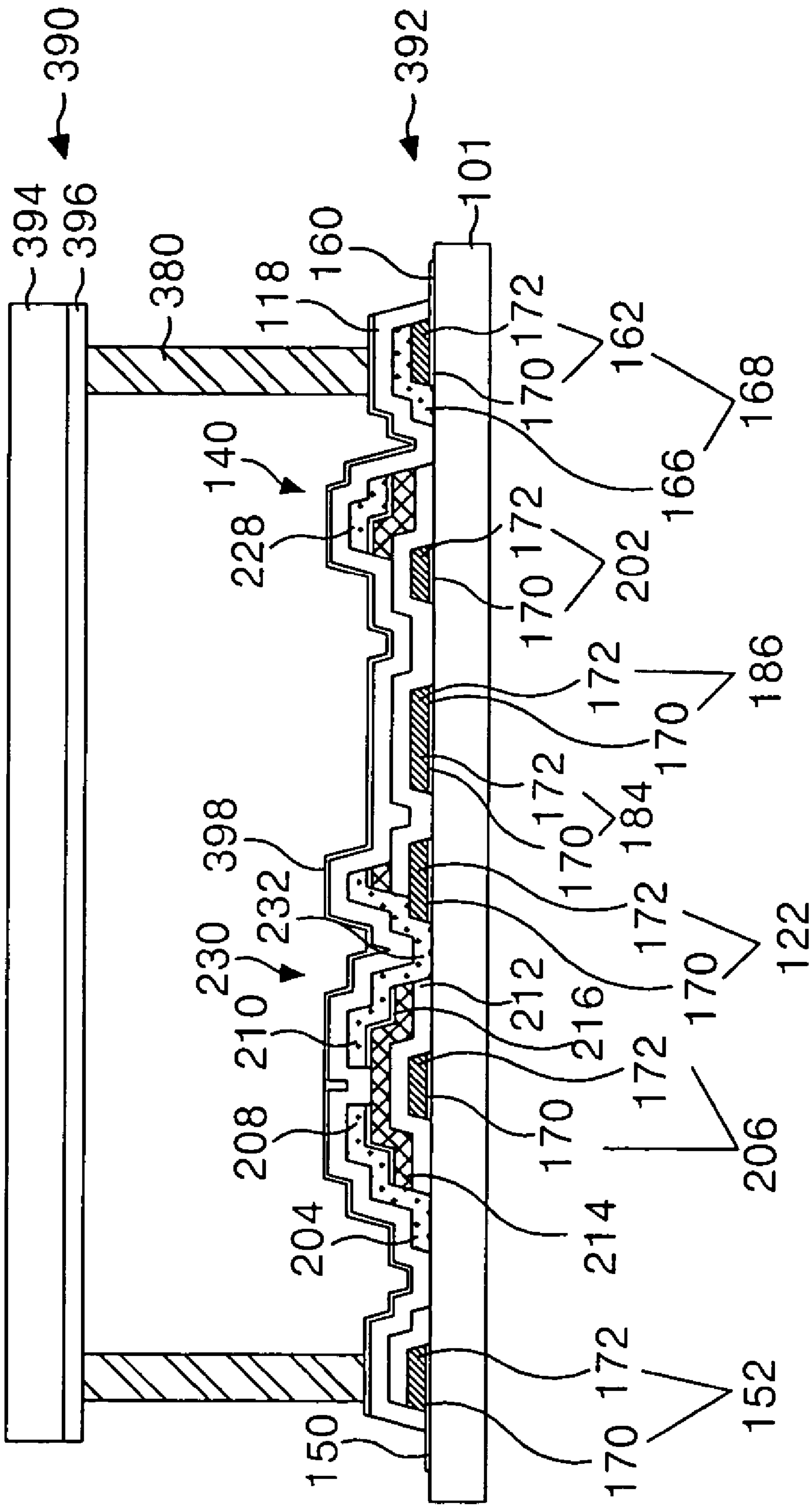
FIG. 45 illustrates a sectional view of a second LCD panel comprising the TFT array substrate according to the first to seventh embodiments of the present invention.

FIG. 45 illustrates a sectional view of a second LCD panel comprising the TFT array substrate according to the first to seventh embodiments of the present invention.

Referring to FIG. 45, an LCD panel may, for example, include a color filter array substrate 390 and a TFT array substrate 392 joined to each other by a sealant 380. While the TFT array substrate 392 is presently illustrated as the TFT array substrate of the first embodiment shown in FIG. 5, it will be readily appreciated that the TFT array substrate of the LCD panel shown in FIG. 44 may be provided as described in any of the embodiments described above.

According to principles of the present invention, an alignment film 398 may be formed over the surface of the protective film 118 and the color filter array substrate 390 may, for example, include a color filter array 396 arranged on an upper substrate 394. In one aspect of the present invention, the color filter array 396 may, for example, include a black matrix, color filters, and common electrodes.

As shown in FIG. 45, the TFT array substrate 392 extends beyond the color filter array substrate 396. Accordingly, the protective and alignment films 118 and 398 may be formed over an entirety of the surface of the portion of the TFT array substrate 392 that is overlapped by the color filter array substrate 390 while the protective and alignment films 118 and 398 may be removed from portions of the TFT array substrate that are not overlapped by the color filter array substrate 390 so as to expose transparent conductive material 170 included in at least one of the gate pad 150, the data pad 160, and the common pad 180. Accordingly, the protective film 118 may be formed in a patterning process prior to joining the color filter array substrate 396 and the TFT array substrate 392, wherein the patterning process incorporates an etching technique that uses the alignment film 398 as a mask.

As described above, the principles of the present invention allow a corrosion resistant transparent conductive material included within at least one of a gate pad, a data pad, and a common pad to be exposed. Accordingly, the TFT array substrate may be fabricated by the three-mask process, thereby reducing the number of fabrication processes and the cost while improving a production yield.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) panel in an in plane switching (IPS) mode LCD device, comprising:

a thin film transistor (TFT) array substrate, the TFT array substrate including:

a gate line having a transparent conductive layer and a first metal layer formed on the transparent conductive layer;

a data line crossing the gate line;

a TFT at the crossing of the gate and data lines;

a protective film over the TFT for protecting the TFT;

a pixel electrode connected to the TFT and having the transparent conductive layer;

a common line substantially parallel to the gate line, and having the transparent conductive layer and the first metal layer formed on the transparent conductive layer;

a common electrode connected to the common line for generating a horizontally oriented electric field with the pixel electrode; and a pad connected to at least one of the gate line, the data line, and the common line, wherein the pad includes the transparent conductive layer; and a color filter array substrate, wherein:

a first portion of the TFT array substrate is overlapped by the color filter array substrate;

a second portion of the TFT array substrate is not overlapped by the color filter array substrate; and the pad is within the second portion of the TFT array substrate and exposed by the protective film.

2. The liquid crystal display panel as claimed in claim 1, wherein at least one of the pixel electrode and the common electrode comprises at least one of a metal film included in the gate line, a metal film included in the data line, and the transparent conductive layer.

3. The liquid crystal display panel as claimed in claim 1, wherein said pad includes:

a gate pad connected to the gate line, the gate pad comprising the transparent conductive layer of the gate line;

a data pad connected to the data line; and a common pad connected to the common line, the common pad comprising the transparent conductive layer of the common line.

4. The liquid crystal display panel as claimed in claim 1, wherein the TFT includes:

a gate electrode connected to the gate line, and having the transparent conductive layer and the first metal layer formed on the transparent conductive layer;

a source electrode connected to the data line;

a drain electrode connected to the pixel electrode;

a gate insulating pattern over the gate electrode; and a semiconductor layer on the gate insulating pattern and overlapping the gate electrode to form a channel between the source and drain electrodes.

5. The liquid crystal display panel as claimed in claim 1, wherein the common line, electrode comprises the transparent conductive layer and the first metal layer formed on the transparent conductive layer.

6. The liquid crystal display panel as claimed in claim 1, wherein the pixel electrode comprises the transparent conductive layer and the first metal layer formed on the transparent conductive layer.

7. The liquid crystal display panel as claimed in claim 1, wherein a portion of the pixel electrode overlaps a portion of the drain electrode and the portion of the drain electrode formed on the portion of the pixel electrode.

8. The liquid crystal display panel as claimed in claim 1, wherein:

the transparent conductive layer includes at least one of indium-tin-oxide (ITO), indium-zinc-oxide (IZO), indium-tin-zinc-oxide (ITZO) and tin-oxide(TO); and the first metal layer includes at least one of an aluminum (Al) group metal, molybdenum (Mo), copper (Cu), chrome(Cr), tantalum (Ta), tungsten (W), silver (Ag), and titanium (Ti).

9. The liquid crystal display panel as claimed in claim 1, further comprising an alignment film on the protective film, wherein a pattern of the alignment film is the same pattern as a pattern of the protective film.

10. The liquid crystal display panel as claimed in claim 1, further comprising a storage capacitor comprised of the gate line and a storage electrode overlapping the gate line, wherein the storage electrode is insulated from the gate line, is an integral extension of the drain electrode, and is connected to the pixel electrode.

11. The liquid crystal display panel as claimed in claim 1, further comprising a storage capacitor comprised of the gate line and a storage electrode overlapping the gate line, wherein the storage electrode is insulated from the gate line and is an integral extension of the pixel electrode.

12. The liquid crystal display panel as claimed in claim 1, wherein the pixel electrode and the common electrode are formed in the same layer having the transparent conductive layer.

13. The liquid crystal display panel as claimed in claim 1, wherein the gate line, the pixel electrode, the common line, and common electrode are formed in the same layer having the transparent conductive layer and the first metal layer formed on the transparent conductive layer.

14. The liquid crystal display panel as claimed in claim 3, wherein the gate pad and the common pad are formed in the same layer having the transparent conductive layer and the first metal layer formed on the transparent conductive layer.

* * * * *